United States Patent
Ulrich et al.

(10) Patent No.: US 8,366,055 B2
(45) Date of Patent: Feb. 5, 2013

(54) CONTROLLABLE MINIATURE MONO-WING AIRCRAFT

(75) Inventors: Evan R. Ulrich, Frederick, MD (US);
Darryll J. Pines, Clarksville, MD (US);
Joseph Park, Pasadena, MD (US);
Steven Gerardi, Salisbury, MD (US)

(73) Assignee: University of Maryland, College Park, MD (US)

(*) Notice: Subject to any disclaimer, the term of this patent is extended or adjusted under 35 U.S.C. 154(b) by 252 days.

(21) Appl. No.: 12/818,826

(22) Filed: Jun. 18, 2010

(65) Prior Publication Data
US 2011/0062278 A1    Mar. 17, 2011

Related U.S. Application Data

(60) Provisional application No. 61/218,618, filed on Jun. 19, 2009.

(51) Int. Cl.
*B64C 27/00* (2006.01)
*B64C 27/06* (2006.01)
*B64C 27/57* (2006.01)

(52) U.S. Cl. .......... 244/190; 244/17.11; 416/19
(58) Field of Classification Search ............ 244/17.11, 244/17.13, 38, 39, 48, 67, 138 A, 180, 190; 416/19
See application file for complete search history.

(56) References Cited

U.S. PATENT DOCUMENTS

| | | | | |
|---|---|---|---|---|
| 3,820,743 A * | 6/1974 | Young | | 244/4 R |
| 3,915,414 A * | 10/1975 | Shoulders | | 244/180 |
| 4,886,222 A * | 12/1989 | Burke | | 244/138 A |
| 7,059,931 B2 * | 6/2006 | Dammar | | 244/17.11 |
| 7,766,274 B1 * | 8/2010 | Jameson et al. | | 244/17.11 |
| 8,079,546 B2 * | 12/2011 | Barrows | | 244/90 R |

\* cited by examiner

*Primary Examiner* — Tien Dinh
*Assistant Examiner* — Richard R Green
(74) *Attorney, Agent, or Firm* — Rosenberg, Klein & Lee

(57) ABSTRACT

Micro/nano mono-wing aircraft with the wing configured as a winged seed (Samara) is uniquely suited for autonomous or remotely controlled operation in confined environments for surrounding images acquisition. The aircraft is capable of effective autorotation and steady hovering. The wing is flexibly connected to a fuselage via a servo-mechanism which is controlled to change the wing's orientation to control the flight trajectory and characteristics. A propeller on the fuselage rotates about the axis oriented to oppose a torque created about the longitudinal axis of the fuselage and is controlled to contribute in the aircraft maneuvers. A controller, either ON-board or OFF-board, creates input command signals to control the operation of the aircraft based on a linear control model identified as a result of extensive experimentations with a number of models.

18 Claims, 33 Drawing Sheets

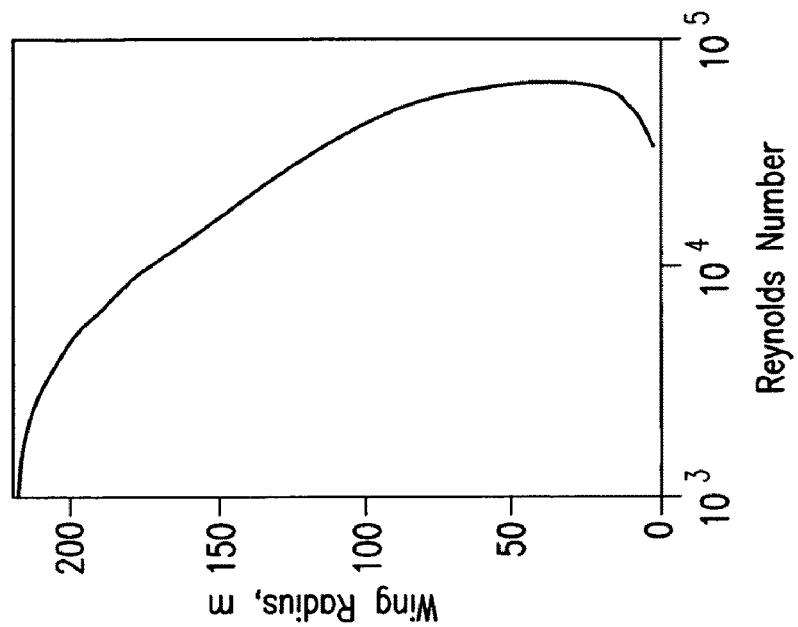
FIG. 2G
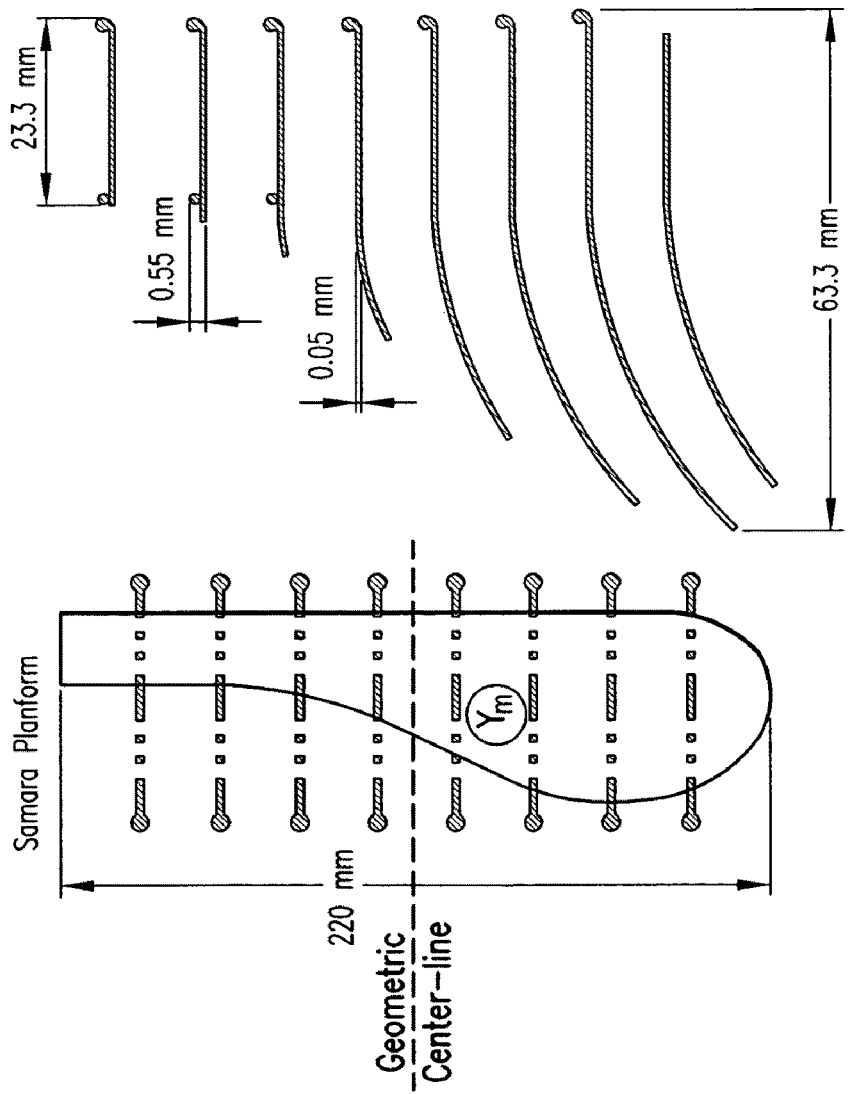
FIG. 2F
FIG. 2E

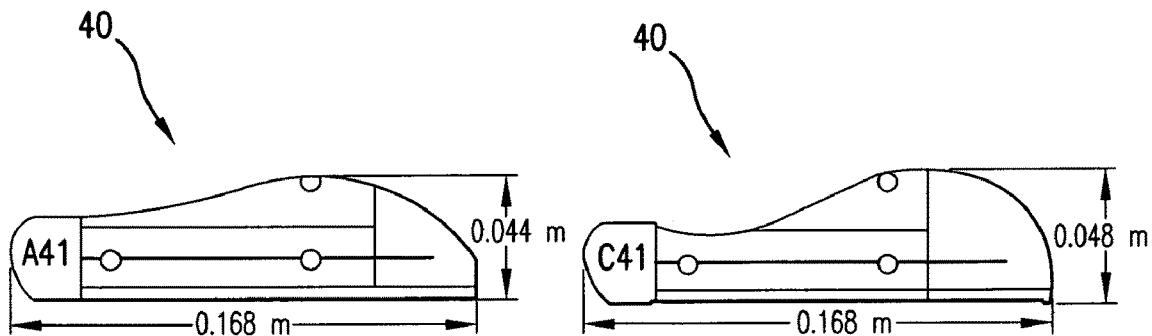
FIG.3A
FIG.3C
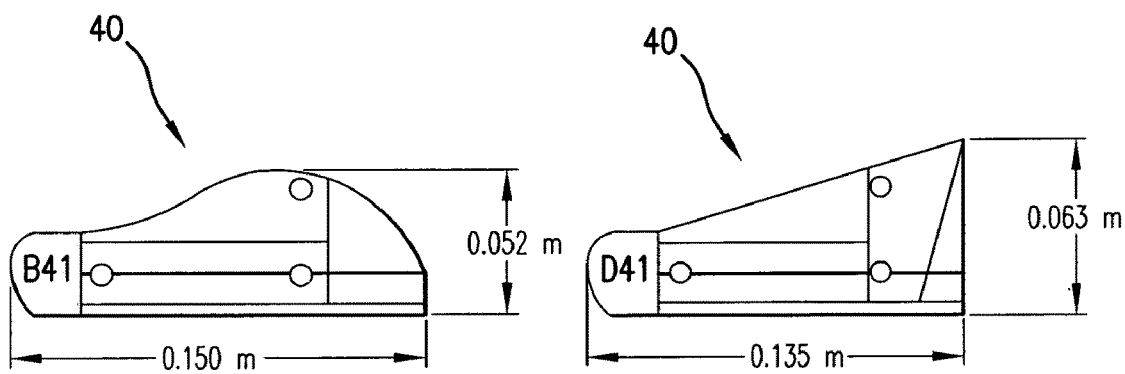
FIG.3B
FIG.3D
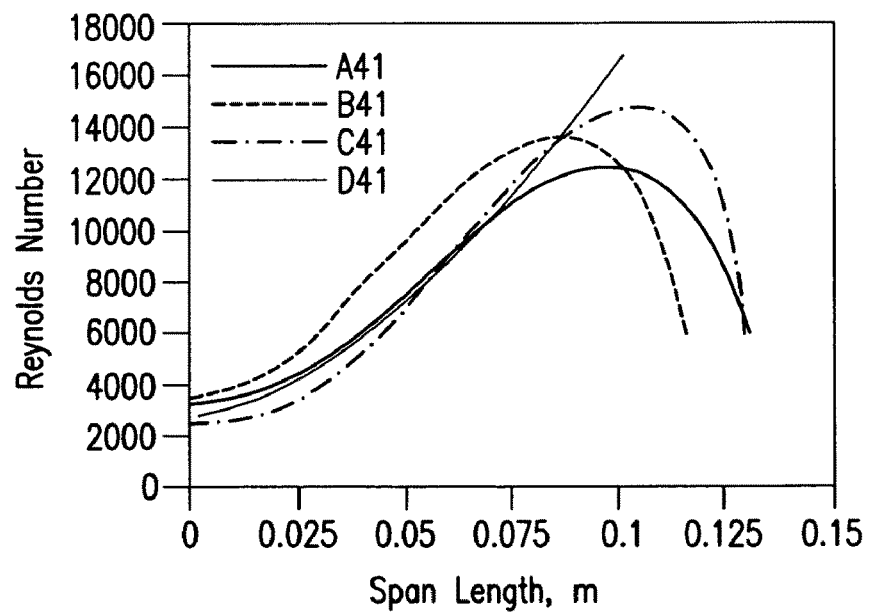
FIG.4

CONTROLLABLE MINIATURE MONO-WING AIRCRAFT

RELATED APPLICATION

This Utility patent application is based on U.S. Provisional Patent Application 61/218,618 filed on 19 Jun. 2009.

FIELD OF THE INVENTION

The present invention relates to micro air vehicles, and more in particular, to a micro/nano unmanned aerial system employing a single wing configured as a winged seed (Samara).

In overall concept, the present invention relates to a miniature mono-wing rotating aircraft which mimics the passive transit of the winged seed which is capable of a steady hovering flight, as well as of the autorotation mode of operation that permits a slow descent of the aircraft in a manner similar to that of the maple winged seed (Samara), and may be maneuvered for desired vertical, horizontal and turning displacements.

The present invention also relates to a micro/nano unmanned aerial system which includes a single wing flexibly attached to a fuselage member and a propeller attached to the fuselage member and controllably rotatable in a predetermined plane to cause a stable rotational motion of the aircraft. A control unit (ON-board and OFF-board) controls the orientation of the wing and/or rotation of the propeller in a predetermined manner to attain desired modes of the vehicle's operational and flight parameters, as well as to steer the vehicle for desired flight trajectories.

The invention is also directed to a micro/nano monocopter which rotates around a vertical axis of inertia and is adapted to carry an on-board camera for collecting 360° panoramic detailed three-dimensional images of its surroundings and which is easily deployable in an area of interest in a cost effective manner.

BACKGROUND OF THE INVENTION

In recent years, a new concept of flight has emerged that encompasses microscale aircraft that are bio-inspired. These highly maneuverable platforms are capable of hovering flight and are ideally suited for operation in a confined environment. The reconnaissance mission envisioned for micro/nano aircraft requires a high level of autonomy due to the fast dynamics of the vehicle and the limits associated with communication in the likely areas of operation (i.e., caves and buildings).

Aerial systems that satisfy the dimensional constraints outlined by the Defense Advanced Research Projects Agency (DARPA) micro air vehicle (MAV) initiative include fixed-wing, rotary wing, and flapping-wing vehicles. The simplest and most mature of these platforms are fixed-wing vehicles that boast speed, simplicity, and well-known dynamics. However, the limitation imposed by forward flight restricts functionality in cluttered environments which can be traversed by rotary- and flapping-wing platforms.

Microscale helicopter linear dynamic system models have been developed for substantially larger vehicles, including the Yamaha RMAX helicopter. Despite the growing interest in microscale helicopter flight, a dynamic model of a single-winged rotorcraft has not been developed.

The concept of a single-wing rotating aircraft is known in the prior art. The first vehicle of this type was flown in 1952 in the woods surrounding Lake Placid, N.Y. A more recent vehicle was developed and flown by a team led by Lockheed Martin Advanced Technology Laboratories. The prototype, called MAVPro, incorporated an outrunner motor with an 8-in.-diam propeller; it weighted 0.514 kg, rotated at a stable 4 Hz, and could clime to 50 ft with radio-controlled actuation of a trailing-edge flap. The MAVPro incorporated the AG38 airfoil and exhibited a rectangular planform geometry. However, the various single-winged rotating aircraft developed over the years have made no attempt to use the most basic mode of transit of the natural Samara, e.g., the autorotation. Additionally, airfoil cross sections and planform designs have had no similarity to those found in natural Samaras.

Samaras, or winged seeds, are the sole method by which several species of plants propagate their seed. Geometric configurations for maximal seed dispersal has evolved into two main classes of seeds, both of which execute autorotational flight as they fall from the tree, and one of which additionally rotates about its longitudinal axis. The optimality of the autorotation heavily influences the population dynamics. The evolution of the Samara provides a nearly infinite set of feasible autorotation configurations with each having distinct dynamics.

Advancements in technologies associated with the sensing and control aspect of unmanned vehicles has allowed conventional micro-scaled vehicles to be equipped with real-time systems. The vast capabilities provided to these small systems are limited by the battery life and power consumption of the on-board electronics and actuators. The majority of the power consumed in an aerial system sustains a desired flight mode. The primary focus of this flight mode is to negate the effects of gravity.

A new paradigm is needed, whose focus is the design of a vehicle with a passively stable primary mode of operation which requires little or no additional power to attain/maintain this mode of transit. The natural flight of a Samara, by trading the gravitational potential energy for rotational kinetic energy which perpetuates an aerodynamically stable helical descent, is perfectly suitable for this purpose. However, no known micro-air vehicle has used this concept so far.

In addition, the conventional monocopter designs apply torque to the vehicle with a thrust device slightly offset from the $\hat{c}_y$ axis (shown in FIG. 1). In the case of MAVPro, the propeller spins in the $\hat{c}_y$–$\hat{c}_z$ plane and influences the stability about the $\hat{c}_y$ axis. This configuration results in the propeller fighting the pitch input from the flap and reduces controllability of the vehicle. A different configuration is therefore needed which would provide an improved roll stability.

SUMMARY OF THE INVENTION

It is an object of the present invention to provide a miniature (micro/nano) mono-wing air vehicle capable of a high level of autonomy due to the low power consumption possible due to the autorotation and vehicle dynamics of Samara-like configuration.

It is another object of the present invention to provide a robotic Samara-based micro air vehicle uniquely suited to performing covert and reconnaissance missions which is easily deployable in an area of interest.

A further object of the present invention is to provide a robotic Samara micro air vehicle permitting the ON-board and OFF-board control of flight parameters and trajectory via the controllable orientation of the wing.

It is a further object of the present invention to provide a micro/nano unmanned aerial system using unconventional Samara inspired planform geometry and airfoil cross-section performing stable autorotation and capable of landing at terminal velocity without sustaining damage.

It is another object of the present invention to provide a winged seed configured miniature mono-wing aircraft with an improved wing geometry adapted for optimal descent.

It is also an object of the present invention to provide a micro air vehicle using a miniature propeller controllably spinning in plane selected to increase the roll stability and steady hovering of the aircraft.

In one aspect, the present invention is related to a miniature mono-wing aircraft apparatus in which wing is configured in the shape of a winged seed (Samara) of a maple tree capable of steady hovering and autorotation, and which can be maneuvered in vertical as well as horizontal directions, as well as desired turning trajectories by controlling of the wing's orientation in space.

The vehicle, in addition to the single wing, includes a fuselage member (also referred to herein as a holder member) flexibly attached to the wing in proximity to the center of mass thereof with a propeller coupled to the fuselage member and controllably rotating around the rotation axis extended at a predetermined angle relative to the pitch axis of the wing for creating rotational motion of the aircraft about the vertical axis of inertia in the most stable fashion.

The wing is attached to the fuselage member via a servo mechanism which is controlled to change the orientation of the wing selectively as required by a desired mode of operation, flight parameters, and trajectory of flight.

The holder member (or fuselage) carries batteries and electronics thereon. Due to the efficiency of the energy consumption in the autorotation mode of the air vehicle in question, small batteries will provide a substantial support for autonomous flight of the vehicle.

The electronics embedded into the micro air vehicle may include an onboard microcontroller for autonomy operation. The embedded electronics further includes a receiver for receiving input control signals (thrust, wing pitch, coning) from an offboard controller. The controller includes a processing unit configured in accordance with an algorithm corresponding to the control model underlying the operation of the air vehicle in question.

The control model for robotic Samara air vehicle is based on a linear model for the heave dynamics in hovering flight which was identified from data collected during extensive experimentations using visual tracking system. The linear model describes the reaction of the vehicle system to a force imposed by a control input to the wing and/or the propeller used in the system. The controller unit of the micro/nano Samara aircraft is envisioned either as a closed- or open-loop controller, and may include a feedback control unit based on Proportional-Plus-Derivative-Plus-Integral (PID) control principles. A model of the wing's pitch input-to-heave velocity transfer function, as well as other input/output relationships, have been identified, including heave velocity and altitude changes based on collective pitch control input signal and stability of the system.

An optimal design of the wing permitting the slowest descent speed has been identified from a plurality of different models and includes the parameters of the chord geometry as well as dimensions of the wing, and position of the center of gravity of the wing. It is preferred that the leading edge of the wing is formed with an increased thickness relative to the body of the wing and the trailing edge to attain optional descent.

In another aspect, this present invention is a method of operating a miniature mono-wing aircraft. The method includes the steps of:

flexibly attaching a single wing to a fuselage member where the wing is configured in a shape of a winged seed (Samara);

securing a propeller to the fuselage member to rotate in a predetermined plane selected to provide a stable roll and hovering for the rotational motion of the aircraft; and controlling the operation of the aircraft by applying respective control signals (pitch, thrust) to the wing and/or the propeller at predetermined time intervals.

Control of the vertical displacement of the aircraft is performed by actuating the propeller to a predetermined rotational speed which causes the aircraft to spin around the vertical axis of inertia resulting in a vertical upside motion of the aircraft.

In order to control a direction of the aircraft displacement, the control signals corresponding to the collective pitch are applied to the wing to control its orientation. In order to control the horizontal displacement of the aircraft, respective control signals are applied to the wing and the propeller in an impulsive fashion for timed variations in the wing orientation and rotational speed of the propeller at desired points of the aircraft rotational trajectory. In order to control the turning motion of the aircraft respective control signals corresponding to the wing pitch, are applied to the wing in sustained non-impulsive fashion to change the turn radius of the flight path. The aircraft is also operated in the autorotation mode to descend from a predetermined altitude. For this the propeller may be deactuated, or the propeller rotation rate is kept at a low predetermined level, and by controlling the orientation of the wing, a controlled descent mode is obtained.

These and other objects of this invention will be apparent upon a reading of the following detailed description of the invention in conjunction with the Patent Drawings Figures.

BRIEF DESCRIPTION OF THE DRAWINGS

FIG. 2A is a representation of the planform of the wing of the aircraft of the present invention, FIG. 2B is a representation of the cross-section of the wing taken along line A-A in FIG. 2A, FIG. 2C is a cross-section of the wing taken along line B-B of FIG. 2A, and FIG. 2D is a representation of retro-reflective marker placement on the wing;

FIG. 2E shows a planform geometry of the mechanical Samara adapted for optimal aerodynamics in accordance with Reynolds number distribution;

FIG. 2F presents a diagram of chord geometries of the mechanical Samara which are given an increasing camber towards the tip of the wing;

FIG. 2G is a diagram of the Reynolds number vs. wing radius;

FIGS. 3A-3D are representations of the mechanical Samara wings having different geometries;

FIG. 4 is a diagram representing the Reynolds number versus span length of the wing models shown in FIG. 3A-3D;

FIG. 16A is a front view of the aircraft, FIG. 16B is a side view of the aircraft, FIG. 16C is a top view of the aircraft, and FIG. 16D is a perspective view of the aircraft of the present invention;

DETAILED DESCRIPTION OF THE PREFERRED EMBODIMENTS

Nomenclature

Figures 1A, 2:
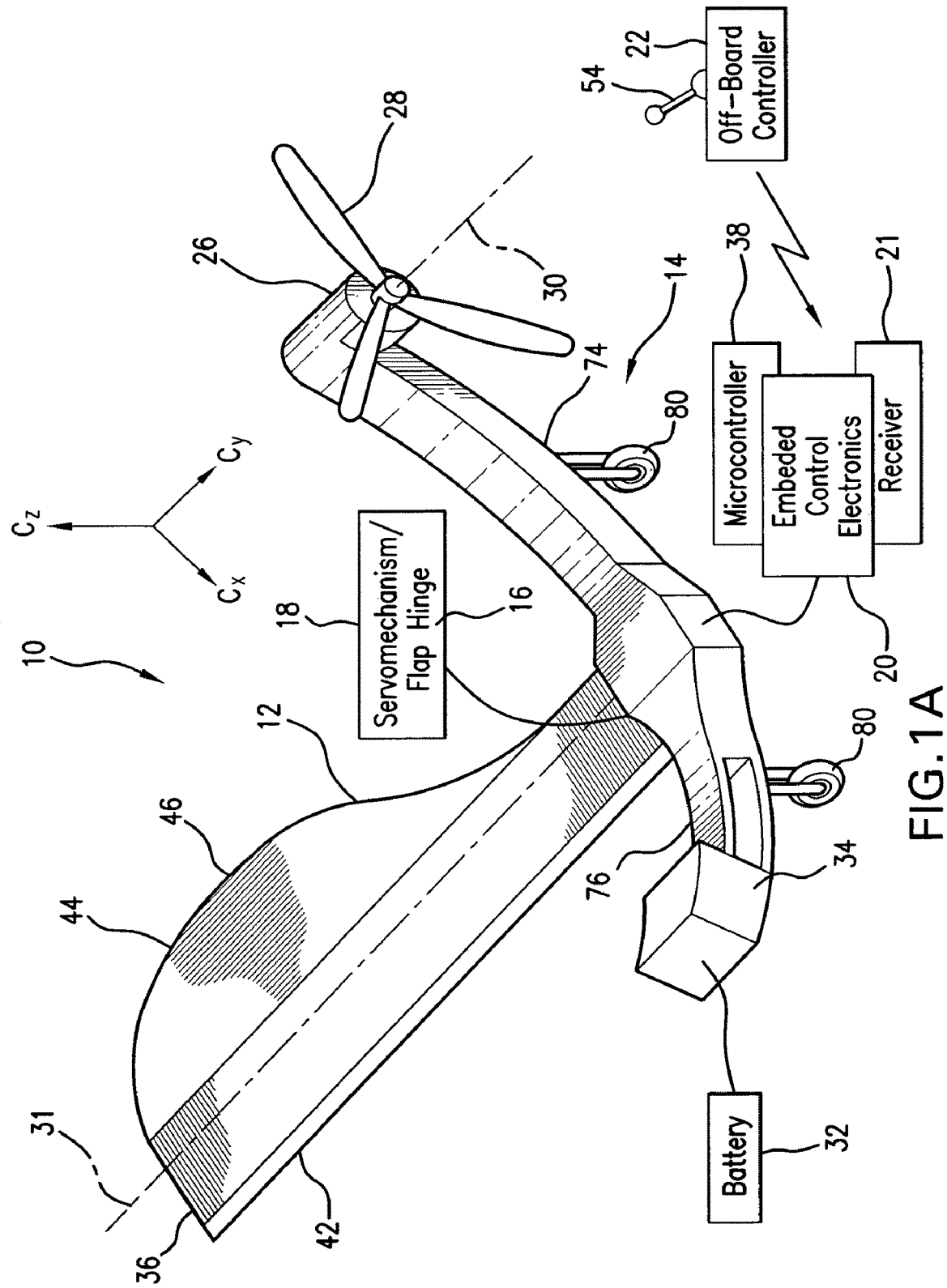
FIG. 1A is a perspective view of the micro/nano mono-wing aircraft of the present invention in an enlarged scale for clarity.

A=dynamics matrix
B=control matrix
C=output matrix
dy=differential element
$F_{CF}$=centrifugal force
$F_G$=gravity force
$F_p$=propulsive force
$F_{W_D}$=drag force
$F_{W_L}$=lift force
$G_p(s)$=plant transfer function
$I_x, I_y, I_z$=principal moments of inertia
K=static gain
K(s)=controller
$K_d$=derivative gain
$K_i$=integral gain
$K_p$=proportional gain
p, q, r=rotational velocities
$R_{BF}$=transforms fixed frame F to body frame B
$R_{xx}$=input autospectral density
$R_{xy}$=input/output cross-spectral density
$R_{yy}$=output autospectral density $T_{pl}$=time constant
u, v, w=translational velocities
W(s)=heave transfer function
$\dot{\omega}$=heave acceleration
X=state vector
x, y, z=inertial frame position
Y=control input
$Y_d$=reference value
$Z_\omega$=heave stability derivative
$Z_{\theta_0}$=collective pitch stability derivative
β=coning angle
$\epsilon_i$=infinitesimal quantity
Θ(s)=collective pitch transfer function
$\theta_0\epsilon[-1,1]$=control input
φ, θ, ψ=Euler angles
c Chord length
s Span length
v Signal noise
k Measurement model
X Deterministic signal
a, b Fourier series coefficient
$r_{CG}$ Radius of precession of the center of mass
$Y_C$ Wing area centroid distance from center of mass Subscript
i Index of series Superscript
^ Estimate Referring to FIGS. 1A-1B, 15, and 16A-16D, the robotic micro/nano mono-wing aircraft 10 includes a wing (airfoil) 12 flexibly coupled to a holder member (also referred to herein as a fuselage) 14. The flexible connection of the wing 12 to the fuselage 14 is through the flap hinge 16 which is operable by a servo controlled mechanism 18. The servo mechanism 18 controls the orientation of the wing 12 to provide lift and centrifugal force balance, as well as maneuverability of the aircraft 10 to attain a desired mode of operation, flight parameters, and flight trajectory, as will be presented in further paragraphs.

The wing (also referred to herein as mechanical Samara) 12 is configured similar to a winged seed (Samara) of the maple tree. The dimensions and geometry of the mechanical Samara wing are optimized herein for minimal descent rate and optimal aerodynamics qualities as will be presented infra herein.

The wing 12 is configured with substantially straight front edge 42 and a curved rear edge 46 contouring the region 44 of the wing. Both the rear edge 46 and the region 44 are narrower than the thick front edge 42 in their respective cross-sections, as will be presented further herein. As presented in FIGS. 2E-2G, the mechanical Samara wing design is tuned for its low Reynolds number environment. The aerodynamics of the robotic Samara is subject to the scaling of Reynolds number Re, which is the ratio of inertial to viscous forces, and is a measure of the flow conditions over a body immersed in a fluid.

To achieve peak performance it is desirable to have the lifting surface of a wing operate at its maximum lift-to-drag ratio (L/D) as this is a measure of the wing's aerodynamic efficiency. The factors which determine L/D include wing geometry and surface roughness which influences the flow conditions over a given airfoil.

It was found the maximum L/D performance of various airfoils vs. Reynolds numbers dramatically changed above Re=70,000 for smooth airfoils, whereas rough airfoils exhibited a steady increase with Reynolds number and out-performed smooth airfoils below Re=$10^5$. The variation of Reynolds number with span length for a robotic Samara shown in FIG. 2G, crosses this performance boundary at the out-board section of the wing, e.g., between the geometric center line and the tip of the wing, as shown in FIG. 2E. It is therefore advantageous to distribute the wing area (area centroid Ym) to the wing area between the geometric center line and the tip 36 of the wing, such that the largest chord sections are collocated with the largest Reynolds number thereby increasing the maximum L/D for that wing section. This approach is as well based on findings from the autorotation experiments which indicated that an increase in the distance of the area centroid Ym from the center of rotation leads to an increase in the efficiency of the wing which is measured by the descent rate. The diagram of chord geometries shown in FIG. 2F, presents an increased camber towards the tip of the wing. This is beneficial to increase the angle of attack with the most lift and the least drag in order to operate the aircraft in a most efficient aerodynamic state.

This approach differs from full scale conventional rotor design which seeks to minimize power losses by creating a uniform inflow over the rotor disk. This novel approach results in a rotor blade with large chord sections at a high angle of attack, close to the center of rotation, and small chord sections at lower angles of attack farther from the center of rotation. The ideal rotor blade at full scale results in each chord section operating at maximum L/D. This novel geometry of the wing also effectively decreases the skin friction drag.

Figure 16A:
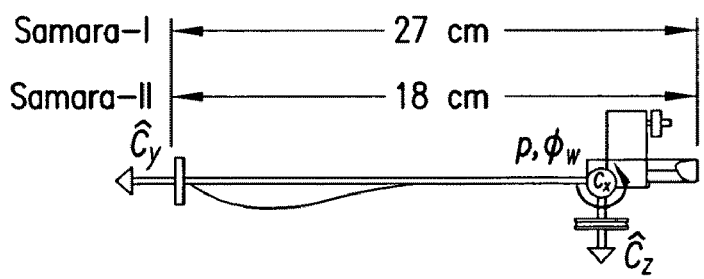
FIGS. 16A-16D are schematic representations of the mono-wing aircraft of the present invention showing roll (p), pitch (q) and yaw (r) definitions for body-fixed coordinate system B; where
Figure 16B:
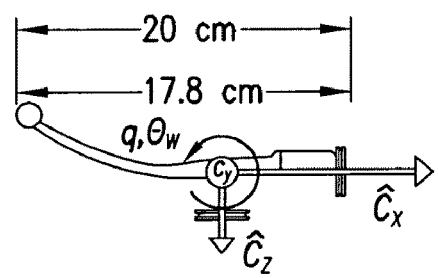
Figure 16C:
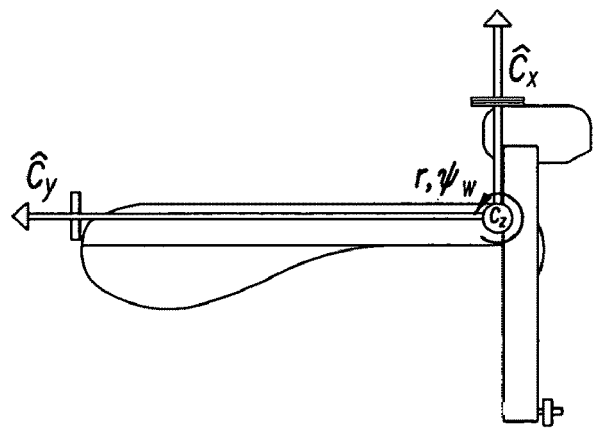
Figure 16D:
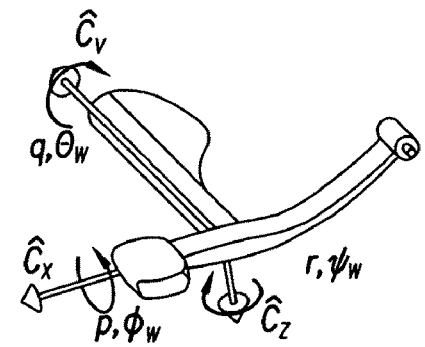

The fuselage member 14 has a C-shaped body along its longitudinal axis $C_x$ shown in FIG. 16D. The fuselage 14 provides a structural support to the wing 12 to change the orientation, while the wing 12 provides the lift to the aircraft. The fuselage also carries the embedded electronics 20, source of propulsion force (for example, motor/propeller), and the power source.

A miniature motor 26, for example, a DC brushless 5 W motor, is secured at a rear end of the fuselage 14. At least one propeller 28 is attached to the rotation axis 30 of the motor 26 to rotate in the plane $C_x$, $C_z$ (or in a predetermined angle relative the same) to create a controlled thrust force $F_p$. Variations in the wing pitch which are controlled through the servo control mechanism 18, as well as changes in the propeller force $F_p$, may each contribute into the vertical motion of the aircraft in an upside or downside direction.

It is to be understood that the motor/propeller arrangement illustrated herein is presented as an example only, and any means capable of producing a propulsion force at the location of the propeller/motor is contemplated in the present system. The propeller 28 may be preferably a 3-bladed propeller. However, any number of propeller blades are envisioned in the subject aircraft.

Figure 1B:
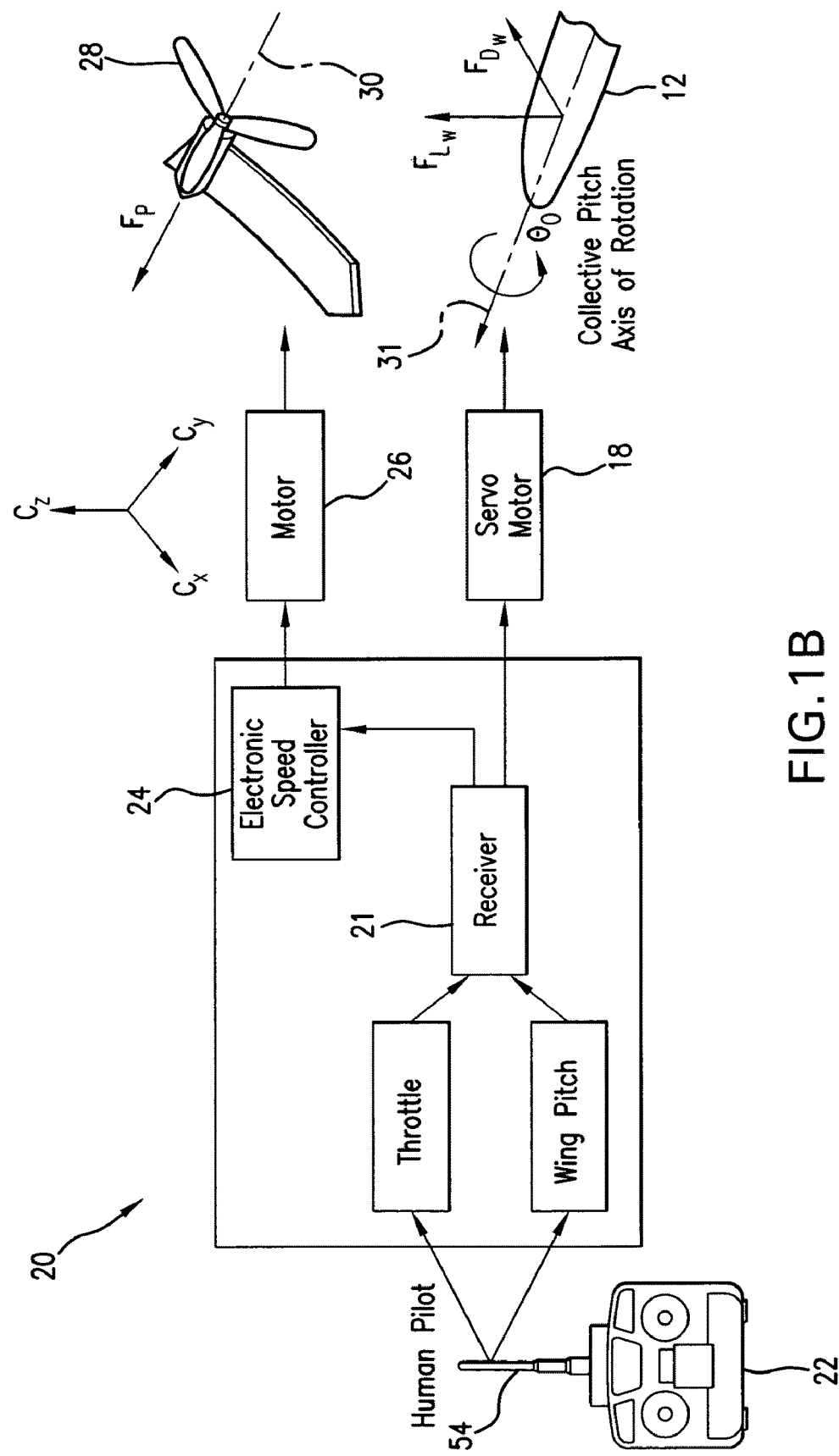
FIG. 1B is a schematic representation of controller scheme of the aircraft of the present invention.
Figure 40:
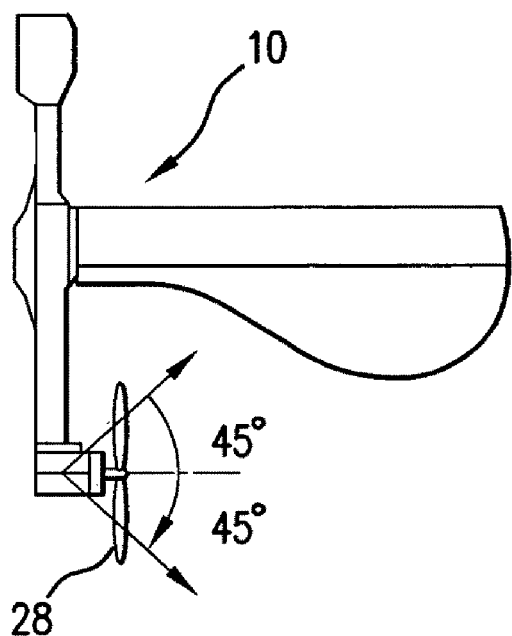
FIG. 40 is a schematic representation of the alternative location of the propeller.
Figure 41:
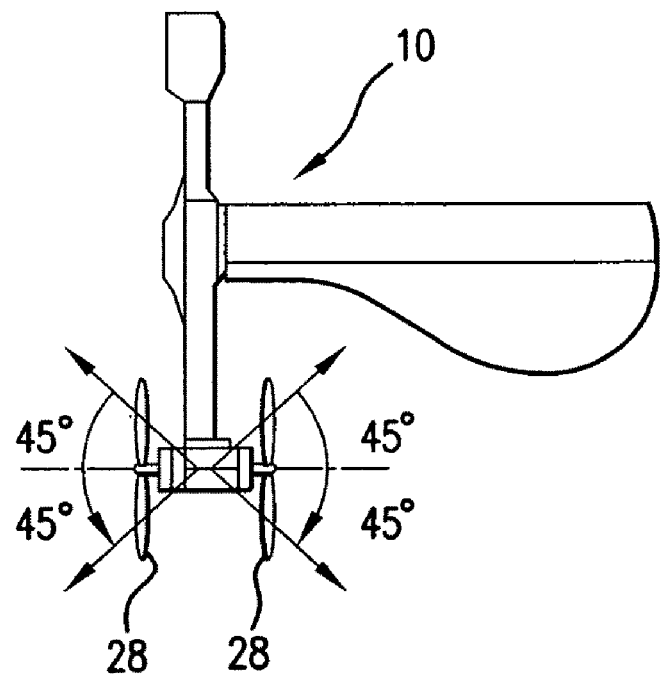
FIG. 41 is a schematic representation of a double motor/propeller design.

Referring to FIG. 40, the orientation of the propeller 28 may be opposite to that shown in FIGS. 1A-1B. Also, as shown in FIG. 41, a double motor/propeller setup may be used, as will be presented infra herein.

In the configuration presented in FIG. 1A, the aircraft structure provides a high degree of flexure in the direction $C_z$ and a high degree of stiffness in the plane of rotation ($C_x$, $C_y$ plane). The angle at which the motor 26 is attached provides a protection from ground impingement on takeoff. The centrifugal load deforms the structure thereby increasing the distance of the motor from the center of rotation thus increasing the applied torque. Since the propeller 28 in the aircraft is spinning in the $C_x$, $C_z$ plane, or at a predetermined angle thereto, and thus opposes the applied torque along the $C_x$ axis, the aircraft has additional stability in hovering.

A battery 32 is mounted in the fuselage 14, for example to the front end 34 thereof (opposite to the end to which the motor/propeller are attached) to power the operation of the embedded control electronics 20, servo control mechanism 18, as well as motor(s) 26 rotating the propeller(s) 28. For example, a LiPo battery may be used.

For increased mechanical strength, a landing gear 80 is provided which includes a carbon fiber rod attached to the fuselage. The landing gear 80 protects the propeller from impact with the ground on take-off, and landing. The landing gear 80 may include wheels which may be attached either to both arms 74 and 76 of the fuselage, or alternatively, a single wheel may be needed in proximity to the propeller/motor. The location of the landing gear 80 varies with the size and location of the propellers. The landing gear design is contingent on the surface it is to take-off or land upon.

The autopilot system (on-board microcontroller) 38 which is a part of the embedded control electronics 20 permits the aircraft to maintain its own vertical position. The horizontal motion of the aircraft may be controlled through precisely timed variations in wing orientation and rotational speed of the propeller at desired points along the aircraft rotation.

The aircraft 10 is equipped with control electronics 20 which are embedded into the fuselage 14 to control the operation of the air vehicle 10. Both the ON-board microcontroller and the OFF-board remote control are contemplated in the subject aircraft system, based either on the closed-loop or open-loop control principles to be discussed.

The ON-board microcontroller 38 as a part of the embedded control electronics 20 is envisioned in applications which require full autonomy of the Samara aircraft operation. Alternatively the remote piloting of the aircraft 10 permits transmission of the control input parameters from an OFF-board controller unit 22 to the embedded control electronics 20. The control electronics 20 includes a receiver (or transceiver) 21 for one- or two-directional communication with the OFF-board control unit 22.

Referring again to FIG. 1B, the controlling scheme, either in the ON- or OFF-board arrangement, uses input control signals (throttle, wing pitch) generated by a processor unit (not shown) either on-board or off-board. The processor unit operates based on software capable of generating input control signals depending on a desired result (mode of operation, flight control model and trajectory). The relationships between the input and output parameters have been established for the subject aircraft in the course of extended experimentations presented further herein.

The input control signals are coupled to the ON-board receiver 21. The receiver 21 transmits the processed input control signals related to the throttle to an electronic speed controller 24 for further control of the motor 26. Also, the receiver 21 couples the data corresponding to the input wing collective pitch $\theta_0$ to the servo mechanism 18 to control the orientation of the wing 12 of the subject aircraft 10 around the pitch axis 31 of the wing 12.

Figure 15:
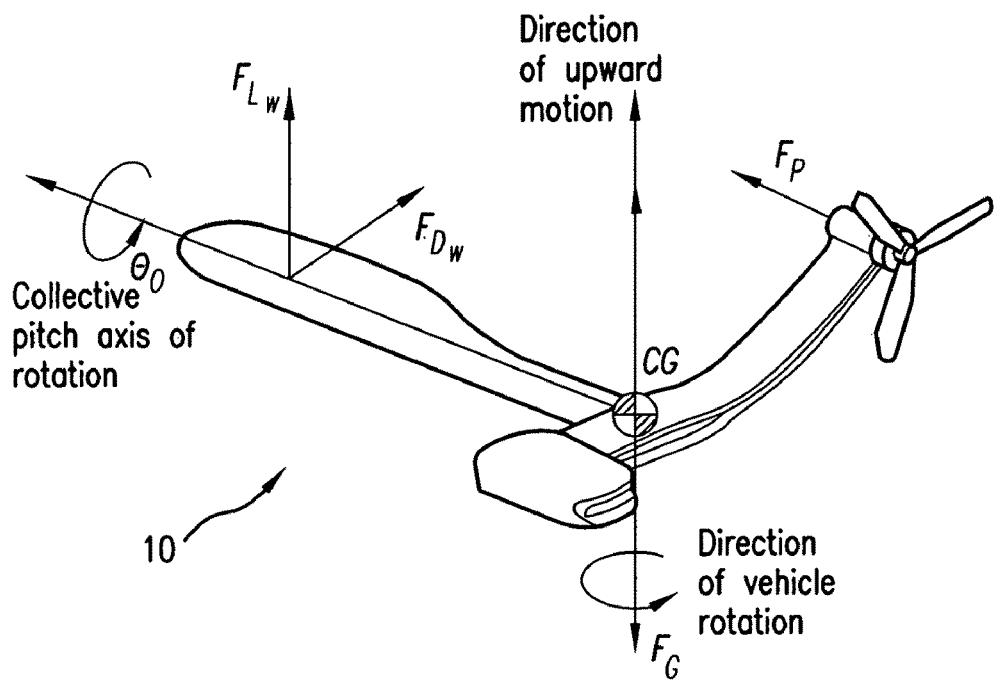
FIG. 15 is a free body diagram of the mono-wing aircraft of the present invention.

Upon actuation of the propeller 28, the aircraft 10 spins itself in a circle around the axis vertical axis shown in FIG. 15 (several rotations per second) and creates lift that causes inverted aircraft vertical motion along the axis $C_z$. By controlling the orientation of the wing 12 through the changes in the pitch and coning angle of the wing, the trajectory of the aircraft's motion is controlled.

If equipped with an onboard camera, the rotational motion of the aircraft 10 permits collection of a full 360° panoramic view of surroundings. Detailed 3-D images of the aircraft's environment may thus be obtained if needed. Being of micro/nano scale, a large number of aircrafts 10 may be deployed in an area of interest at a relatively low cost for the intended missions.

Being based on a natural Samara wing seed configuration, the aircraft 10 is suited for an autorotational mode of operation for descent from a specific altitude in power "off" mode of operation, and therefore thus constitutes an efficient air vehicle system, permitting autonomous operation.

The overall weight of the aircraft including the embedded control electronics (payload), motor, propeller, battery and the wing in the range of 30-75 grams with the wing span dimensions being no greater than 16 cm. The vehicle takes off from the ground and hovers for roughly 10 minutes. The structure supports a useful payload, for example the embedded electronics package, of approximately 5 grams.

Extensive study and experimentation has been conducted for a plurality of wing geometries to find the optimal geometry of the wing for minimal descent rate, to produce a quantitative Fourier series representation of the roll and pitch of the wing, and establish a relationship between parameters for the prediction of descent velocity as well as ratios of precession.

Experimental methology and data processing intended to characterize the other rotation efficiency and the vehicle dynamics, as well as the impact of the wing chord length variation on the descent velocity and altitude dynamics will be described further herein. This characterization has provided a baseline for mechanical Samara planform design and provided insights into lift production of Samara based micro/nano air vehicle. The data aids in the development and verification of the dynamic/aerodynamic six-degree-of-freedom mechanical Samara model.

Physical Model of the Samara Wing

The models of mechanical Samara were designed by the planform geometry A41, B41, C41 and D41, shown in FIGS. 3A-3D. The geometry of the models tested are not simple scaled-up versions of natural Samaras. Design of the wing (also referred to herein as mechanical Samara) involves precise placement of the center of mass, since a poor choice results in a less stable and efficient autorotation. The low Reynolds number flight regime of the mechanical Samara (shown in FIG. 4) requires a non-standard airfoil cross-section which is based on geometric properties observed in natural Samaras.

A thick leading edge in a Samara wing results in a 33% decrease in descent velocity. For this reason, each mechanical Samara model 40 shown in FIGS. 2A-2D, was designed with identical cross-sectional properties which include: thick leading edge 42 (about 1.54 mm) followed by about 0.1 mm thick region 44 that extends to the trailing edge 46.

Being designed with similar cross-sectional properties, each model, however, differs from each other in the chord line 50 length. The distribution of mass of each mechanical Samara model uniquely configured with the thick leading edge 42 followed by the thin region 44 extending to the trailing edge 46 along the chord line 50 is required for stable autorotation.

Figure 2A:
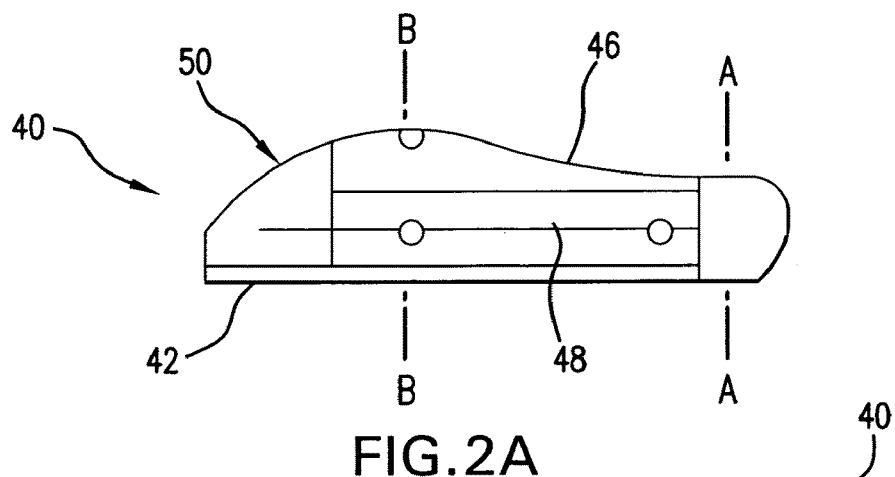
FIGS. 2A-2D show structural and geometric details of the wing of the aircraft of the present invention.
Figure 2B:
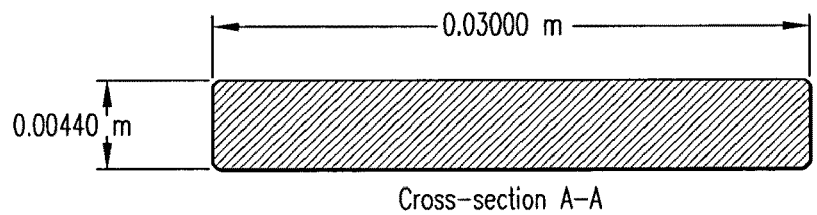
Figure 2C:
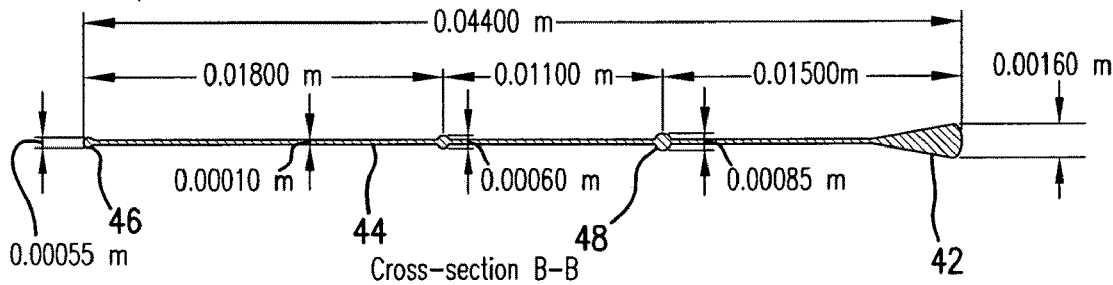

Each cross section may contain longitudinal stiffeners 48 positioned for example at 0.55 mm, 0.6 mm, and 0.85 mm distance from left to right on the airfoil cross section, as shown in FIGS. 2A and 2C. Stiffeners span the length of the model 40 and are used for structural rigidity and integrity of the model.

The models were designed using CAD software capable of calculating precisely the model surface area and the location of the center of mass, as well as overall model mass. These parameters are held constant over the four different models shown in FIGS. 3A-3D.

The CAD model can then be exported as a stereo-lithography file (STL), which is a representation of the Samaras geometry as approximated by triangles of varying dimension. This data is then used by the Eden350 software to create the physical prototype. The tolerances of the machine are 42 μm in the X-Y plane, and 16 μm in the Z-plane. Subjects are built in the same orientation on the machine to ensure similarity between models. The models were built from the resin Vero-Black chosen for its high color contrast with reflective markers used in the experimentations, and its material properties listed in Table 1.

TABLE 1

Mechanical Samara material properties, VeroBlack

| Property | ASTM | Unit | Value |
|---|---|---|---|
| Tensile Strength | D-638-03 | Mpa | $5.070 \times 10^1$ |
| Modulus of Elasticity | D-638-04 | Mpa | $2.192 \times 10^3$ |
| Flexural Strength | D-790-03 | Mpa | $7.960 \times 10^1$ |
| Flexural Modulus | D-790-04 | Mpa | $2.276 \times 10^3$ |
| Density | | $Kg/m^3$ | 1118 |

The mechanical Samara tested have the physical properties listed in Table 2. it should be noted that all mechanical Samara are planar symmetric, for zero twist. The inertias in Table 2 lack the final addition of the marker mass, however the final mass does include this addition.

TABLE 2

Physical Properties of the mechanical Samara

| NAVE | | | A41 | B41 | C441 | D41 |
|---|---|---|---|---|---|---|
| $1^{st}$ Principal Inertia | $I_{11}$ | $Kg \cdot m^2$ | $8.99e^{-6}$ | $6.92e^{-6}$ | $9.32e^{-6}$ | $6.93e^{-6}$ |
| $2^{nd}$ Principal Inertia | $I_{22}$ | $Kg \cdot m^2$ | $4.39e^{-7}$ | $5.05e^{-7}$ | $4.5e^{-7}$ | $5.99e^{-7}$ |
| $3^{rd}$ Principal Inertia | $I_{33}$ | $Kg \cdot m^2$ | $9.42e^{-6}$ | $7.41e^{-6}$ | $9.76e^{-6}$ | $7.52e^{-6}$ |
| Radius | | m | .1686 | .15 | .1683. | .1359 |
| Mass | | Kg | .0526 | .0526 | .0526 | .0526 |
| Surface Area | | $m^2$ | $1.24e^{-2}$ | $1.24e^{-2}$ | $1.24e^{-2}$ | $1.24e^{-2}$ |

Figure 5A:
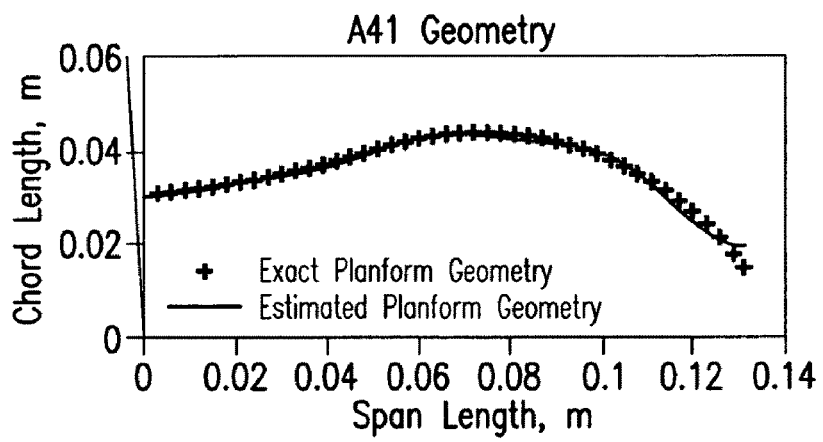
FIGS. 5A-5C are diagrams representing the wings planform geometry and Fourier series approximation versus span length for A41, B41, and C41 models, respectively.
Figure 5B:
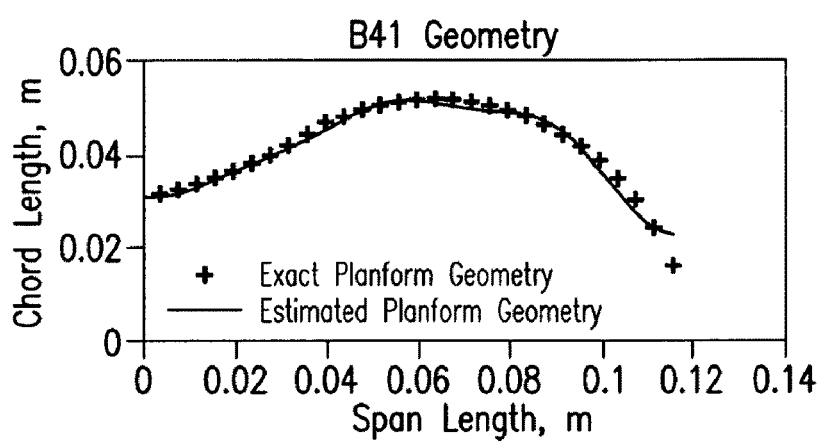
Figure 5C:
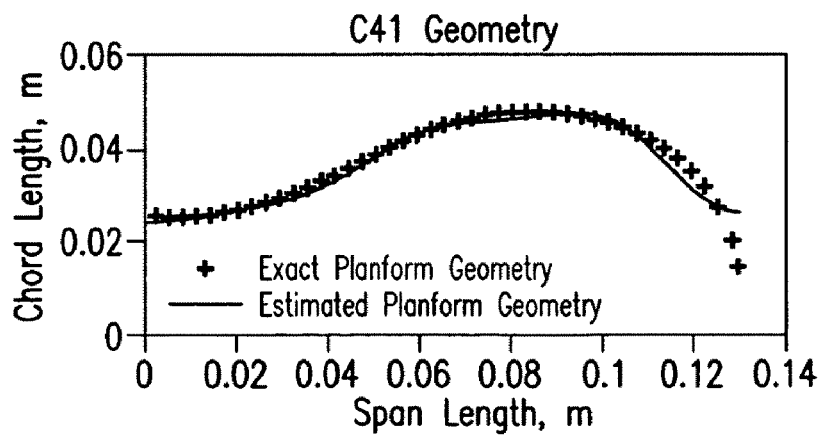

The geometry of the planform area for A41, B41 and C41 models is represented through Fourier series approximation of the chord as it varies with the radius, as presented in FIGS. 5A-5C. Each of the approximated geometries are reported with the mean square fit error.

The coefficients of the Fourier series corresponding to the above geometries is detailed in Table 3, for the series:

$$\hat{c}(s) = \alpha_0 + \sum_{n=1}^{6} \alpha_n \cos n\pi s \quad (1)$$

TABLE 3

Fourier series coefficient for Samara geometry
Samara Model

| Fourier Coefficients | A41 | B41 | C41 |
|---|---|---|---|
| $a_o$ | .0358 | .0414 | .0362 |
| $a_1$ | .001 | −.0006 | −.0071 |
| $a_2$ | −.0084 | −.0113 | −.0085 |
| $a_3$ | .0032 | .0029 | .004 |
| $a_4$ | −.0017 | −.0024 | −.0017 |
| $a_5$ | .0012 | .0019 | .0019 |

TABLE 3-continued

Fourier series coefficient for Samara geometry
Samara Model

| Fourier Coefficients | A41 | B41 | C41 |
|---|---|---|---|
| $a_6$ | −.0011 | −.0012 | −.0013 |
| MSE | $1.20 \times 10^{-4}$ | $0.8 \times 10^{-4}$ | $3.70 \times 10^{-4}$ |

The Geometry of the NAVE D41 model is calculated from the schematic provided in FIG. 3D.

Experimental Setup

To capture the flight dynamics of the mechanical Samara, a vision based motion capture is considered the most accurate technique. The VICON vision system was used which eliminates the need for costly micro-scaled sensor packages. The system collects data by capturing 2D images of the subject which is fitted with retro-reflective markers. The VICON system strobes light at the frame rate of the camera. The light incident on the surface of the marker returns to its source, reducing errors commonly caused by interference. The light returned to the lens allows for a quick computation of the centroid of the marker. Three-dimensional position is obtained from a least-squares fit of the 2-D camera observations. The setup of the workspace was tracked in real time by the VICON system, and allowed the mechanical Samara to fall a distance of 8 mm before flight data was recorded.

A simple mechanical grip release mechanism was used to hold the mechanical Samara at a predetermined angle. This release mechanism was mounted ~12 m above the ground, and the mechanical Samara was released after transient motion has been eliminated with the physical contact the mechanism makes with the platform mounted to the ceiling. Each Samara was placed into the gripper, and hoisted to the ceiling by an attached thread of monofilament.

In order to minimize wind disturbances which may effect the flight dynamics, these experiments were conducted in a room which had no ventilation. The test facility encompassed two platforms which provided the area for camera placement. The viewing angle of the cameras is critical in capture as well as for calibration of the system. A minimum of three cameras are needed to calibrate the ground floor plane. This step in the calibration dictates the skew, if any, of the vertical axis.

To avoid potential pitfalls from a poorly calibrated ground-floor-plane, markers were distributed in the area of interest, and the VICON system took an average of the location of the markers which enhances the previously calibrated floor-plane. This calibration results in a least squares estimate of the error associated with the tracking of each marker. Tracking errors for the trials were measured by recording data until the subject was motionless. The resultant measurement characteristics are displayed in Table 4.

TABLE 4

Measurement Characteristic

| Measurement | Symbol | Variance | Unit |
|---|---|---|---|
| Time | t | — | s |
| Position | x, y, z | $0.6128 \times 10^{-3}$ | m |
| Orientation | $\phi, \theta, \psi$ | $7.8000 \times 10^{-3}$ | rad |
| Translational Velocity | u, v, w | $0.2510 \times 10^{-3}$ | m/s |
| Rotational Velocity | p, q, r | $1.2000 \times 10^{-3}$ | rad/s |

The location of markers placed on the subjects is recorded by the VICON system prior to the flight testing. This calibration aids in the proper labeling of reconstructed marker location by excluding erroneous data that falls outside of the possible range of marker location for a given subject. This step also ensures the vision system is able to track the motion of the subject. The subjects are designed with grooves which trace the outline of the intended marker location. Any error in marker location is reduced in the calibration of the subject to the values presented in Table 4. Unlike typical motion capture work which employs spherical marker geometry, in the subject experimentation, a flat circular marker that is 0.007 m diameter and 0.0001 m thick is used.

Figure 2D:
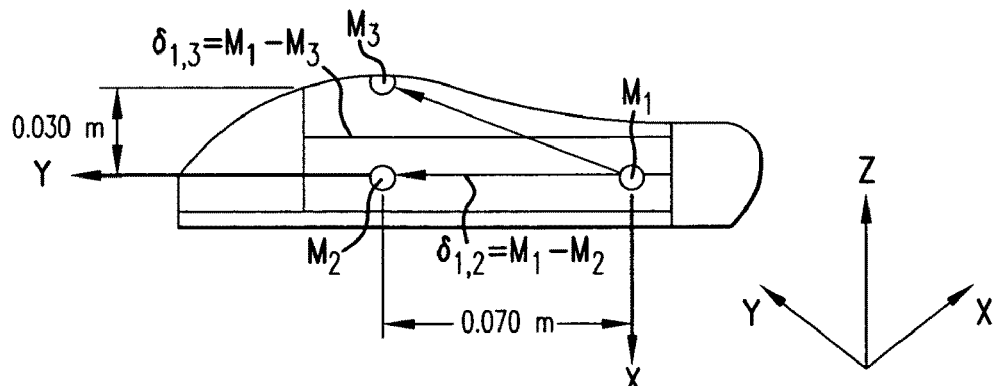
Figure 6:
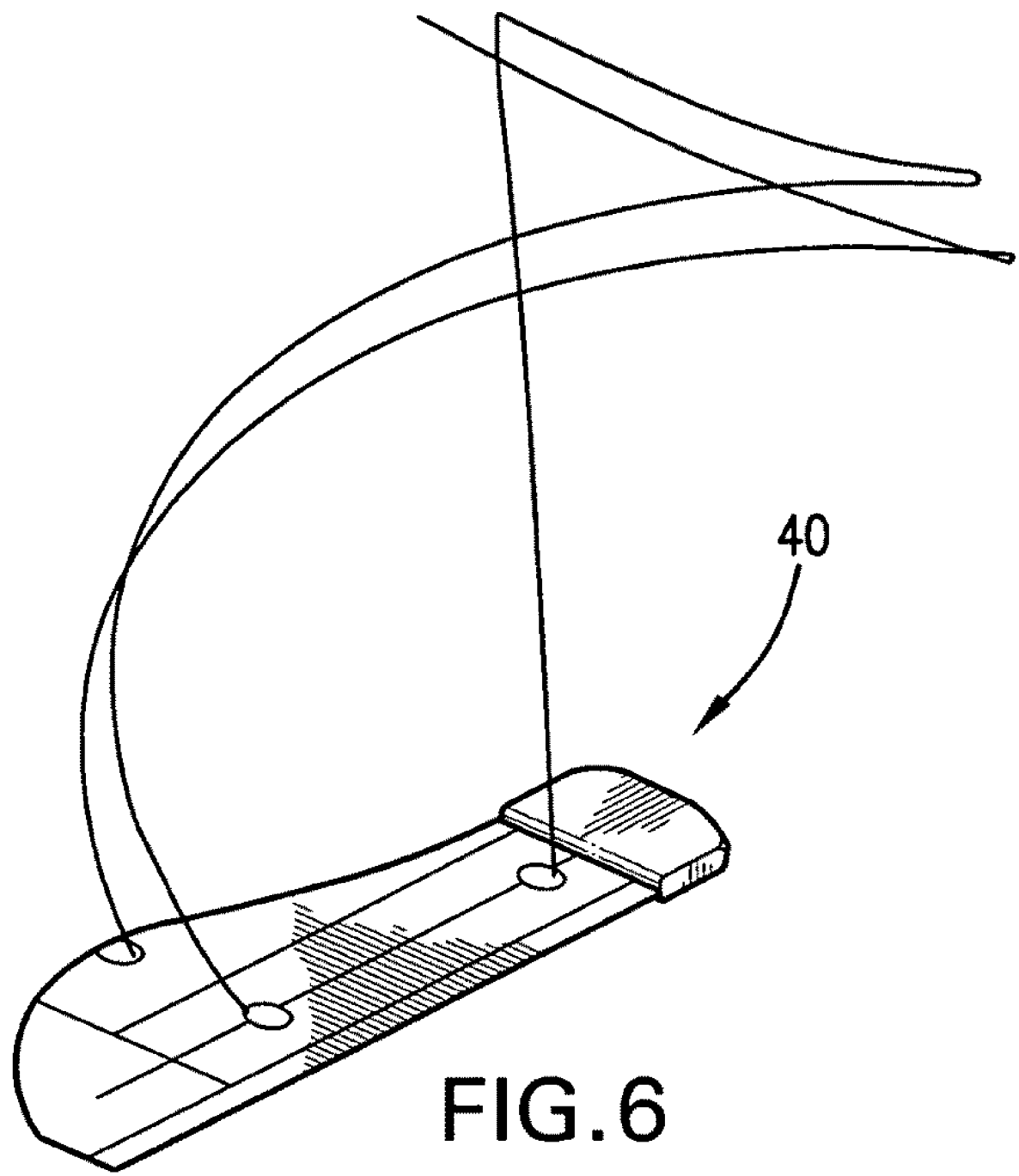
FIG. 6 is a schematic representation of the virtual flight path of the mechanical Samara wing.
Figure 7:
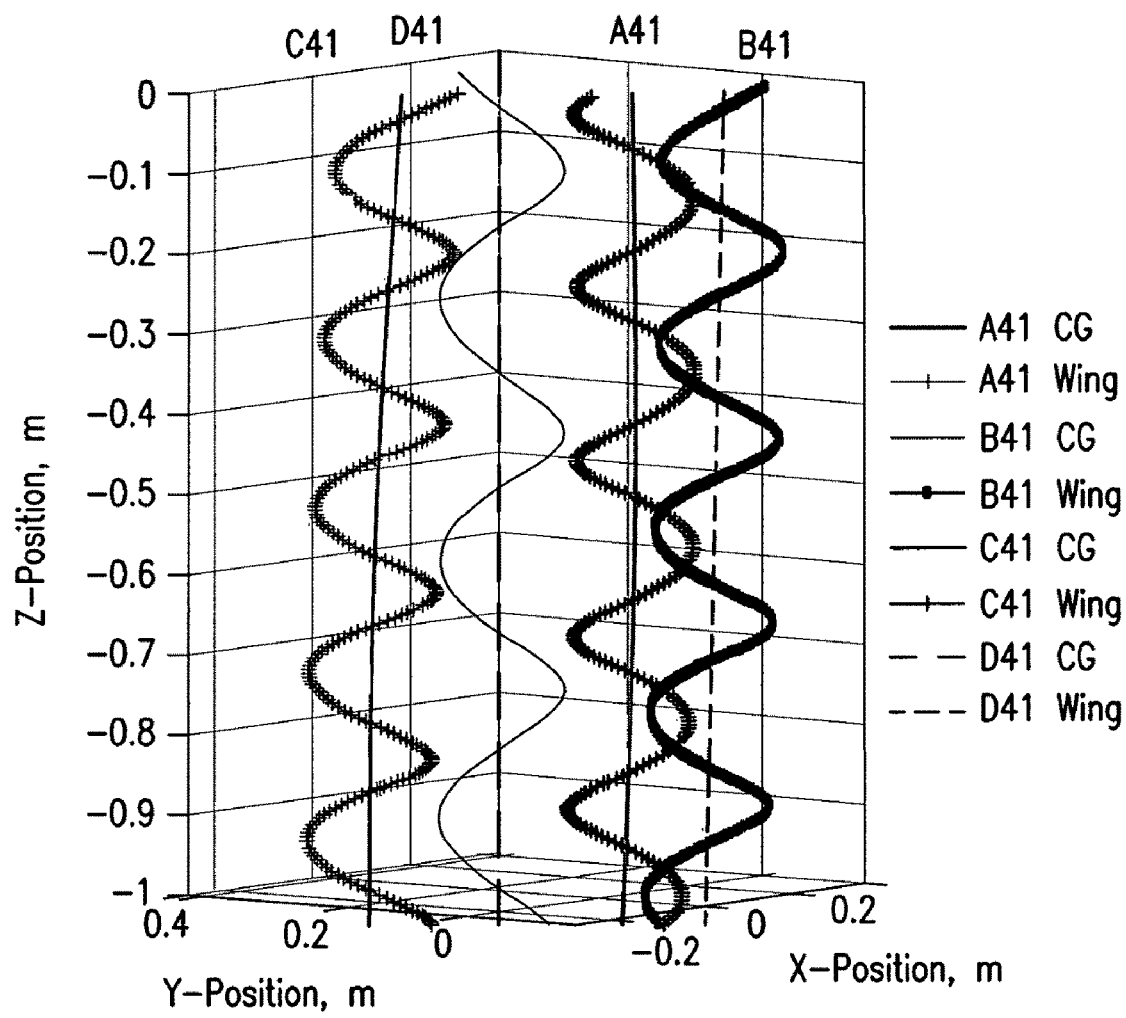
FIG. 7 is a diagram representing the mechanical Samara wing flight path data recorded by VICON during experimentations.
Figure 8A:
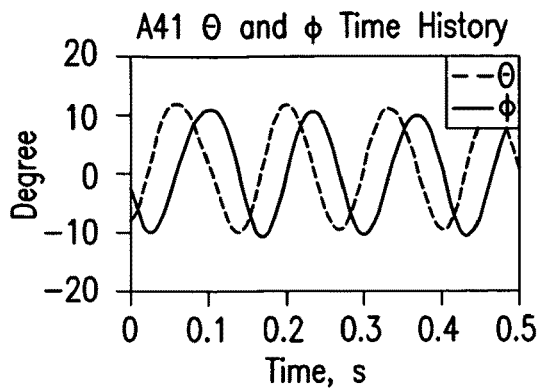
FIGS. 8A-8D are diagrams representing Euler angles computed from flight test data as time history for the models A41, B41, C41, and D41, respectively.
Figure 8B:
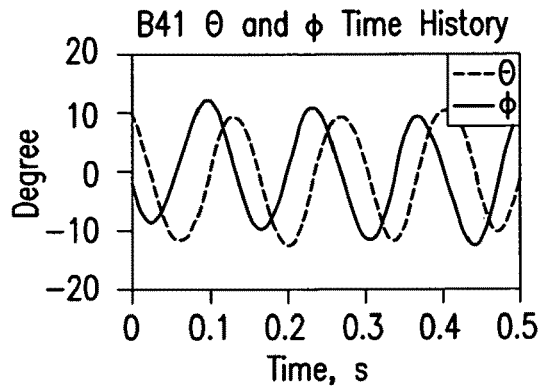
Figure 8C:
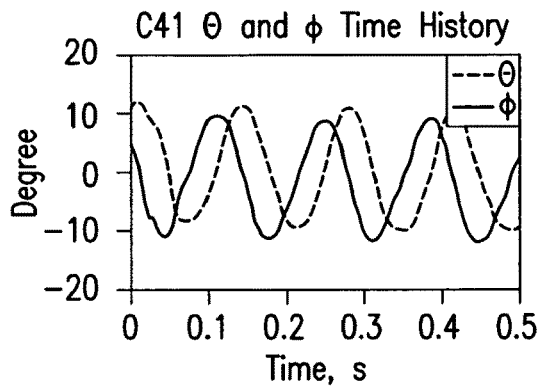
Figure 8D:
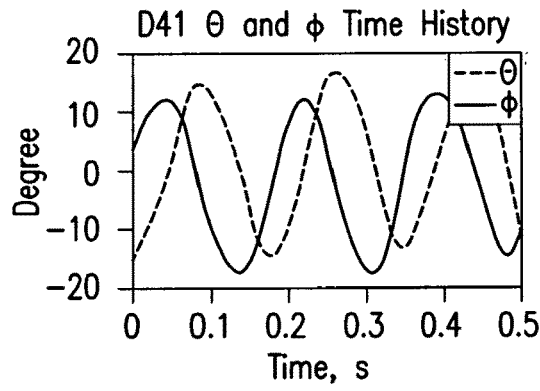

A marker is placed in the same location on both sides of a model and represents a single marker location to the visual tracking system. The conformal markers are intentionally placed on the subject in locations that are raised from the surface. This provides the marker with some three-dimensionality which aids in the vision systems ability to track a subject. The marker discs were made using a hole punch on 3M 7610 high gain reflective sheeting. Three markers are placed on the mechanical Samara model for permitting attitude determination. Marker placement for the rigid body model is shown in FIG. 2D in VICON inertial coordinates. A representative schematic showing the virtual flight path of the mechanical Samara as observed by the vision system can be seen in FIG. 6. The unprocessed flight data for each of the models, as recorded by VICON is shown in FIG. 7.

When working with the VICON software it is necessary to define a rigid body model which defines the degrees of freedom of each of the segments of the subject. This helps to ensure only physically possible solutions are converged upon in the post processing of a trial. The definition of a rigid body is accomplished with a fixed body coordinate system, hence the Euler angles reported for a clockwise descent. It is thus necessary to do an additional rotation of π about the fixed body X-axis to avoid the singularity this introduces in the calculation of the orientation.

Data Reduction and Analysis
Attitude Determination

The 3D marker position data provides a means of resolving the orientation of the mechanical Samara in space. The three markers are sufficient to describe an orthonormal basis from which the rotation matrix representing the Samaras orientation can be formed.

The first vector forms the $\bar{e}_j$-axis in body frame coordinate and is the line from the Samara center of mass to the marker located ~70 mm in the positive VICON Y-direction. The remaining basis require an intermediate vector from which to compute a cross product defining the $\bar{e}_k$-axis as follows:

$$\delta_{1,2} = M_1 - M_2 \quad (2)$$

$$\delta_{1,3} = M_1 - M_3 \quad (3)$$

$$v = \frac{\delta_{1,3}}{\|\delta_{1,3}\|} \quad (4)$$

A schematic detailing the construction of the vector is shown in FIG. 2D.

The intermediate vector $\delta_{1,2}$ can be normalized forming the $\bar{e}_i$ body frame axis. The vector v is formed by normalizing $\delta_{1,3}$. This vector is the used to compute the body frame $\bar{e}_k$ axis. The final body axis is formed in the cross product of $\bar{e}_k$ and $\bar{e}_i$. This set forms the orthonormal basis which defines the orientation of the body with respect to the inertial frame.

$$\bar{e}_i = \frac{\delta_{1,2}}{\|\delta_{1,2}\|} = a_{11} + a_{21} + a_{31} \quad (5)$$

$$\bar{e}_j = \bar{e}_k \times \bar{e}_i = a_{12} + a_{22} + a_{32} \quad (6)$$

$$\bar{e}_k = v \times \bar{e}_i = a_{13} + a_{23} + a_{33} \quad (7)$$

Once the three-dimension marker position is obtained and the basis set of the mechanical Samara body axes are computed, the Euler angles can be deduced from the basis $[\bar{e}_i, \bar{e}_j, \bar{e}_k]$. The Euler angles provide a non-unique set of rotations which can describe the Samaras orientation, however a singularity arises near $\theta = \pm\pi/2$. Away from the singularity the angles are as follows:

$$\theta = \arcsin(-a_{13}) \quad (8)$$

$$\psi = \arctan(a_{11}/a_{12}) \quad (9)$$

$$\phi = \arctan(a_{23}/a_{33}) \quad (10)$$

To maintain continuity of signs between successive time steps near the singularity, an effective solution is to set the angle $\psi = 0$, and compute the final angle ø as:

$$\phi = \arctan(a_{21}/a_{31}) \quad (11)$$

The computed Euler angles of the tested models A41, B41, C41 and D41 are shown in FIGS. 8A-8D, respectively.

Attitude Representation

Subsequent testing of the various mechanical Samara models provided an insight into the governing dynamics as they varied with the geometry.

Attitude representation requires separate basis for the fixed inertial axes (F) and the body axes which is fixed to the Samara (B).

$$F = [\hat{f}_x, \hat{f}_y, \hat{f}_z] \quad (12)$$

$$B = [\bar{e}_i, \bar{e}_j, \bar{e}_k] \quad (13)$$

$$[\vec{r}]_B = R_1(\phi) \cdot R_2(\theta) \cdot R_3(\psi) \cdot [\vec{r}]_F \quad (14)$$

Figure 9:
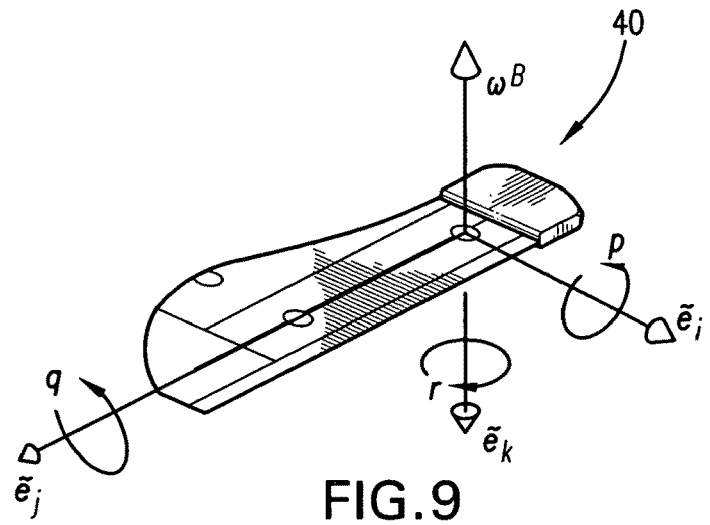
FIG. 9 is a schematic representation of the roll (p), pitch (q), and yaw (r) defined in body fixed coordinate system.
Figure 10A:
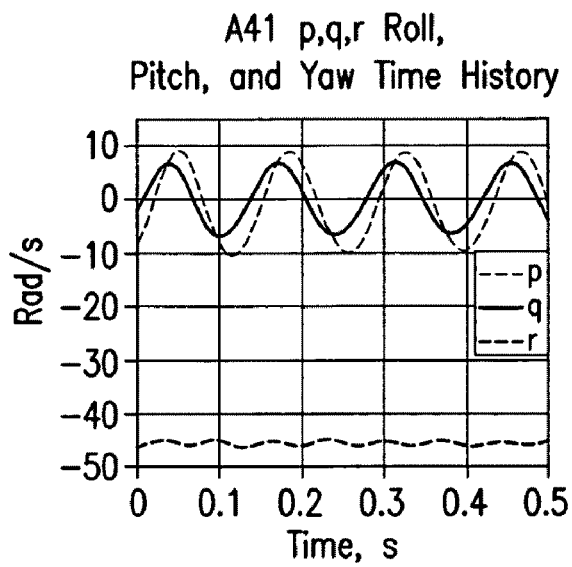
FIGS. 10A-10D are diagrams representing time history of roll, pitch, and yaw rates for the mechanical Samara wing for the models A41, B41, C41, and D41, respectively.
Figure 10B:
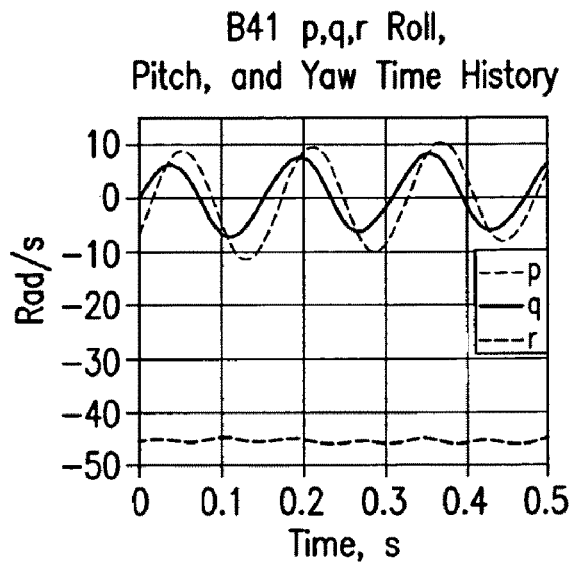
Figure 10C:
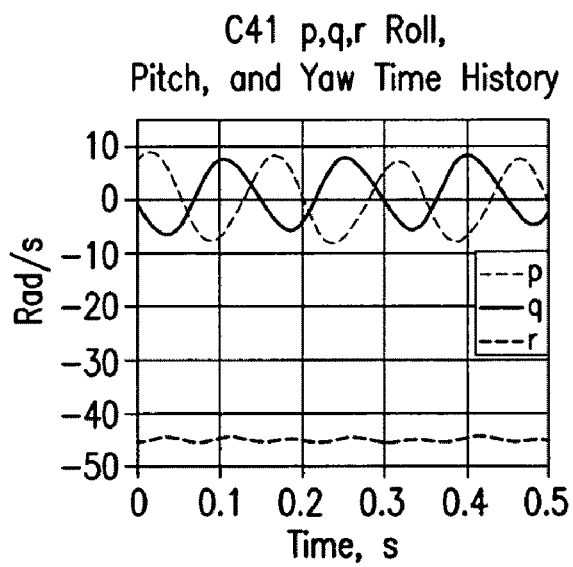
Figure 10D:
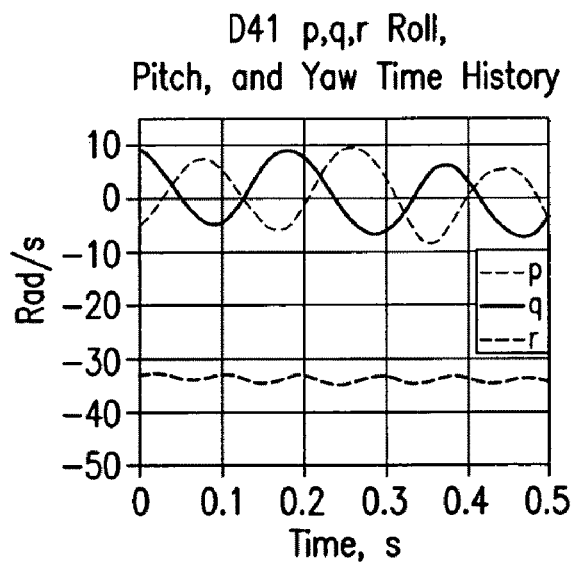

A schematic detailing the axis of these rotations is shown in FIG. 9.

The transformation from the inertial frame to the body frame is described by three Euler angles. The order of rotation is as follows: a 'yaw' rotation ψ about the $\hat{f}_z$ axis, followed by a 'pitch' rotation θ about the new $\hat{f}_y$ axis, and lastly a 'conning' rotation φ about the new $\hat{f}_x$ axis.

This rotation sequence is standard for an aircraft. Rotations in the fixed body frame (B) are orthogonally projected onto the inertial frame (F), which was derived from finite and non-commutative rotations. Thus the body angular rates must be defined separately. The sum of the inner products of each of the inertial angular rates with the body axis of interest yields the body angular rates:

$$p = -\dot{\psi}\sin\theta + \dot{\phi} \quad (15)$$

$$q = \dot{\psi}\cos\theta\sin\phi + \dot{\theta}\cos\phi \quad (16)$$

$$r = \dot{\psi}\cos\theta\cos\phi - \dot{\theta}\sin\phi \quad (17)$$

The roll (p), pitch (q), and yaw (r) time histories for each of the mechanical Samara model A41, B41, C41, D41 tested are presented in FIGS. 10A-10D, respectively.

Flight Performance

The Euler angles ø and θ display periodic behavior with varying degrees of shift in each case. This is to be expected as 'pitching' leads 'conning' by 90° in full scale helicopters.

This implies the maximum force on the Samara $\theta_{max}$, displaces the Samara maximally $\phi_{max}$ by one quarter revolution. This cycle behavior can be seen in FIGS. 8A-8C.

The scope of flight in this study is characterized by a nearly constant radius of precession, or more precisely a standard deviation, $\sigma_{r_{CG}}$, of no more than 6.25% of the mean. The mean radius of precession is averaged over N periods as presented in Table 5. An illustration of this concept may be seen in FIGS. 11A-11B.

TABLE 5

Time synchronous average parameters for each of the subjects tested

| NAVE | | fHz | T sec | points | N |
|---|---|---|---|---|---|
| A41 | p | 7.25 | .137 | 500 | 8 |
| | q | 7.25 | .138 | 500 | 8 |
| B41 | p | 7.27 | .138 | 384 | 6 |
| | q | 7.41 | .135 | 384 | 6 |
| C41 | p | 7.32 | .137 | 411 | 7 |
| | q | 7.32 | .137 | 411 | 7 |
| D41 | p | 5.71 | .175 | 455 | 6 |
| | q | 5.71 | .175 | 55 | 6 |

The radius of precession is computed in cylindrical coordinates where $r_{CG}=\sqrt{x_{CG}^2+y_{CG}^2}$, where $(x_{CG},y_{CG})$ denote the location of the center of mass of the mechanical Samara model, or M1 shown in FIG. 2D. This parameter is the conciseness of the helical descent trajectory, such that a larger $r_{CG}$ implies a larger amount of transverse motion.

The tabulated data shown in Table 6, identify some key performance parameters, namely, optimal geometry for minimal descent velocity.

TABLE 6

Flight performance metrics

| Metric | $r_{CG}$, m | $\sigma_{r_{CG}}$, m | $\dot{z}_{CG}$, m/s | $\sigma_{\dot{z}_{CG}}$, m/s | $Y_C$, m |
|---|---|---|---|---|---|
| A41 | 0.07 | 0.01 | −1.60 | 0.01 | 64.60 × 10⁻³ |
| B41 | 0.16 | 0.01 | −1.70 | 0.02 | 59.00 × 10⁻³ |
| C41 | 0.27 | 0.01 | −1.50 | 0.06 | 69.80 × 10⁻¹ |
| D41 | 0.40 | 0.02 | −1.80 | 0.05 | 56.20 × 10⁻³ |

Figure 11A:
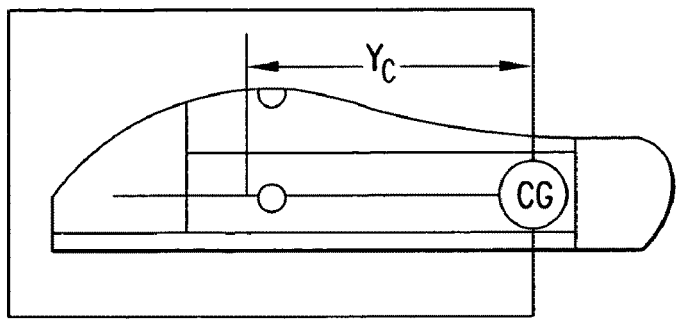
FIG. 11A is a schematic representation of the wing section used to compute area centroid.
Figure 11B:
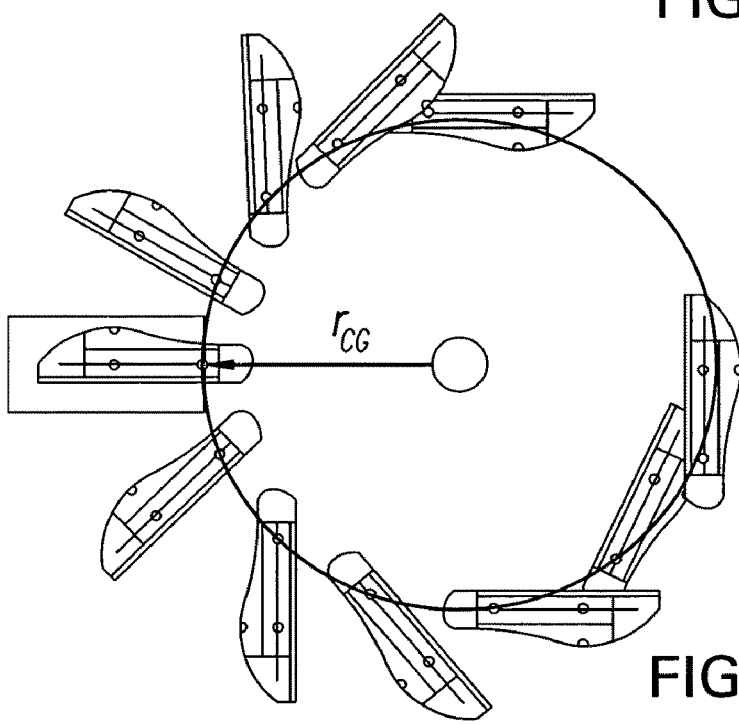
FIG. 11B is the schematic representation of the wing motion showing the radius of precession of the center of mass $r_{CG}$.

The mechanical Samara models rotate about the center of mass or CG, resulting in the majority of the wing area being located on one side of the CG as shown in FIG. 11A. The distance of the area centroid of this portion of the mechanical Samaras are calculated with respect to the CG and shown in Table 6.

The terminal velocity of natural Samara is a function of two parameters: the weight of the Samara, and the mass of air it accelerates. The control volume defining the mass of air accelerated is defined by Norberg as a flat disk equal in radius to the wing tip. This definition differs from a definition by Green which is limited to the surface area of the Samara.

The mechanical Samara models compared in this study have identical surface area and weight, for which Green's model predicts no variation in descent velocity. Norberg's model accounts for the wing tip radius varying between models which results in a variation of disk loading. Models A41 and C41 have identical wing tip radii, therefore Norberg's model predicts no variation in descent velocity.

Figure 12:
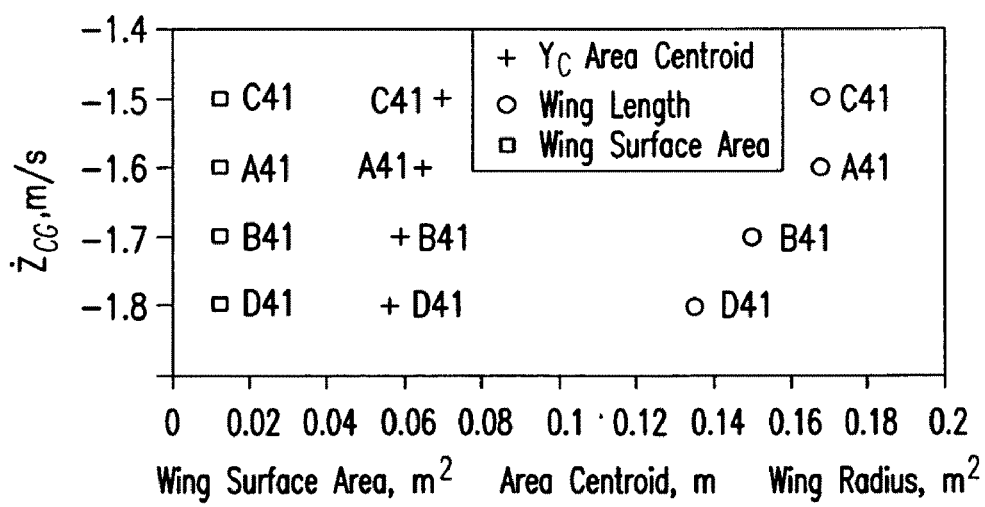
FIG. 12 is a diagram representing the influence of wing radius, wing surface area, and wing area centroid distance from center of mass yc on descent velocity.

Mechanical Samara models of identical wing loading and disk loading can be quantitatively compared through observation of the location of the wing area centroid in relation to the center of mass, or CG of the Samara. In Table 5 and FIG. 12, the centroid location farthest from the CG corresponds to the Samara with the lowest descent velocity. To reconcile the erroneous trends predicted by the previously mentioned models, a modified disk loading can be used to predict trends in the terminal velocity of Samara. This modified disk loading uses the length $(Y_C)$ between the area centroid and the rotational axis, as the radius of the flat disk which defines the control volume of air accelerated by the descending Samara. These relationships are shown in FIG. 12.

Flight Dynamics Analysis

In applications involving periodic signals it is desirable to enhance signal to noise ratios in order to extract representative waveforms. Signal averaging techniques previously implemented in applications such as structural health monitoring and optical filter design, are employed in the subject study as a means of reducing a periodic signal into one discernable waveform. For a deterministic signal X(t) of period T, a measurement model can be written as:

$$k(t)=X(t)+v(t) \quad (18)$$

where v(t) is additive sensor noise. For (t) measured over N periods, the ensemble average and ensemble variance can be approximated as:

$$n_k(t) = \frac{1}{N}\sum_{n=0}^{N-1} z(t+nT) \quad (19)$$

$$\sigma_k^2(t) = \frac{1}{N}\sum_{n=0}^{N-1} [k(t+nT)-n_k(t)]^2 \quad (20)$$

Confidence intervals for estimated parameters can be formulated from estimation theory. The 95% confidence interval of these measurements with regard to the signal averages is approximated as:

$$k_{0.95}(t)=n_k(t)\pm 1.96\sigma_k(t) \quad (21)$$

This average is then described for each Samara by Fourier Sine or Cosine series of varying order. The specific parameters used for the ensemble averaging are listed in Table 5.

Figures 13A, 13B:
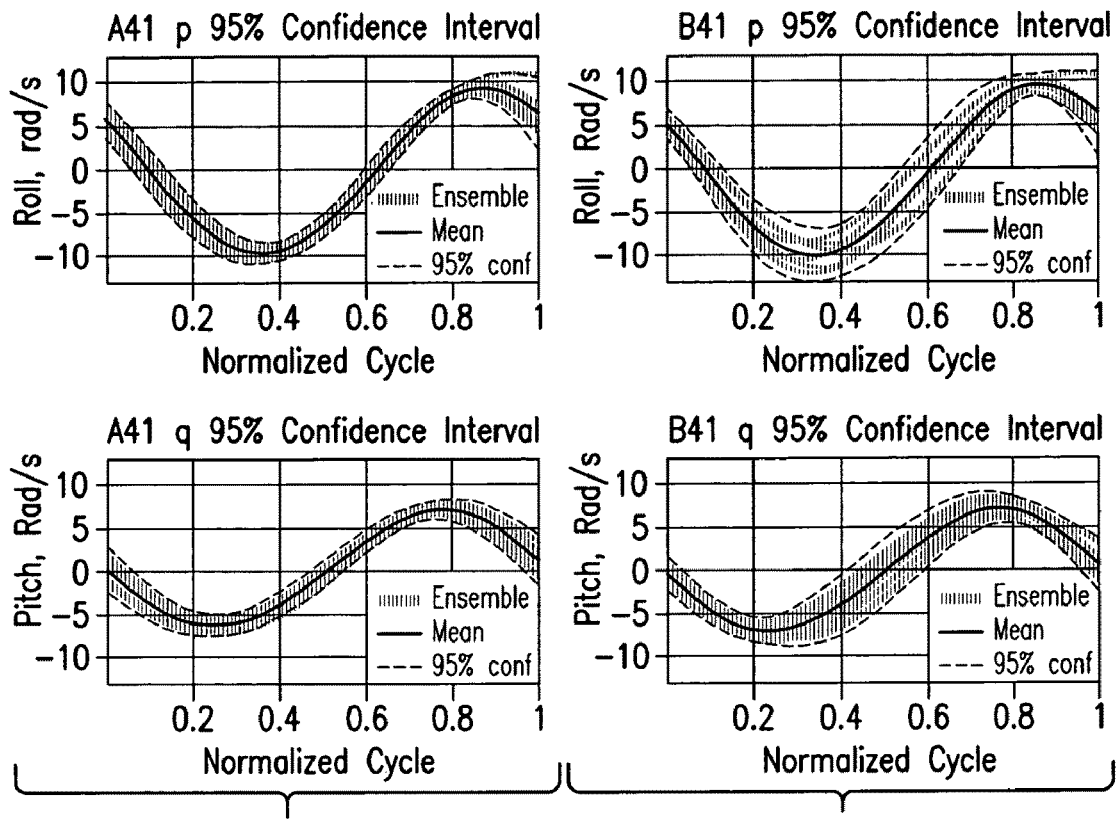
FIGS. 13A-13D are diagrams representing roll and pitch with 95% confidence interval for the models A41, B41, C41, and D41, respectively.
Figures 13C, 13D:
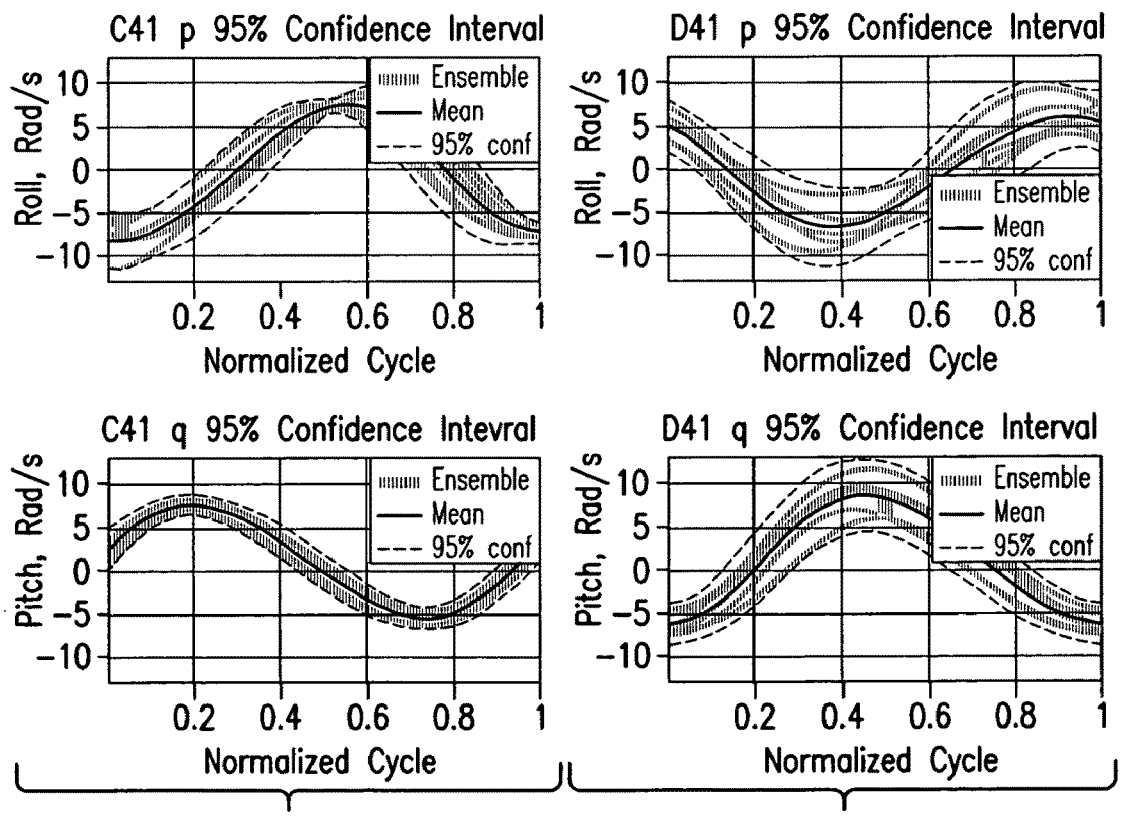
Figure 14A:
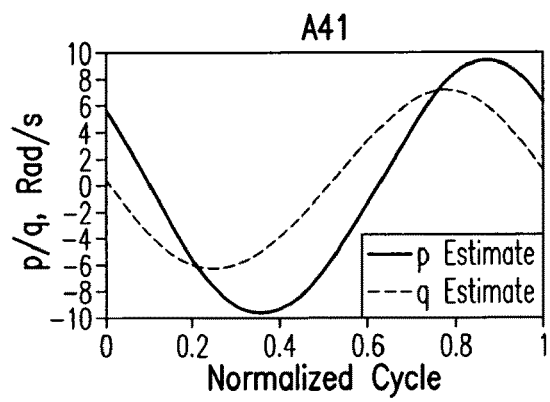
FIGS. 14A-14D are diagram representations of the Fourier series estimation of TSA roll and pitch flight data for the models A41, B41, C41, and D41, respectively.
Figure 14B:
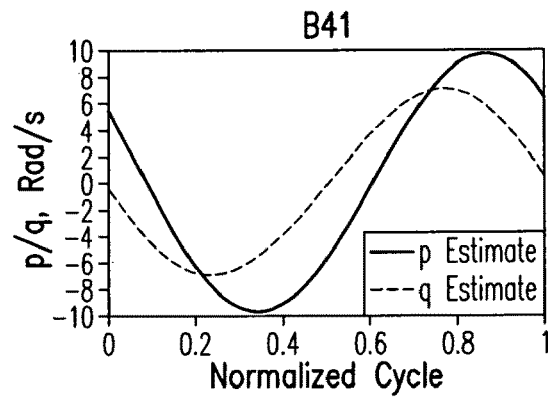
Figure 14C:
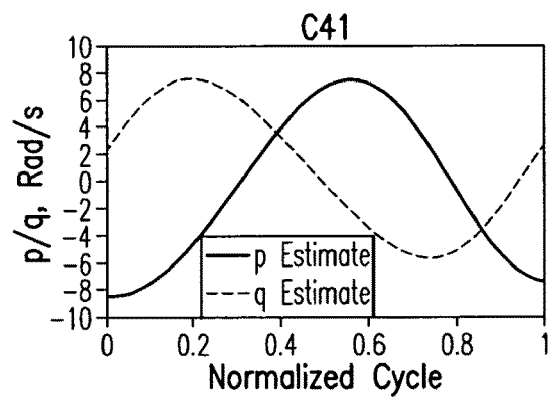
Figure 14D:
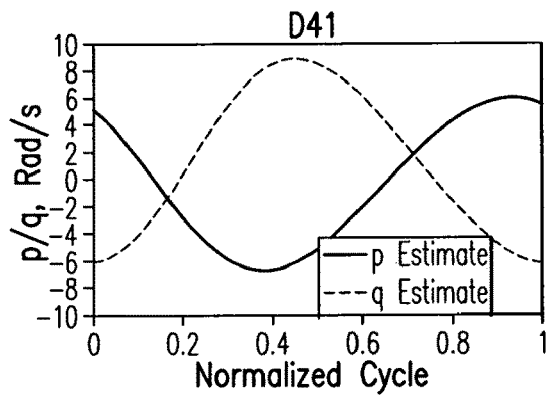

The roll, pitch and yaw time history for each of the subjects are displayed in FIGS. 10A-10D. The concatenated signals are shown in FIGS. 13A-13D. The confidence interval bounds tend to increase from the mechanical Samara A41 model to the mechanical Samara D41 model, as shown in FIGS. 13A-13C. Possible causes for this may include but are not limited to: structural vibrations, susceptibility to small wind disturbance, and decreased aerodynamic damping resulting from a change in the center of pressure.

The number of ensembles averaged is highly dependent on the settling time of the individual mechanical Samara model, and the limited drop height. This number could be increased at the cost of uncertain initial conditions by giving the Samara a pre-spin upon launch.

The concatenated roll and pitch flight data may be represented with a Fourier series allowing a functional representation of the flight dynamics. The curve fits of the four models including the 90% confidence interval is shown in FIGS. 14A-14D. The most notable observation is that in steady vertical descent, roll and pitch are neither constant nor small. This has substantial implications as a dynamic model was derived based on a trim state that enforced zero roll and pitch, upon which a number of vehicle design simulation are based. The waveform indicates a cyclic variation in the roll rate of roughly ±9.5 rads/s for both A41 and B41 models, whereas C41 model varies by ±7.5 rad/s and D41 model varies from −8 rad/s to 7.5 rad/s. The pitch rate observed in A41 model is −6 rad/s to 7 rad/s and is similar in amplitude to B41 model which varies by ±7 rad/s. The pitch rates of both C41 and D41 models appear to have an offset and are not symmetric about the zero point as observed for A41 and B41 models. The pitch rate for C41 model may be observed to vary from −5.5 rad/s to 7.5 rad/s and for D41 model the pitch rate varies from 7.5 rad/s to 10.5 rad/s and exhibits a similar offset as that observed in C41 model. The roll and pitch rates are represented by Eqs. 22-23.

$$\hat{p}_i(t) = \alpha_0 + \sum_{n=1}^{3} [a_n \cos(\omega t) + b_n \sin(\omega t)] \quad (22)$$

$$\hat{q}_i(t) = \alpha_0 + \sum_{n=1}^{3} [a_n \cos(\omega t) + b_n \sin(\omega t)] \quad (23)$$

where i=[A, B, C, D]. The yaw rate and curve fit are neglected here as the variation in amplitude is 2 rad/s or 5% of the mean, and can be approximated with small error as a line. The resultant coefficients of dynamics, when measured from maximum p to maximum q, varies between the models with A41 and B41 exhibiting similar shifts of 33.0° and 35.6°, respectively. Models C41 and D41 displayed substantially larger phase shifts of 131.7° and 188.7°, respectively. An increase in phase shift between p and q corresponds to an increase in the radius of precession of the center of mass, $r_{CG}$.

The results of the Fourier analysis are tabulated in Table 7.

TABLE 7

Coefficients of the Fourier series estimate of TSA roll and pitch

| State | w, rad/s | $a_0$ | $a_1$ | $b_1$ | $a_2$ | $b_2$ | $a_3$ | $b_3$ | MSE |
|---|---|---|---|---|---|---|---|---|---|
| $\hat{p}_A(t)$ | 6.206 | −0.323 | +5.905 | −7.398 | +0.049 | −0.229 | — | — | 0.789 |
| $\hat{q}_A(t)$ | 6.194 | +0.257 | +0.297 | −6.677 | −0.147 | −0.240 | — | — | 0.024 |
| $\hat{p}_B(t)$ | 2.773 | −1.872 | +4.004 | +3.147 | +3.450 | −12.10 | — | — | 0.696 |
| $\hat{q}_B(t)$ | 6.185 | +0.018 | −0.224 | −6.912 | −0.128 | −0.260 | — | — | 0.225 |
| $\hat{p}_C(t)$ | 4.059 | −2.573 | −4.163 | +5.055 | −1.399 | −3.363 | −0.331 | +0.431 | 0.386 |
| $\hat{q}_C(t)$ | 6.334 | +0.948 | +1.273 | +6.392 | +0.179 | +0.447 | — | — | 0.091 |
| $\hat{p}_D(t)$ | 2.947 | −2.462 | +0.172 | +4.173 | +7.113 | −4.525 | +0.341 | −1.170 | 0.118 |
| $\hat{q}_D(t)$ | 6.180 | +1.349 | −7.254 | +1.627 | −0.175 | −0.460 | — | — | 0.598 |

The subject study of the mechanical Samara A41, B41, C41, D41 models elucidated the effects of the mechanical Samara wing geometry on its autorotation and rotational dynamics, the characterization of previously unobserved roll and pitch dynamics, and a correlation between the different planform geometries of the mechanical Samara models tested and a variation in the descent velocity. Additionally, the radius of precession of the center of mass $r_{CG}$ was found to vary by >500% between models, and a linear relationship was established between the location of the area centroid with respect to the center of mass, $Y_C$, and the vertical descent velocity, $\dot{z}_{CG}$, which captures the trends observed by varying planform geometry.

The study of the mechanical Samara models has been further advanced into the design of the micro/nano scale mono-wing rotorcraft presented in FIGS. 1A-1B, 15 and 16A-16D, that uses a new airfoil derived from natural Samara chord geometry and mimics the passive transit of the species of Samara (winged seed), Acer diabolicum Blume. A simulated electronics payload of 4.5 grams was molded into the model of the subject rotorcraft to demonstrate the vehicles ability to safely deliver sensitive hardware by the ballistic descent with consistent autorotation.

A substantial challenge in modeling the dynamics of microscale flight is the general lack of knowledge of the complex low-Reynolds-number flow regime inhabited. Additionally, the vehicles are highly susceptible to wind gusts as a result of low vehicle inertia. The complexity of the system can be reduced substantially by identifying a linear model that describes its reaction to forces imposed by a control input. A model description of this nature lends itself well to modern control and state estimation.

A large number of the models of the Samara mono-wing miniature air vehicle have been built and studied with the purpose of characterization of the flight dynamics and of control of the subject robotic micro air vehicle 10 of the present invention. Identification and error estimation of the vehicle dynamic model has been accomplished with data collected by a visual tracking system and usage of a frequency response-based system identification package developed at the U.S. Army Aeroflight dynamics Directorate located at Moffett Field, Calif. Frequency-domain system identification is limited to linear models, valid only for small perturbations about the trimmed condition.

The subject model structure is based on a reduction of the longitudinal dynamics of a helicopter in hover to a linear system described by stability derivatives. Cramer-Rao (CR) insensitivity bounds describe the likely error resulting from multiple trials and are used to validate the estimates of the identified parameters. Additional validation of the linear model is done through implantation of a linear controller, with feedback provided by the visual tracking system.

Presented in FIGS. 1A, 15 and 16A-16D, Samaras I and II models use unconventional and Samara-inspired planform geometry and airfoil cross sections. These vehicles perform stable autorotation and are capable of landing at terminal velocity without sustaining any damage. In the event of motor failure, the vehicles gently autorotate back to the ground.

The propeller(s) 28 of Samaras I and II are spinning in the $\hat{c}_y$-$\hat{c}_z$ plane and oppose applied torque about the $\hat{c}_x$ axis, providing additional roll stability. The configurations of Samaras I and II models permit control of rotation rate, altitude, and translation via the appropriate actuation of the wing servo mechanism 18.

The design and construction of the Samara aircrafts used in the subject experiments was made with the intent of providing a stable vehicle that could be tested in a limited area. The unconventional wing and body structure are the result of an iterative design process that has produced on the order of 100 vehicles. The resultant vehicles are extremely damage tolerant as they employ flexible structures that deflect upon impact, effectively increasing the time over which the impact load is applied to the vehicle. The configuration and dimensions of the Samara I, II air vehicles are shown in FIGS.

16A-16D. Advantages over traditional microscaled vertical takeoff and landing configurations include passive stability, efficient autorotation, low body drag, mechanical simplicity, low cost, high payload capacity, and substantial damage tolerance.

Vehicle Design

All particular details of the subject design, including specific dimensions, weight (mass), materials, and parts are given herein as an example only of the models tested. However, alternative design constituents are also contemplated in the scope of the present invention.

The primary load-bearing structure of the vehicle was made, for example, for 0/90-ply 0.025-thick carbon-fiber composite laminate, with opposed parallel tension and compression members mounted to the motor 26 and wing 12. In this configuration, the structure provides a high degree of flexure in the $\hat{c}_z$ direction and a high degree of stiffness in the plane of rotation. The angle at which the motor 26 is held provides protection from ground impingement on takeoff and landing. The allowable range of the angular deflection of the motor/propeller will be detailed further herein.

The flight time of the Samara I in roughly 20 min, with a 0.025 kg, 480 mAh, 7.4 V, and two-cell lithium-polymer (LiPo) battery, for a total vehicle mass (gross weight GW) of 0.075 kg. The maximum gross takeoff weight (GTOW) of the vehicle was 0.125 kg, and the maximum dimension is 0.27 m.

The second, and smaller vehicle tested, called Samara II, was designed and constructed in a similar fashion to Samara I. However, the total mass was 0.038 kg, and the maximum dimension was 0.18 m. Table 8 details the mass breakdown of Samaras I and II, as well as two hobby radio-controlled rotorcraft. The mass breakdown is similar in the four vehicles. However, the Samara vehicle benefits from a less complex, and therefore lighter, propeller/rotor system and requires no transmission, as it directly drives the propeller. This decrease in complexity creates a more robust and reliable system.

D. Pines, et al., (Pines, D and Bohorquez, F., "Challenges Facing Future Nitro-Air-Vehicle Development," Journal of Aircraft, Vol. 43, No. 2, 206, pp. 290-305) found that the propulsion systems of small-scale fliers typically exceed 60% of the total vehicle mass, compared with a jetliner that has a propulsion system with a 40% mass fraction. The 20% savings at full scale is used entirely for payload, as the Boeing 767 payload mass fraction is 29%, compared with 9% for small-scale flight vehicles. The mass fraction of the propulsion system of Samaras I and II without payload is 47 and 42%, respectively. Considering the vehicles' maximum GTOW for this calculation, the mass fractions of the propulsion system drop to 28 and 35%, respectively, with payload fractions of 40 and 21%.

TABLE 8

Weight data (in terms of percent of GW)

| Parameter | Samara II | Samara I | Hobby rotor-craft 1 | Hobby rotor-craft 2 |
| --- | --- | --- | --- | --- |
| Mass | 0.038 kg | 0.075 kg | 0.3 kg | 1.8 kg |
| Maximum GTOW | 0.048 kg | 0.125 kg | — | — |
| Maximum dimension | 0.18 m | 0.27 m | — | — |
| Percent GW | | | | |
| Propeller/rotor system | 5.3 | 2.6 | 11.0 | 11.2 |
| Tailboom assembly | 2.6 | 3.3 | 8.0 | 9.1 |
| Main motor (electric) | 10.5 | 10.7 | 15.4 | 10.5 |
| Fuselage/structure | 26.3 | 27.6 | 7.0 | 15.1 |
| Main transmission | Direct drive | Direct drive | 2.0 | 3.4 |
| Landing gear | 2.6 | 2.7 | 2.3 | 3.4 |
| Control system | 18.4 | 16.0 | 5.7 | 18.3 |
| Flight control avionics | 7.9 | 4.0 | 29.4 | 2.4 |
| Power source | 26.3 | 33.3 | 19.2 | 26.6 |
| Payload | 0 | 0 | 0 | 0 |
| Flight time | 10 min | 20 min | — | — |

Stability Properties

A substantial advantage of the Samaras I and II air vehicles is that it they are passively stable systems. A simple qualitative stability analysis of the Samara I in a steady hover or autorotation illustrates this point. As shown in FIG. 15, in a steady hover, the thrust from the propeller $F_p$ is balanced by the drag from the body and wing $F_{D_W}$, resulting in a near-constant rotational rate about its principal inertial axis $I_z$. The vertical force generated by the wing $F_{L_W}$ apposes the force of gravity $F_G$, resulting in a net zero vertical velocity. Alternatively, in autorotation, the resistive torque of the wing drag is equal to the driving torque of the lift, resulting in a net zero torque and vertical acceleration.

Consider the assumed motion yaw $r=r_0$ and roll, pitch p, q ≪ $r_0$ in steady hover or autorotation. To investigate whether the motion is stable or not (neglecting aerodynamic contributions), a small moment is applied to the body, such that, after the moment is applied, the resultant angular velocities are as follows:

$$p = \epsilon_p \qquad (24)$$

$$q = \epsilon_q \qquad (25)$$

$$r = r_0 + \epsilon_r \qquad (26)$$

where $\epsilon_i$ (i=1, 2, 3) are infinitesimal quantities. To determine the evolution of these perturbed angular velocities in time, it is convenient to use the Euler equations as follows:

$$I_z(\dot{r}_0 + \dot{\epsilon}_r) + (I_x - I_y)\epsilon_p \epsilon_q = 0 \qquad (27)$$

$$I_x \dot{\epsilon}_p - (I_y - I_z)(r_0 + \epsilon_r)\epsilon_q = 0 \qquad (28)$$

$$I_y \dot{\epsilon}_q - (I_z - I_x)(r_0 + \epsilon_r)\epsilon_p = 0 \qquad (29)$$

The change in angular velocities is small and, as such, allows linearization of the preceding equations by eliminating quadratic and higher-order terms in $\epsilon_i$, yielding $$I_z \dot{\epsilon}_r = 0 \qquad (30)$$

$$I_x \dot{\epsilon}_p - (I_y - I_z) r_0 \epsilon_q = 0 \qquad (31)$$

$$I_y \dot{\epsilon}_q - (I_z - I_x) r_0 \epsilon_p = 0 \qquad (32)$$

This implies $\epsilon_r$ is constant. The behavior of the remaining angular velocities can be understood with eigenvalue analysis. Assuming a solution of the form $$\epsilon_p(t) = E_P e^{\lambda t} \qquad (33)$$

$$\epsilon_q(t) = E_q e^{\lambda t} \qquad (34)$$

Next, the expansion can be introduced into the linearized equations, $$\begin{bmatrix} I_x \lambda & (I_z - I_y)r_0 \\ (I_x - I_z)r_0 & I_y \lambda \end{bmatrix} \begin{bmatrix} E_p \\ E_q \end{bmatrix} e^{\lambda t} = \begin{bmatrix} 0 \\ 0 \end{bmatrix} \quad (35)$$

The solution requires that the determinant of the coefficient matrix be zero, yielding the characteristic equation $$I_x I_y \lambda^2 - (I_x - I_z)(I_z - I_y)r_0^2 = 0 \quad (36)$$

The solution is $$\lambda = \pm i \sqrt{\frac{(I_x - I_z)(I_z - I_y)r_0^2}{I_x I_y}}, \quad (37)$$

where $\lambda$ are the eigenvalues, or solutions which make the determinant of the coefficient matrix zero. They are also called the poles of the system.

Two types of solutions are possible and depend on the principal moments of inertia. If $I_x > I_z$ and $I_y > I_z$ or if $I_x < I_z$ and $I_y < I_z$ (characteristic of Samara I and Samara II), both roots of the characteristic equation are imaginary. In the absence of non-conservative forces, the system is marginally stable. The inertial parameters of the Samara vehicles, as well as the resultant eigenvalues, are listed in Table 9.

TABLE 9

Inertia properties, rotation rates, and resultant eigenvalues for robotic Samaras I and II

|  | $I_x$, kg mm$^2$ | $I_y$, kg mm$^2$ | $I_z$, kg mm$^2$ | $r_o$, rad/s | $\lambda$, rad/s |
|---|---|---|---|---|---|
| Samara I | 248 | 562 | 797 | 80.5 | ±0 + 77i |
| Samara II | 35 | 98 | 122 | 76 | ±0 + 59i |

Experimental Setup

A. Visual Tracking System

The position and orientation of each vehicle was collected at a rate of 500 Hz, using a VICON visual tracking system. The system collects two-dimensional (2-D) images of the subject, which is fitted with retroreflective markers. The VICON system strobes light at the frame rate of the camera. The light incident on the surface of the marker returns to is source, reducing errors commonly caused by interference. The light returned to the lens allows for a quick computation of the centroid of the marker.

The three-dimensional (3-D) position was obtained from a least-squares fit of the 2-D camera observations. The error in the system was determined by the calibration of the system, which was performed before any flight data were taken. The noise observed in a given data set was consistent.

During a flight test, the tracking system used eight cameras to track the 3-D position of three retroreflective markers placed on the Samara wing. Each marker was spherical or shaped as a disk, with a diameter of 5 mm. The 3-D shape of the marker allows for better tracking by the VICON system.

B. Telemetry Synchronization

Pitch input was measured by two methods, both onboard and offboard the vehicle. The state of the actuator 54 of the OFF-board controller 22 (shown in FIGS. 1A and 1B) was measured offboard the Samara on an identical system receiving commands from the same transmitter. Two markers were placed on an arm attached to the offboard actuator to track the input to the vehicle. During a flight test, the Samara vehicle and the offboard actuator were simultaneously tracked, allowing the angular displacement measured on the ground to be correlated to the motion of the Samara vehicle, both of which were synchronized in time.

C. Vehicle Inputs

It is advantageous to track the wing pitch angle via the offboard system, as it provides the ability to track the collective pitch inputs without the influence of the forces on the vehicle. The onboard method includes measuring both pitch angle $\theta$ and coning angle $\beta$ via the markers placed on the wing. It is worthwhile to compare the onboard and offboard measurements, as the onboard angles are influenced by the aerodynamic and centrifugal forces acting on the vehicle.

Figure 17:
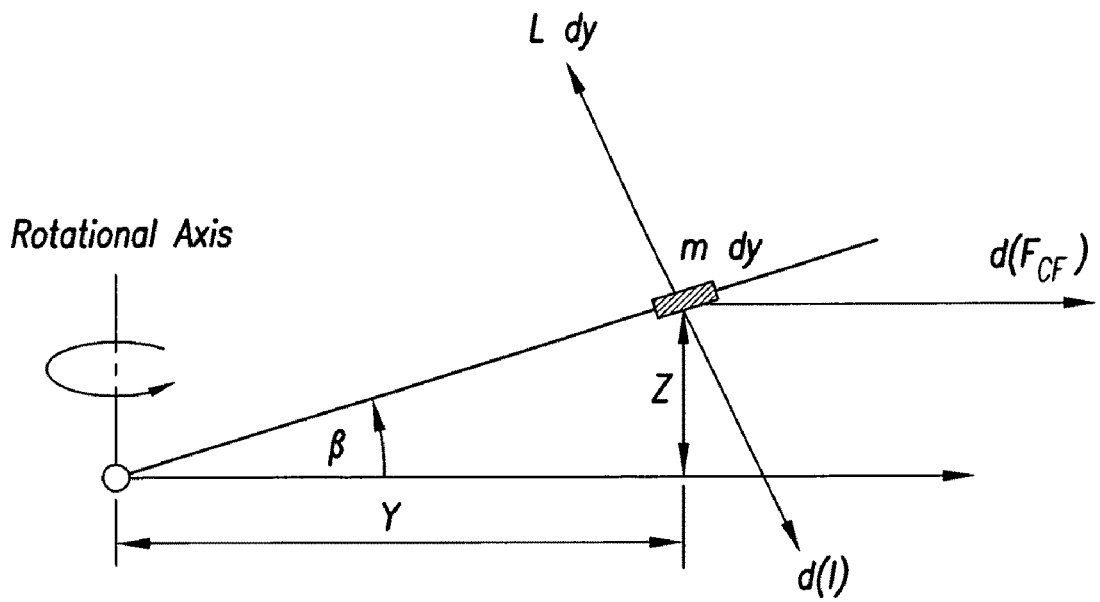
FIG. 17 shows schematically forces acting on the element of a flapping robotic Samara wing.

The wing pitch angle $\theta_0$ of the vehicle in flight exhibits a once-per-revolution displacement. This variation results in a cyclical change in the coning angle $\beta$ and heave velocity not captured by the offboard measurements. In the absence of aerodynamic forces, the wing would assume an arbitrary orientation. However, in the presence of aerodynamic forces, a flapping moment is applied to the Samara vehicle body, causing the wing to precess to a new orientation, restoring equilibrium to the system. Nothing was presumed to be known about what forces or deflection angles were generated, given a change in the actuator; therefore, all control inputs are normalized. The input command is given by $\theta_0$ for collective input and is normalized, such that $\theta_0 \in [-1, 1]$. The forces acting on the wing in flight, as well as the definition of the coning angle, are detailed in FIG. 17.

D. Attitude Determination and Attitude Representation

Altitude determination and representation have been described by Eqs. (2)-(17) detailed in previous paragraphs.

E. Kinematic Output

The VICON-obtained estimates are exceptionally low-noise as compared with commercial-grade onboard attitude estimation sensors. The position noise variance shown in Table 10 was estimated by recording data while not moving the vehicle. The low-noise presence in the position estimate allows the inertial position to be numerically differentiated to yield inertial velocity estimates.

$$\{\dot{x}, \dot{y}, \dot{z}\}^T = \frac{\partial}{\partial t} \{x, y, z\}^T \quad (38)$$

The body-fixed velocities may be directly computed using the direction cosine matrix representation of the orientation estimate $R_{BF}$ and the inertial velocities as $$\{u, v, w\}^T = R_{BF} \{\dot{x}, \dot{y}, \dot{z}\}^T \quad (39)$$

TABLE 10

Measurement characteristics

| Measurement | Symbol(s) | Source | Resolution | Variance | Unit |
|---|---|---|---|---|---|
| Time | t | VPS | $1.000 \times 10^{-3}$ | — | s |
| Control input | $\theta_0$ | VPS | — | $7.8000 \times 10^{-3}$ | norm |
| Position | x, y, z | VPS | — | $0.613 \times 10^{-3}$ | m |
| Orientation | $\phi, \theta, \psi$ | VPS | — | $7.800 \times 10^{-3}$ | rad |
| Translational velocity | u, v, w | VPS | — | $0.251 \times 10^{-3}$ | m/s |
| Rotational velocity | p, q, r | VPS | — | $1.200 \times 10^{-3}$ | rad/s |

F. Open-Loop Flight Test Data

Figure 18:
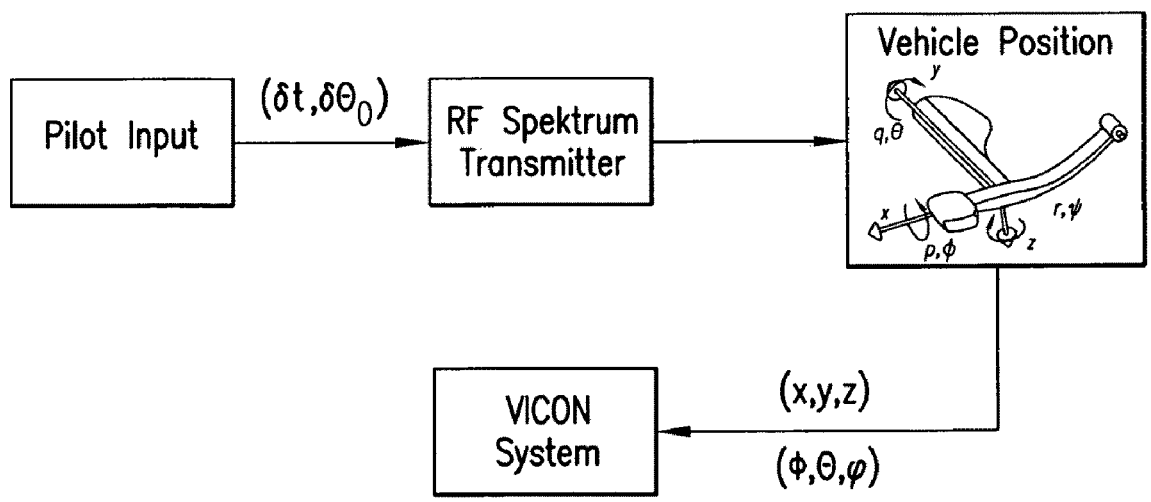
FIG. 18 is a block diagram of the open-loop control setup.

The first step in system identification is to pilot the vehicle in a flight envelope where the dynamics of interest are thoroughly excited. The vehicle was piloted within the capture volume of the vision system while simultaneously collecting the inputs and vehicle kinematics. The pilot excited the vehicle over a wide range of frequency content to best determine the relationship between input and output. For proper system identification, it is important to collect flight data as open loop, since a closed-loop feedback system would alter the natural dynamics of the vehicle. The open-loop setup is shown in FIG. 18.

Figure 19A:
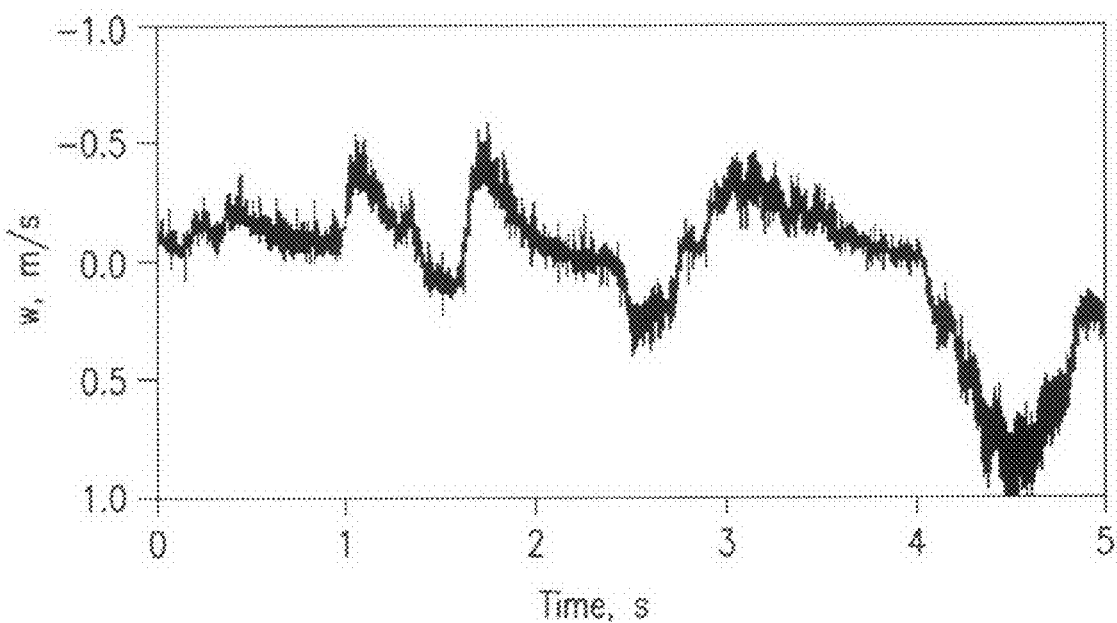
FIGS. 19A-19B are diagrams representing the time history of the heave velocity (FIG. 19A) and control input pitch (FIG. 19B) for the Samara I model.
Figure 19B:
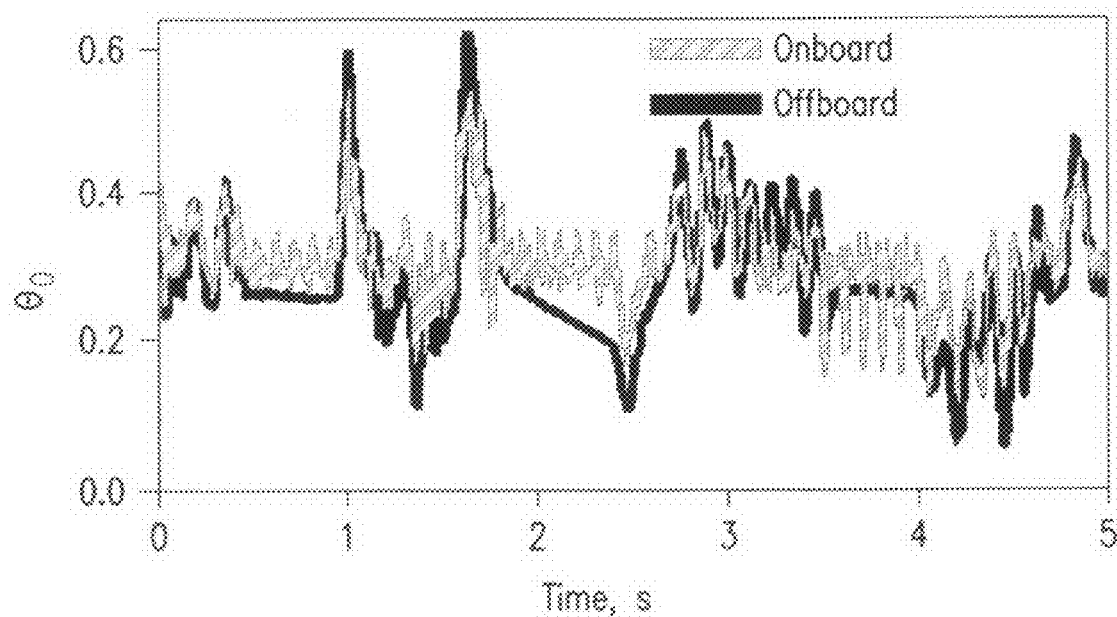

Typical portions from recorded open-loop data sets are shown in FIGS. 19A-19B. The heave velocity ω was found by applying the central difference approximation to the vehicle vertical position data collected by the VICON system. FIGS. 19A-19B also present the comparison between the inputs given to the vehicle during one flight test, as calculated both onboard and offboard the robotic Samara air vehicle. Both onboard and offboard methods demonstrate similar pitch inputs, but the onboard measurements display more oscillations.

G. Closed-Loop Flight Test Data

Figure 20:
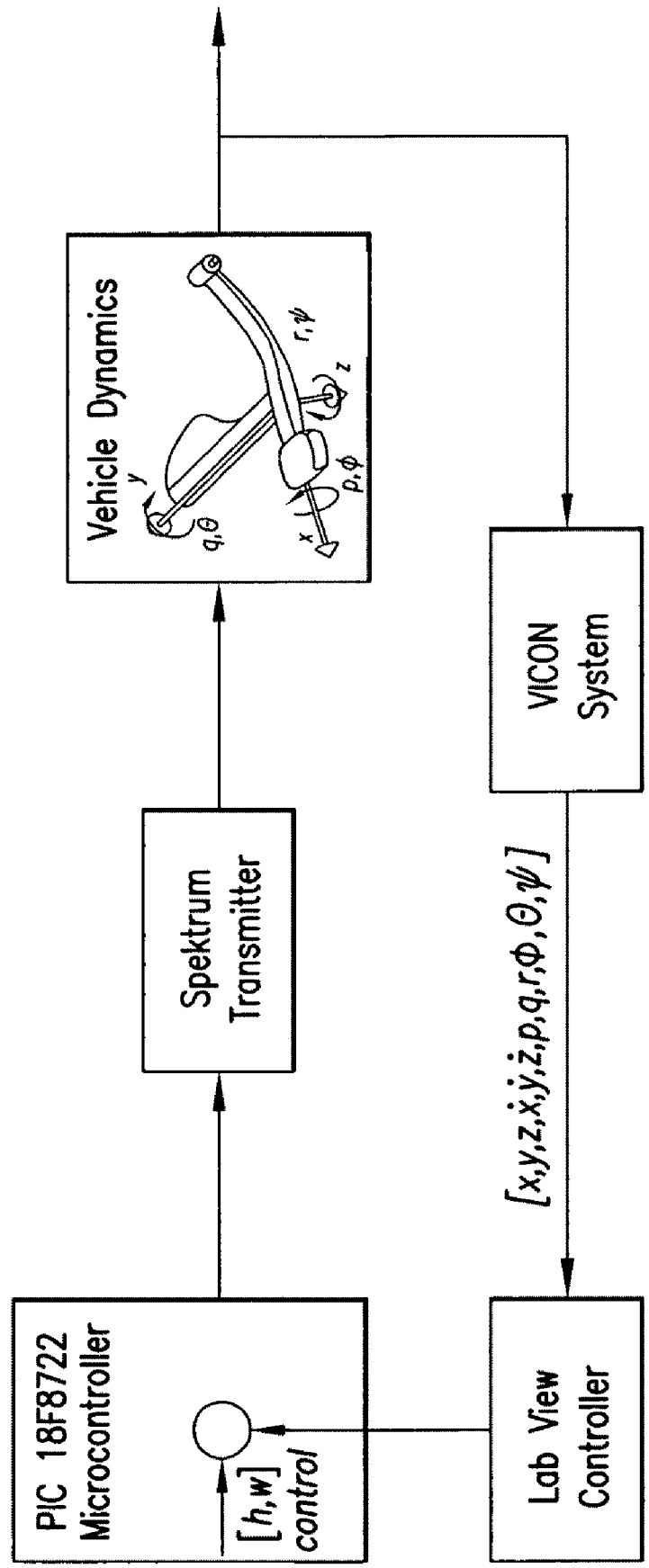
FIG. 20 is a block diagram of the ground control station (closed loop) of the system of the present invention.

Implementation of closed-loop flight was enabled by an offboard feedback system. The ground control station setup is shown in FIG. 20. During closed-loop flight, the position and orientation of the robotic Samara air vehicle were tracked by the VICON visual system, which sends the formation to a LabVIEW controller program [LabVIEW, Software Package, Ver., National Instruments, Austin, Tex., 2008]. The LabVIEW program takes into account the vehicle's vertical position and heave velocity to create wing collective commands that are sent through PIC-18F8722 microcontroller. The programmable interface microcontroller in turn sends the commands to the vehicle through a Spektrum transmitter.

Experimental Results

A. System Identification Method

In the identification process, the coherence function was computed. This step provides a measure of the extent to which an output is linearly related to the input over some frequency range. The magnitude squared coherence is given by $$\gamma_{xy}^2(\omega) \equiv \frac{|R_{xy}(\omega)|^2}{|R_{xx}(\omega)||R_{yy}(\omega)|} \quad (40)$$

An input/output pair with low coherence implies that either the input has no effect on the output or the effect is nonlinear. However, an input/output pair with high coherence implies the relationship can be modeled well by a linear model, such as a transfer function or state-space model. A coherence of 0.6 or above for some useful frequency range is believed to be necessary for accurate transfer function identification.

Figure 21B:
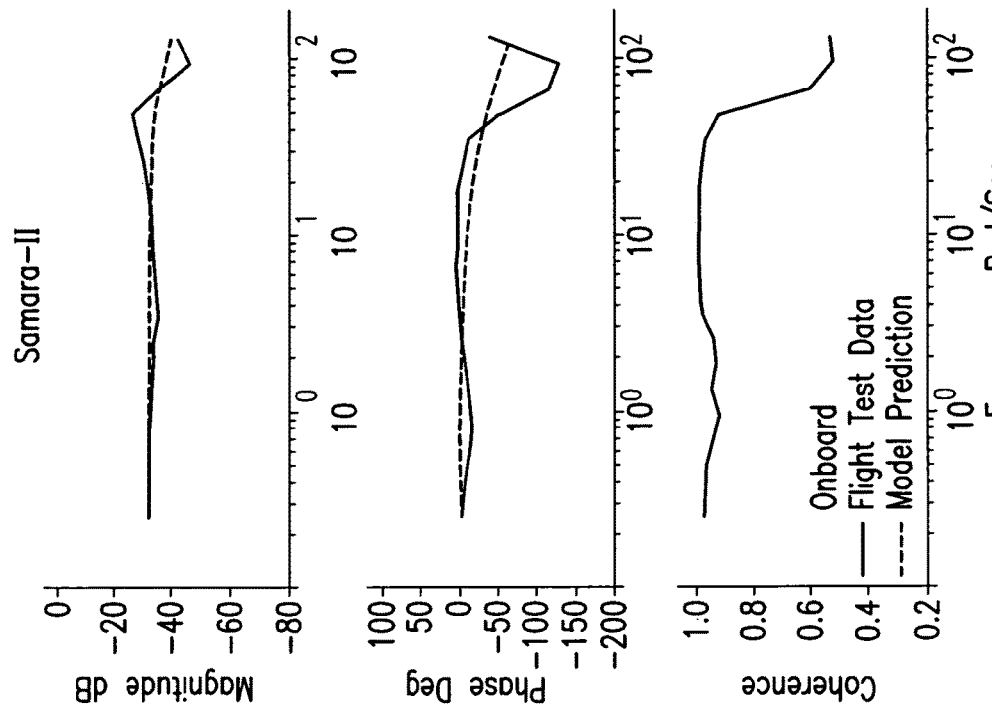
FIGS. 21A-21B are diagrams showing, respectively, magnitude, phase and coherence for onboard and offboard data collection for Samara I (FIG. 21A) and Samara II (FIG. 21B) models, respectively.
Figure 21A:
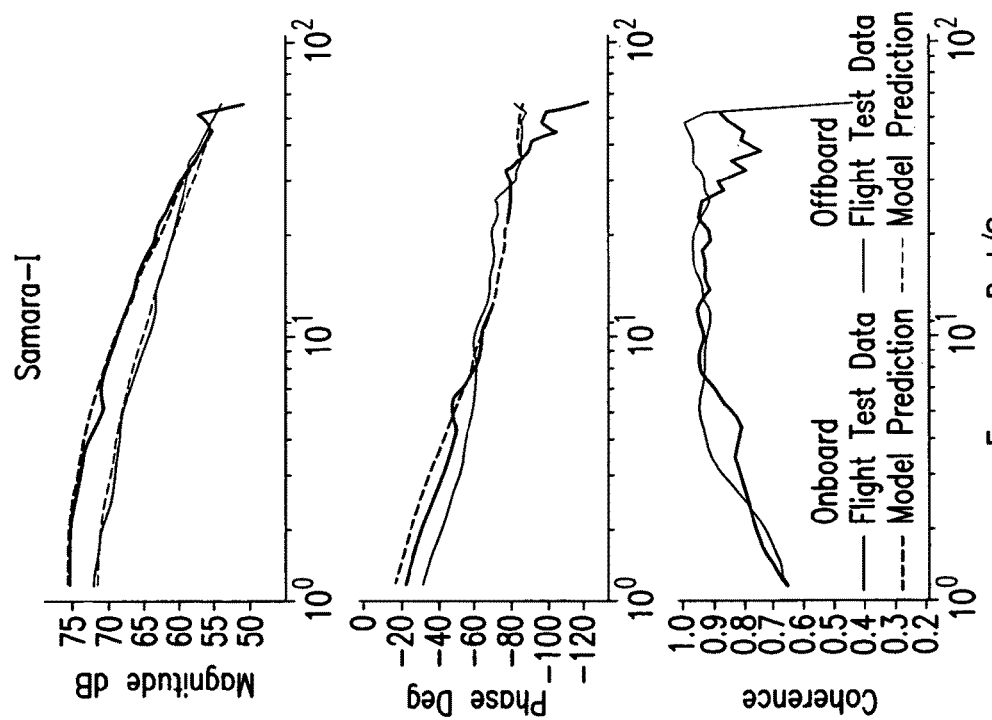
Figure 22A:
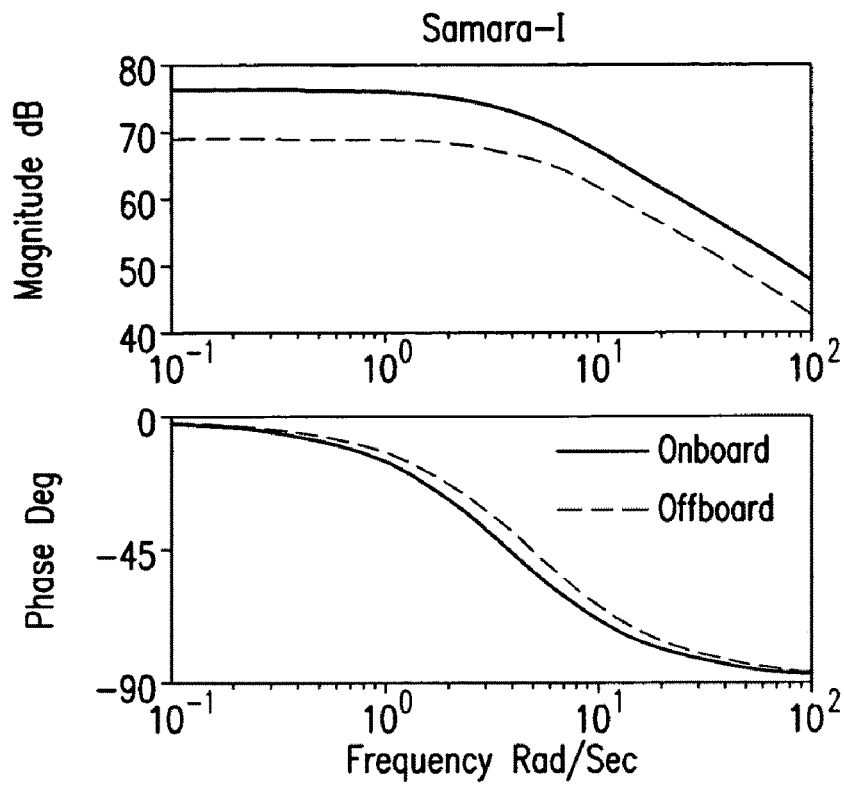
FIGS. 22A-22B are diagrams representing magnitude and phase versus frequency for Samara I and Samara II models, respectively.
Figure 22B:
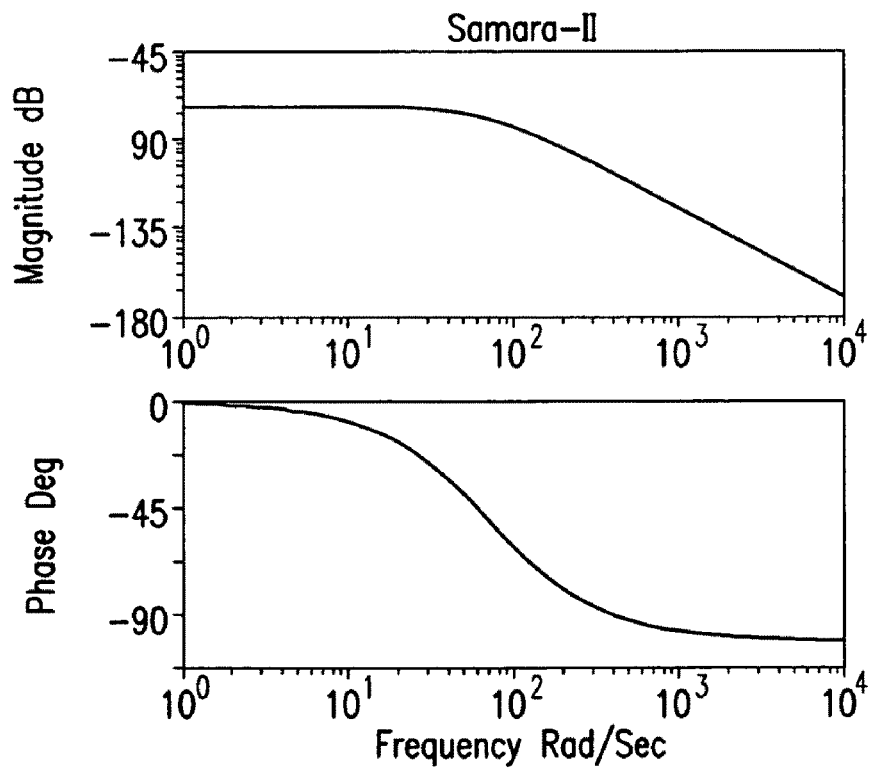

The magnitude-squared coherence for the input/output relationship of Samara I, using the onboard actuator system for input measurement, is shown in FIG. 21A. It can be seen that the useful frequency for this input/output pair lies in the range of 0.3 to 10 Hz. The coherence and useful frequency range predicted by the onboard measured $\theta_0$ is equivalent to that of the offboard measurement (FIG. 21A). The similarity of the two predictions validates the hypothesis that offboard measurements of $\theta_0$ are capable of capturing the physics relevant for system identification. The onboard measurement of $\theta_0$ for Samara II (FIG. 21B) demonstrates some high frequency behavior above 55 rad/s and may be a result of the aeroelasticity of the wing in flight.

Samara-I does exhibit lower correlation than Samara II below 5 Hz, most likely due to less excitation of Samara I in that frequency range as compared with Samara II. Despite the lower frequency content observed in the flight test of Samara I, all three coherence plots demonstrate similar ranges for strong relationships between input and output.

B. Open-Loop Control

The transfer function of the pitch-input-to-heave dynamics was modeled as a first-order continuous-time process model:

$$G_p(s) = \frac{K}{s - T_{pl}} = \frac{W(s)}{\Theta(s)}, \quad (41)$$

where k, s, $T_{pe}$, w(s), and θ(s) may be found with Nomenclature list presented herein.

Given a flight data set with sufficient coherence, as seen in FIGS. 21A-21B, the MATLAB® system identification toolbox may be used to compute frequency response-based system identification. The input and output data are imported to the system identification GUI (Graphical User Interface) where it is filtered to 100 rad/s using a fifth-order Butterworth filter.

Table 11 presents the values identified for the subject robotic Samara air vehicle for the collective-to-heave velocity transfer function using data from both methods of measuring pitch input. In comparing the two methods of identification, it is important to note that both methods identify K (static gain) and $T_{pl}$ (time constraint) to be on the same order of magnitude, proving both methods have similar capabilities in capturing the input/output relationship. The transfer functions of the computed models are plotted in FIGS. 21A-21B and 22A-22B for Samara I and Samara II models.

TABLE 11

| | Identified robotic Samara parameters | | |
| --- | --- | --- | --- |
| | Samara I | Samara I | Samara II |
| $\theta_0$ | Offboard | Onboard | Onboard |
| K | −13.643 | −24.689 | −21.44 |
| $T_{pl}$ | −4.864 | −3.814 | −1.690 |

C. Error Analysis

A state-space model was created allowing for error estimation, using the CR (Cramér Rao) bounds, and is represented as $$\dot{X} = AX + BU \quad (42)$$

$$Y = CX \quad (43),$$

where $\dot{X}$ is the derivative of the state vector, A is a dynamics matrix, B is a control matrix, C is an output matrix, X is a state vector, Y is a control output, and $U_T = [\theta_0]$, where $\theta_0$ is a control input (pitch), as found in the Nomenclature list presented herein.

The state-space model for this identification reduces to $$\dot{\omega} = Z_\omega \omega - Z_{\theta_0} \theta_0 \quad (44)$$

The CR bounds are theoretical minimum limits for the expected standard deviation I in the parameter estimates. The following conditions are suggested to represent the most valid parameter estimates: CR≦20% and Ī≦10%. The CR and Ī percentages were found using the Comprehensive Identification of Frequency Responses software (CIFER). The parameter estimates and associated error bounds of the identified state-space model are presented in Table 12. The validity of the identified parameter estimates is hereby demonstrated, as all parameters meet the conditions specified.

TABLE 12

Robotic Samara-identified parameter with CR error estimates

| | Term | Value | CR, % | Ĭ, % |
|---|---|---|---|---|
| Onboard Samara I | $Z_\omega$ | −6.382 | 10.04 | 4.231 |
| | $Z_{\theta_0}$ | −15.880 | 4.733 | 1.994 |
| Offboard Samara I | $Z_\omega$ | −4.303 | 9.413 | 3.808 |
| | $Z_{\theta_0}$ | −28.130 | 5.022 | 2.032 |
| Onboard Samara II | $Z_\omega$ | −20.640 | 13.670 | 2.064 |
| | $Z_{\theta_0}$ | −1.501 | 12/840 | 1.939 |

The model computed from both on/offboard measurement of the collective angle input is capable of capturing most of the low-frequency inputs but may be seen to average higher-frequency excitation. The model computed from the offboard measurement of the collective angle input performs well at the lower frequencies but tends to average the higher-frequency excitation The model exhibits more overshoot than that of the model derived from onboard measurements. The small differences in the performance of the two methods of input measurement validate the ground-based input observation method. A comparison of the poles identified by MATLAB and CIFER is displayed in FIGS. 23A-23B for Samara I and Samara II, respectively. The control derivative is a negative number as an increase in collective pitch $\theta_0$ results in an increase in rotor thrust.

D. Heave Dynamics

The heave dynamics of the robotic Samara mono-wing aircraft in hover are described by $$\dot{\omega} - Z_\omega \omega = 0 \quad (45)$$

which has the analytical solution $$\omega(t) = \omega_0 e^{Z_\omega t} \quad (46)$$

Figure 23A:
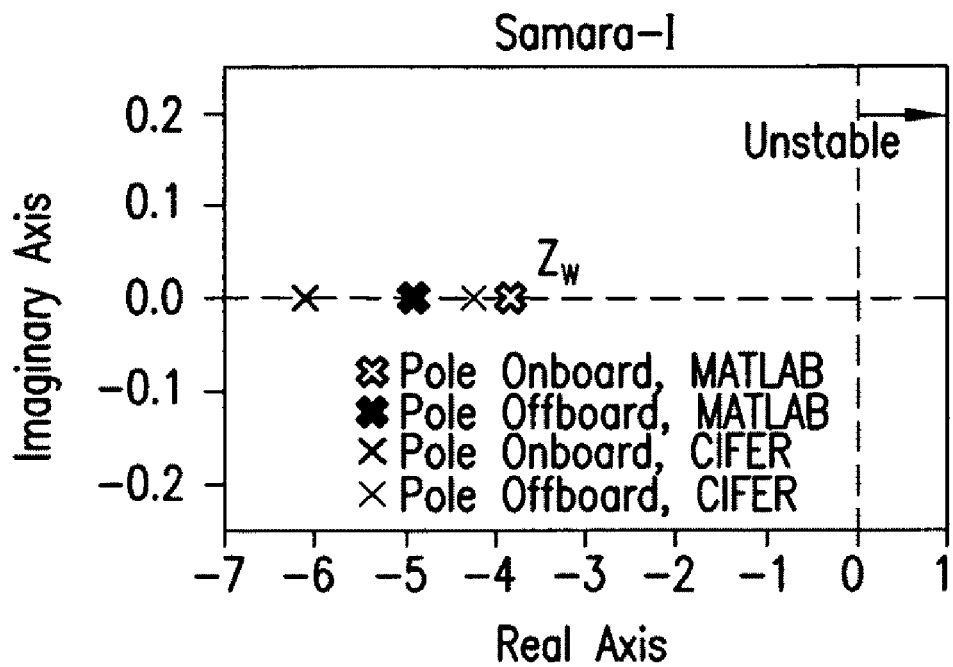
FIGS. 23A-23B are diagrams representing the results of error analysis for Samara I and Samara II models, respectively.
Figure 23B:
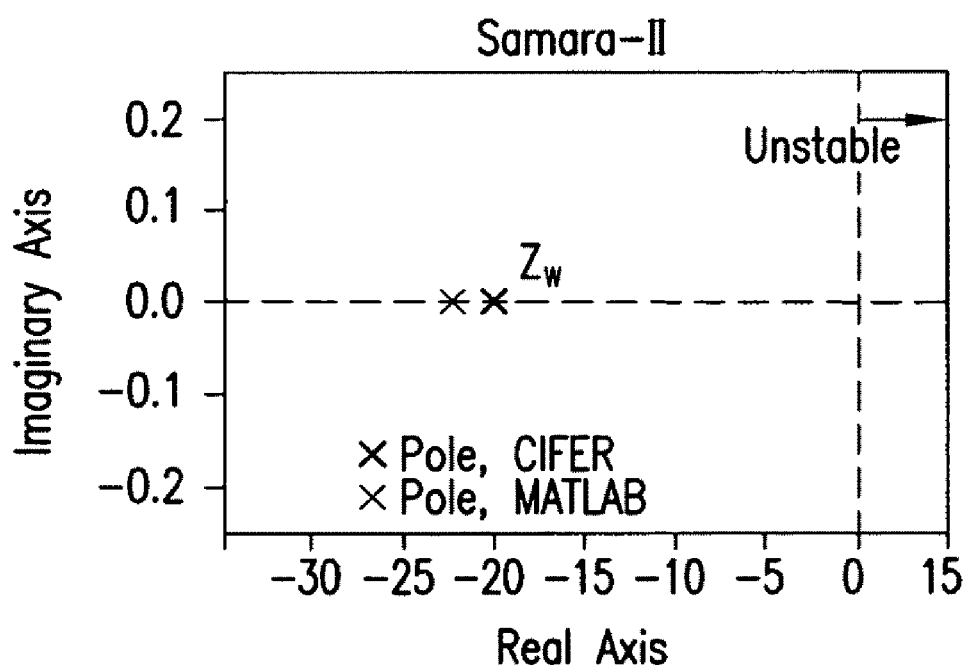
Figure 24A:
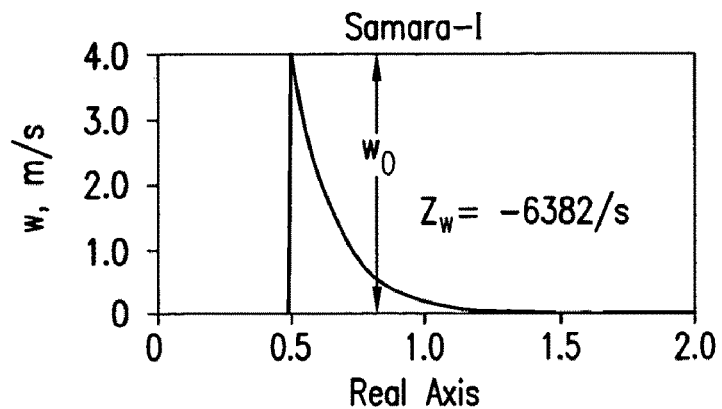
FIGS. 24A-24B are diagrams representing altitude (Z), the heave velocity (w) and change in response to a perturbation of heave velocity for Samara I model.
Figure 24B:
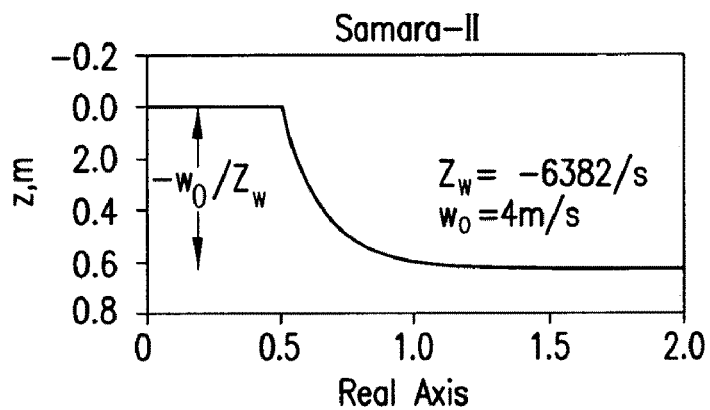

Because the heave stability derivative $Z_\omega$ is negative, the motion following a heave perturbation is a stable subsidence, as shown in FIGS. 24A-24B for Samara I and Samara II, respectively. For example, a positive heave perturbation will generate an upflow through the robotic Samara rotor disk and increase thrust, which acts in the negative direction of the $\hat{c}_z$-body axis. This also implies that, in hover, the robotic Samara aircraft will have a real negative pole, as shown in FIGS. 23A-23B. It is also possible to obtain the expression for altitude loss due to a velocity perturbation $\omega_0$. For a robotic Samara in hover, $\omega = \dot{z}$ and $$z(t) = \int_0^t \omega dt + z_0 = \omega_0 \int_0^t e^{Z_\omega t} dt + z_0 \quad (47)$$

where $z_0$ is the initial altitude. Integrating from $\{0, t\}$ yields $$z(t) = z_0 - \frac{\omega_0}{Z_\omega}[1 - e^{Z_\omega t}] \quad (48)$$

from which the asymptotic value of altitude loss is $$\lim_{t \to \infty} \Delta z = -\frac{\omega_0}{Z_\omega} \quad (49)$$

The robotic Samara altitude change in response to a perturbation of heave velocity is shown in FIGS. 24A-24B.

E. Heave Response to Pilot Input

Consider a step input of collective pitch $\theta_0 = 0.4$. After a change of variables, the heave dynamic equation can be written as $$\dot{\omega}_1 - Z_\omega \omega_1 = 0 \quad (50)$$

where $$\omega_1(t) = \omega(t) + \frac{Z_{\theta_0}}{Z_\omega}\theta_0; \ \dot{\omega}_1 = \omega \quad (51)$$

The analytic solution of the first-order differential equation is $$\omega_1(t) = \omega_{1_0} e^{Z_\omega t} \quad (52)$$

with $$\omega_{1_0} = \left\{\omega + \frac{Z_{\theta_0}}{Z_\omega}\theta_0\right\}_{t=0^+} \quad (53)$$

For the robotic Samara in a steady hover, $\omega = 0$, which reduces the solution of $\omega_1(t)$ to $$\omega_1(t) = \frac{Z_{\theta_0}}{Z_\omega}\theta_0 e^{Z_\omega t} \quad (54)$$

Thus, the heave velocity response to the input of collective pitch reduces to $$\omega(t) = -\frac{Z_{\theta_0}}{Z_\omega}\theta_0(1 - e^{Z_\omega t}) \quad (55)$$

Figure 25:
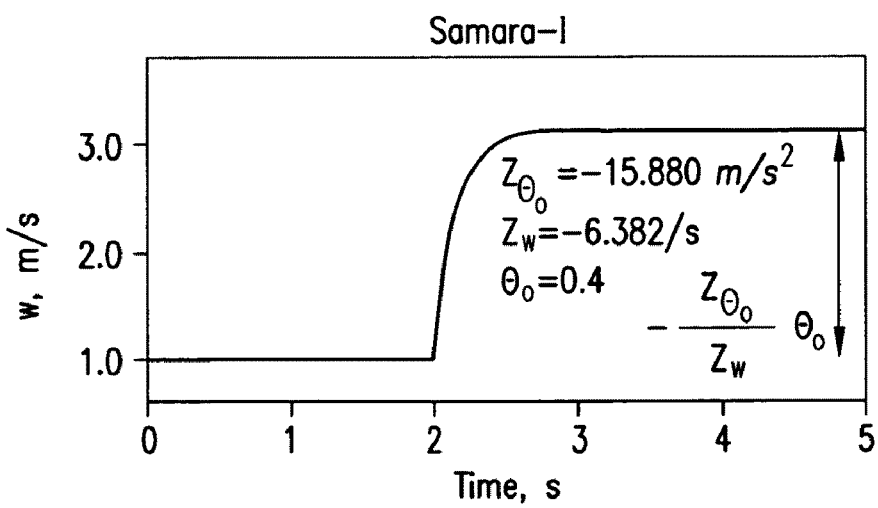
FIG. 25 is a diagram representing aircraft heave response to an input of collective pitch.

An example of the first-order character of the vertical speed response to a step input of collective pitch is shown in FIG. 25. This is a basic characteristic of the behavior of a robotic Samara and is clearly identifiable in results obtained from mathematical models and flight tests.

F. Closed-Loop Feedback Control

Figure 26:
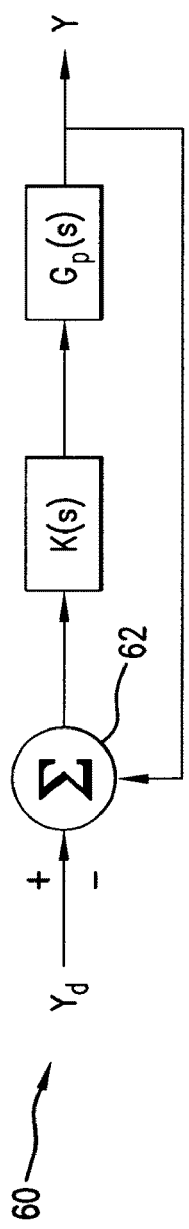
FIG. 26 is a block diagram of the feedback control loop.

Feedback control is used to correct for perturbations in the system in order to keep the vehicle at a reference condition. The structure of the closed-loop system 60 is depicted in FIG. 26. Precise attitude data are collected by the VICON motion capture system. The commanded altitude of the Samara aircraft was maintained by feeding back the error in position to a control loop that contains the dynamics of the system and the actuator of the off-board controller. The closed-loop system attempts to compensate for errors between the actual and reference height of the Samara aircraft by measuring the output response Y, feeding the measurement back and comparing it to the reference value $Y_d$ at the summing junction 62. If there is a difference between the output and the reference, the system drives the aircraft's wing to correct for the error.

A Proportional Plus Derivative Plus Integral (PID) controller was chosen for feedback control of the robotic Samara. A PID controller in FIG. 26 is described by the equation, $$K(s) = K_p + K_d s + \frac{K_i}{s}, \quad (56)$$

where s is the Laplace transform of the time domain equation into frequency domain. The Gp(s) function of FIG. 26 is described by Eq. 41 presented supra herein. A PID controller feeds the error plus the derivative of the error forward to the wing. The proportional gain provides the necessary stiffness to allow the vehicle to approach the reference height. The proportional gain improves the steady-state error but may cause overshoot in the transient response, whereas the derivative gain improves transient response. The integral term is proportional to both the magnitude and duration of the error in position, with the effect of eliminating the steady-state error.

Figure 27A:
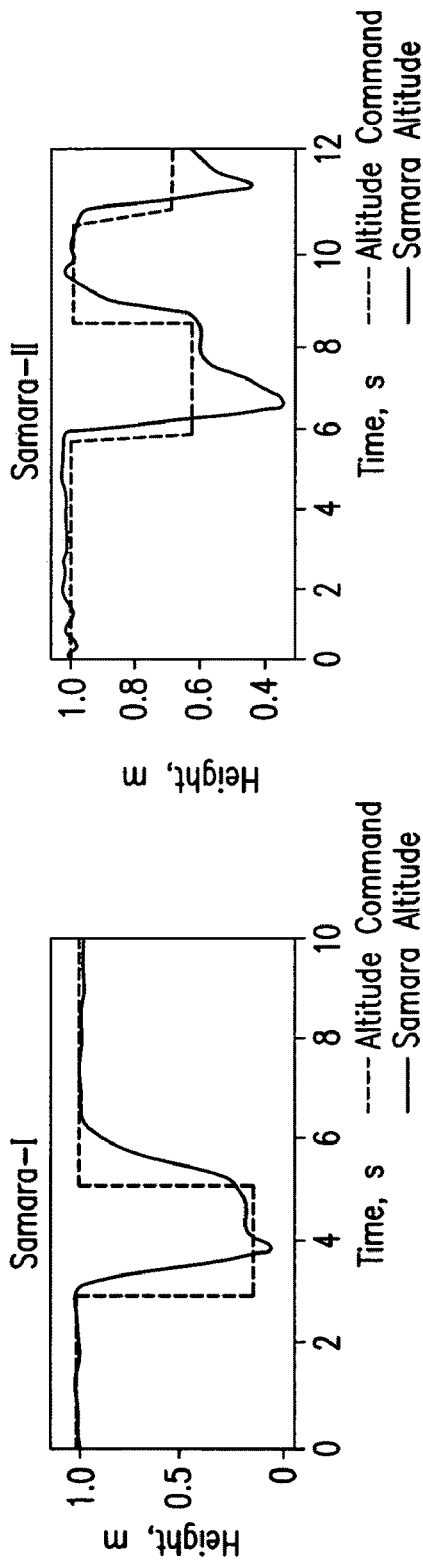
FIGS. 27A-27B are diagrams showing height and heave velocity (w) for Samara I (FIG. 27A) and Samara II (FIG. 27B) responsive to the PID control.
Figure 27B:
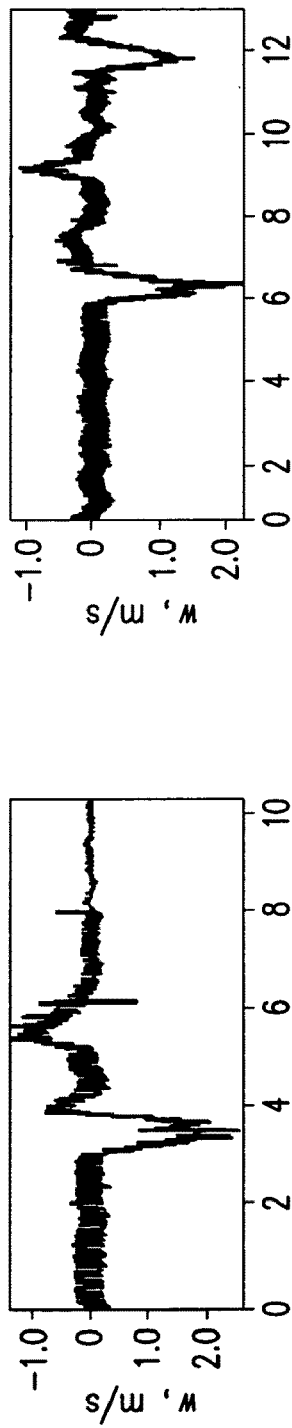

Using the ground control station setup shown in FIG. 20 for closed-loop feedback control, several gain combinations were tested in order to find the PID gains, providing the best transient response to a change in reference height. FIGS. 27A-27B depict a representative data set of a flight test with the implementation of the PID controller for Samara I and Samara II, respectively, using the gains presented in Table 13, demonstrating that the actual height closely matches the reference height.

TABLE 13

PID gains for feedback control

| Gain | Samara I | Samara II |
| --- | --- | --- |
| $K_p$ | 0.211 | 0.344 |
| $K_d$ | 0.889 | 0.133 |
| $K_i$ | 0.028 | 0.020 |

The dashed line in FIGS. 27A-27B is the altitude specified by the ground station. The solid line is the vertical flight path of the aircraft in question. The change in altitude specified for ascent and descent are the same and, for a linear controller, the initial change in collective input is also the same. However, the resulting heave velocity in ascent is half the value observed in descent for both the Samara I and Samara II. The characteristic overdamping in climb and underdamping in descent of Samaras I and II are the result of the effect of gravity on the vehicle. In climb, the input wing force is greater than and opposite the force of gravity. In descent, the same input wing force is in the direction of the force of gravity, resulting in a greater acceleration.

The settling time $T_s$ of the Samara I for a climbing maneuver is 1.03 s with no overshoot. A descending maneuver settles to 90% of the final value within 1.45 s, with an overshoot of 22%. The smaller Samara II reached 90% of its final value in 1.7 s, with an overshoot of 60% for a descent maneuver. The settling time for a climbing maneuver is 0.7 s, with a 4% overshoot. It can be seen that the forces induced on the body from a change in collective pitch are substantial when compared with the inertia of the vehicle, as increases in heave velocity are quickly damped after excitation.

Following the identification of the linear model, describing the heave dynamics of two robotic Samara vehicles, e.g., Samara I and Samara II, for use in future control and state estimation the control model for the robotic Samara aircraft, including the dynamics of a coordinating helical turn has been developed, as will be presented infra herein.

The asymmetric and all-rotating platform requires the development of a novel sensing and control framework. For this, the general rigid body dynamics have been separated into rotor dynamics and particle navigation, which were derived for a coordinated helical turn flight path. The equations of motion have been used to calculate the forces necessary for flight along a trajectory recorded with a visual motion capture system. The result is a framework for state estimation and control, applicable to scaled versions of the robotic Samara.

As was presented supra herein, the layout of the subject Samara aircraft includes two rigid bodies linked by a servo mechanism allowing one rotational degree of freedom. The first rigid body and main lifting surface resembles a scaled version of a Samara both in planform geometry and airfoil cross section. The second rigid body houses the electronics and motor/propeller unit applying a torque to rotate the vehicle as required for flight. The body fixed axis $[\hat{c}_x, \hat{c}_y, \hat{c}_z]$ and Euler angles $[\phi_\omega, \theta_o, \psi_\omega]$ describe the orientation of the vehicle, which is shown in FIG. 16D, along with the dimensions of the vehicle.

Flight of a monocopter differs from full scale helicopters as there exists no stationary frame of reference from which control inputs can be applied, i.e. helicopter swashplate. Control of the vehicle with once per revolution inputs requires knowledge of the vehicle's orientation relative to the desired flight path, but sensor packages capable of recording onboard flight data at the rate necessary for this type of control are not commercially available in the weight class required for use on micro/nano-class vehicles. Instead, control algorithms development is based on state information collected externally using a visual motion capture system. This approach has been successful in identifying the pitch and heave dynamics of similar vehicle which was described supra herein. An approach to directional control which does not require the once per revolution actuation or high frequency measurement of vehicle orientation is discussed in detail further herein.

The obtained position estimates are exceptionally low noise. The position noise variance was estimated by recording data while not moving the vehicle. Inertial velocity estimates were calculated by differentiation of the inertial position, using a central difference scheme.

Flight Dynamics Model

A. Virtual Body Model

For the subject robotic Samara, in contrast to traditional MAVs, the body orientation evolves over time, ranging from a steady rotation rate about the $\hat{i}_z$ axis in hover to a more complex pitching, rolling, flapping and rotating motion in other flight conditions such as the translational flight condition addressed in the current study.

To simplify the description, the "disk" described by the motion of the wingtip over each revolution, or "tip path plane" (TPP) is considered for further analysis of the motion of the subject mono-wing aircraft. As defined in traditional rotorcraft analysis, the TPP considered is one that discards the harmonic motion higher than 1/rev, allowing a plane to be defined from the surface. The aerodynamic lift force may be considered to act perpendicular to the TPP.

Figure 28:
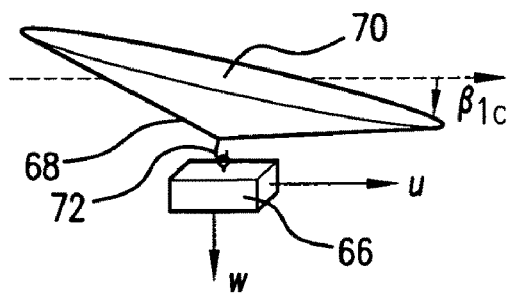
FIG. 28 is a schematic representation of modeling the aircraft of the present invention as a rotor with a hinged virtual body.

To describe the dynamics of the Samara aircraft, a virtual (rigid) body 66 connected to the disc center 68 of the disk 70 with an ideal hinge 72 is considered, with its center of gravity (CG) located directly below the disc center and with the mass of the Samara aircraft, as shown in FIG. 28. No aerodynamic moments may be transmitted across an ideal hinge, splitting the position/orientation dynamics into rotor dynamics describing the flapping motion of the wing, and positional dynamics of the Samara aircraft to be described using the translational equations of motion for the motion of a point mass acted upon by the rotor disc forces.

Figure 29:
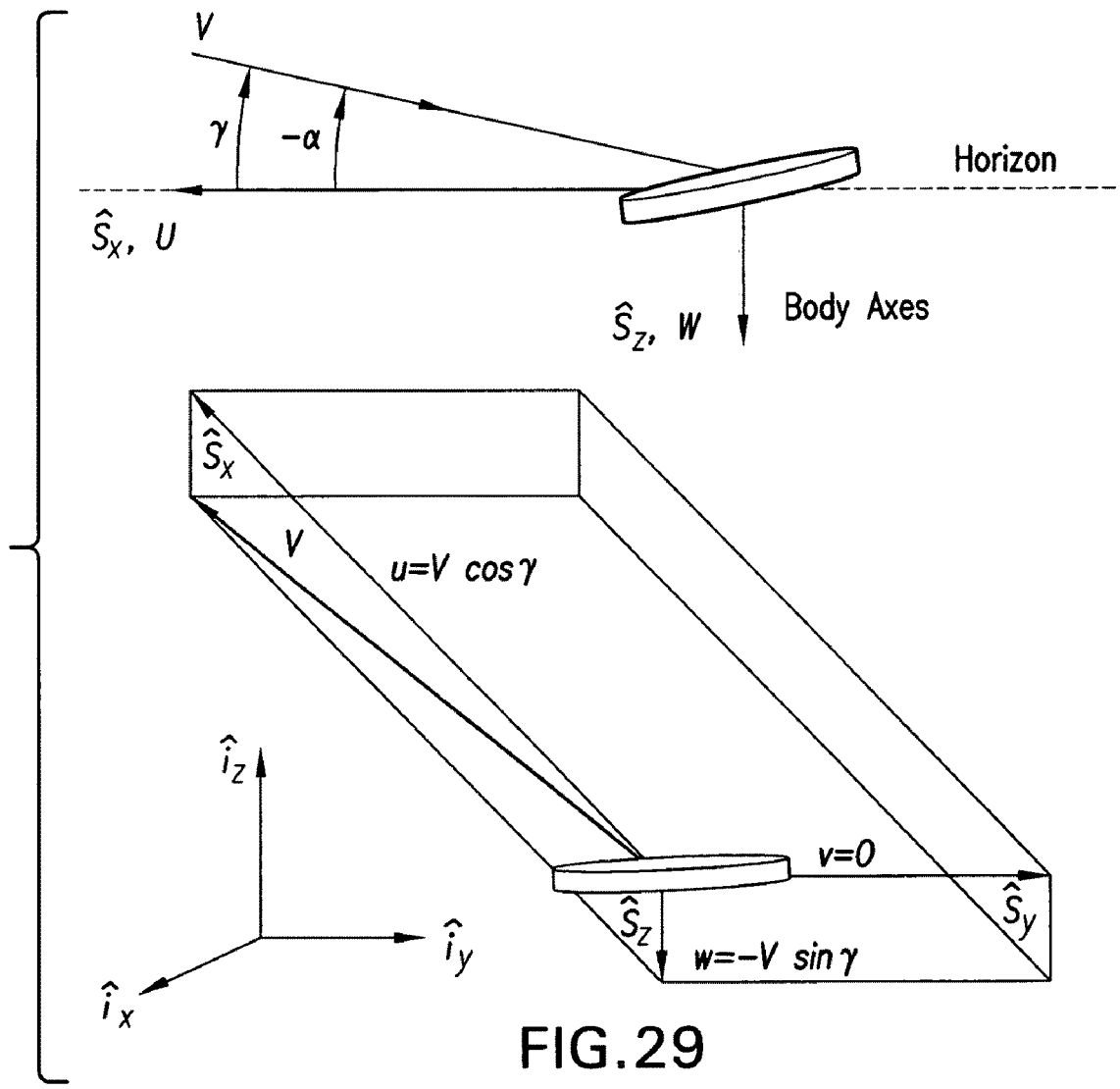
FIG. 29 is a diagram showing definition of angle of attack and side slip angle in relation to the velocity components.

The forward flight of the vehicle in question is most conveniently formulated in a non-rotating frame of reference attached to the virtual body. The orientation of the virtual body forward velocity u is defined by the projection of the velocity vector onto the $[\hat{i}_x, \hat{i}_y]$ plane so that translation may only occur in the u direction and v=0. The heave velocity w is parallel to the inertial $\hat{i}_z$ axis and is shown in FIG. 29. Also shown is the equal and opposite definitions of aerodynamic incidence α, and the flight path angle γ in relation to the virtual body velocities, u, w. The cyclic blade flapping is defined as the angle between the wing and the inertial plane $[\hat{i}_x, \hat{i}_y]$:

$$[u,v,w]^T = [V\cos\gamma, 0, -V\sin\gamma]^T \quad (57)$$

B. Equations of Motion for a Flapping Blade

Figure 30:
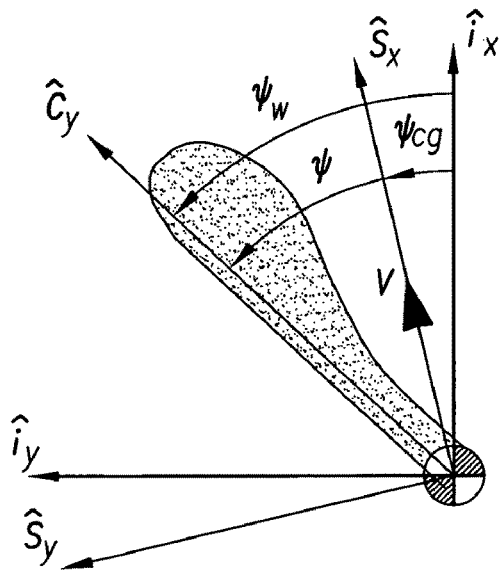
FIG. 30 is a diagram representing azimuth angles of the wing, virtual body and virtual body with respect to the wing.
Figure 31:
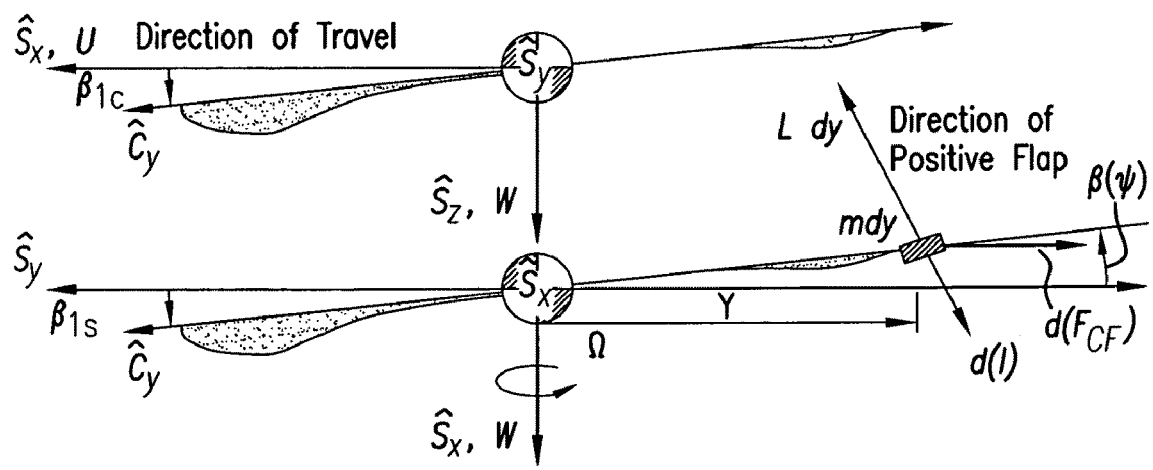
FIG. 31 is a schematic representation of the coning angles with forces acting on an element of a flapping mechanical Samara wing.
Figure 32A:
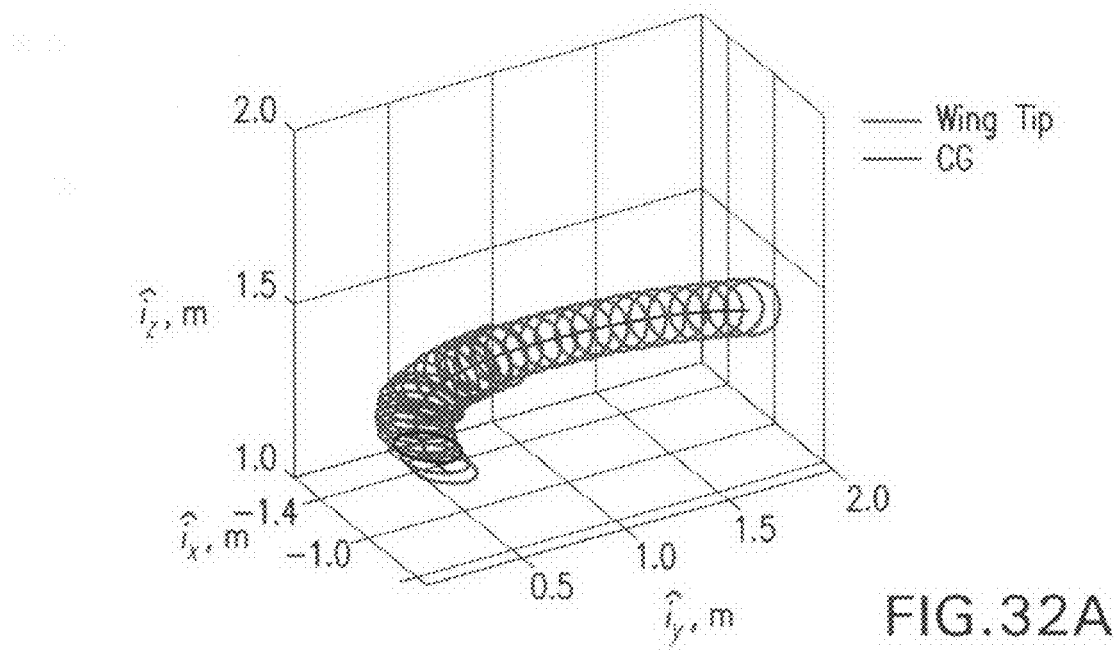
FIGS. 32A-32D show a flight path (FIGS. 32A-32B) and corresponding turn radius and turn rate (FIGS. 32C-32D) of the aircraft of the present invention.
Figure 32B:
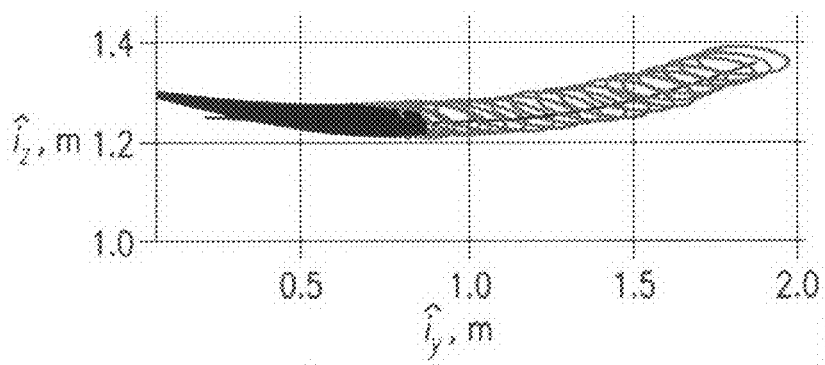
Figure 32C:
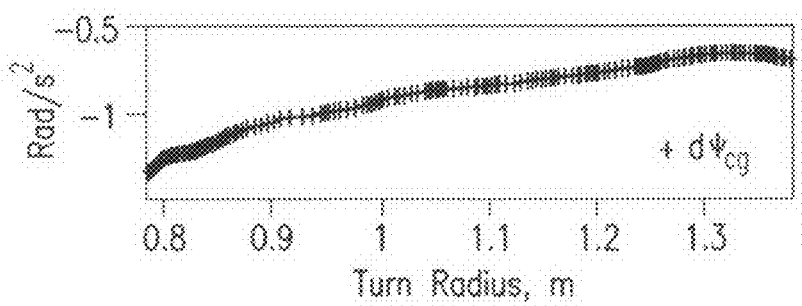
Figure 32D:
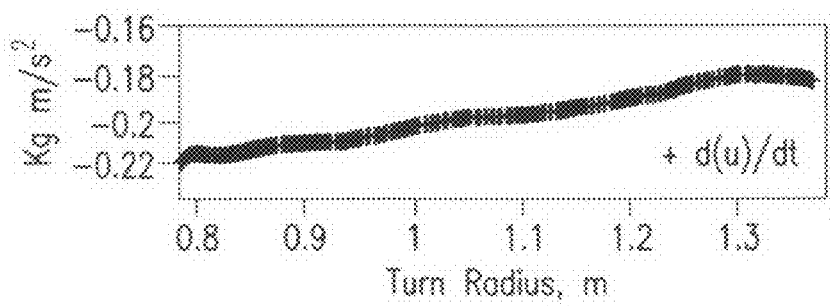

FIG. 30 defines azimuth angles of the wing $\psi_\omega$, virtual body $\psi_{cg}$, and virtual body with respect to the wing $\psi$. FIG. 31 defines coning angles $\beta_{1s}$, $\beta_{1c}$ with forces acting on an element of a flapping robotic Samara aircraft's wing.

In steady hovering flight the coning angle $\beta = \beta_0$ = constant and is independent of $\psi$. In forward flight the cyclically varying airloads induce an additional flapping response that varies about the azimuth $\psi$. The aerodynamic, centrifugal, and inertial forces acting on the robotic Samara aircraft's wing determine the observed coning angle, FIG. 31. A positive movement is defined as one which acts to reduce the β. The centrifugal force $M_{CF}$ may then be written for an element along the span as $$d(M_{CF}) = my^2\Omega^2\beta dy \quad (58),$$

where y is the distance along the wing, and the inertial moment about the flap hinge as $$d(I) = my^2\ddot{\beta}dy \quad (59),$$

Additionally the aerodynamic moment is $$d(M_\beta) = -Lydy \quad (60),$$

where L is the lift of the wing.

The sum of the applied moments from the differential equation describing the blade flapping motion. The flap equation may be written as a function of azimuth angle instead of time, where $\psi = \Omega t$ results in the following transformation:

$$\dot{\beta} = \Omega\overset{*}{\beta} \text{ and } \ddot{\beta} = \Omega^2\overset{**}{\beta} \quad (61)$$

The equation of motion of the robotic Samara aircraft's flapping wing reduces to $$\overset{**}{\beta} + \frac{\gamma}{8}\overset{*}{\beta} + \beta = \frac{\gamma}{8}\left[\theta - \frac{4}{3}\lambda_I\right], \quad (62)$$

where γ is the lock number of the robotic Samara aircraft, $$\dot{\beta} = \frac{\partial\beta}{\partial t} = \Omega\frac{\partial\beta}{\partial\Psi} = \Omega\overset{*}{\beta}$$

$$\ddot{\beta} = \frac{\partial^2\beta}{\partial t^2} = \Omega^2\frac{\partial^2\beta}{\partial\Psi^2} = \Omega^2\overset{**}{\beta}$$

The lock number is a function of the aerodynamic and geometric parameters listed in Table 14 and is computed as $$\gamma = \frac{\rho Cl_\alpha cR^4}{I_b} = 6.75. \quad (63)$$

Detailed numerical and steady state analytic solutions for the flap equation in Eq. 62 have demonstrated good agreement with a first order harmonic series. Harmonic analysis of the flap equation allows a periodic solution of the form $$\beta = \beta_0 + \beta_{1s}\sin(\psi) + \beta_{1c}\cos(\psi). \quad (64)$$

The blade flapping throughout the u-turn is observed to be periodic with respect to the azimuth angle $\psi$. The periodic coefficients describe the direction of force and may be seen to correlate with both the velocity and acceleration of the virtual body in FIGS. 32A-32D. The $\beta_{1c}$ term influences the magnitude of u; and the $\beta_{1s}$ term influences the magnitude $\|V_{cg}\|$. The coefficients $\beta_{1s}$, $\beta_{1c}$ are the out of plane flapping angles that describe the orientation of the wing within the disk. The orientation of the virtual body defines the roll and pitch angles to be $\phi = \beta_{1s}$ and $\theta = \beta_{1c}$, respectively. Thus the flapping of the wing in forward flight describes the instantaneous orientation of the virtual body which includes the coning angle $\beta_0$.

TABLE 14

ROBOTIC SAMARA WING PROPERTIES

| Measurement | Symbol | Value | Unit |
|---|---|---|---|
| Air density | ρ | 1.225 | Kg/m³ |
| Mean chord | c | 3.5 | cm |
| Wing length | R | 18 | cm |
| Lift curve slope | $C_{l\alpha}$ | 3.5 | — |
| Wing inertia | $I_b$ | 23.3μ | Kgm³ |

C. Rigid Body Equations of Motion

The rigid body equations of motion are differential equations that describe the evolution of the state variables subject to applied forces. In body-fixed axes the sum of all external forces applied to the center of gravity is $$m\dot{V}_{cg} + mS(\omega)V_{cg} = f \quad (65),$$

where m is the vehicle mass, $V_{cg} = u\hat{s}_x + v\hat{s}_y + w\hat{s}_z$ is the translational velocity of the center of gravity, $\omega = p\hat{s}_x + q\hat{s}_y + r\hat{s}_x$ are the body-fixed roll, pitch and yaw rates, $f = f_x\hat{s}_x + f_y\hat{s}_y + f_z\hat{s}_z$ are externally applied forces, and S(•) is a skew operator.

The rotational dynamics are governed by the differential equation $$I\dot{\omega} + S(\omega)I\omega = \tau \quad (66),$$

where τ is a vector of externally applied torques and I is a diagonal inertia matrix arising from symmetries in the virtual aircraft.

D. Coordinated Helical Turn

The flight path of the vehicle resembles a steady banked turn such that $\dot{\phi}_0$ and $\dot{\theta}_0$ are equal to zero. Additionally γ the flight path angle (>0 for climbing flight) is small so that sin γ=γ and cos γ=1. The kinematic equations are then $$p = -\dot{\psi}_{cg}\sin\beta_{1c} \quad (67)$$

$$q = \dot{\psi}_{cg}\cos\beta_{1c}\sin\beta_{1s} \quad (68)$$

$$r = \dot{\psi}_{cg}\cos\beta_{1c}\cos\beta_{1s}. \quad (69),$$

where $\dot{\psi}_{CG}$ is a turn rate.

Substituting the derived velocities and modified kinematics into the force equilibrium equations results in the following equations of motion:

$$X = mg\sin\beta_{1c} + m(\dot{u} + \omega q - vr) \quad (70)$$

$$Y = mg\cos\beta_{1c}\sin\beta_{1s} + m(\dot{v} + ur - \omega p) \quad (71)$$

$$Z = mg\cos\beta_{1c}\cos\beta_{1s} + m(\dot{\omega} + vp - uq) \quad (72),$$

where $[X, Y, Z]^T$ represent force equilibrium in the body fixed coordinate frame, and g is acceleration due to gravity.

Flight tests conducted with the robotic Samara aircraft provide a means of verifying the equations of motion. A portion of a flight which fits within the constraints of the proposed analytical model is shown in FIGS. 32A-32D.

The variation of $\dot{\psi}_{cg}$ with the turn radius $r_{turn}$ is observed to be linear for most of the trial, where a small but linear change in $r_{turn}$ corresponds to a large change in turn rate $\dot{\psi}_{cg}$. The final portion of the figure shows the linear change in forward speed derivative $\dot{u}$ with respect to $r_{turn}$.

E. Extension to Forward Flight

1) Pure longitudinal motion: Consider now straight flight as a special case of a coordinated turn, where $\dot{\psi}=p_0=q_0=r_o=\beta_{1s}=0$. The equation of motion along the $\hat{s}_x$-axis for forward flight may be written as the combination of a nominal condition (represented by [ ]$_0$) and a small perturbation $\Delta$[ ] as:

$$X_0+\Delta X - mg[\sin(\beta_{1c_0}) + \Delta\beta_{1c}\cos(\beta_{1c_0})] = \Delta \dot{u} \quad (73)$$

Setting all perturbation quantities to zero $\Delta$[ ]=0 yields the force equilibrium along trimmed forward flight:

$$\frac{X_0}{m} = g\sin\beta_{1c_0} \quad (74)$$

2) Perturbation equations: The trimmed forward flight Eq. (74) can be subtracted from the linearized force equilibrium Eq. (73) leading to a description of small perturbation motion about the equilibrium condition as:

$$\Delta \dot{u} = \frac{\Delta X}{m} - g\Delta\beta_{1c}\cos\beta_{1c} \quad (75)$$

Separating out the linear effects of the longitudinal variables [u, ω, $\beta_0$, $\beta_{1c}$] facilitates development of a canonical linear control model, and may be written as:

$$\frac{\Delta X}{m} = X_u \Delta u + X_\omega \Delta\omega + X_{\beta_0}\Delta\beta_0 + X_{\beta_{1c}}\Delta\beta_{1c} + X_\theta \Delta\theta, \quad (76)$$

where $X_{[\cdot]}=(1/m)\partial X/\partial[\cdot]$.

The time-invariant linear system may now be expressed in state space form:

$$\dot{x}=Ax+Bu \quad (77)$$

where $$x=[\Delta u, \Delta\omega, \Delta\beta_0, \Delta\beta_{1c}]^T \quad (78)$$

and $$u=[\Delta\theta_0] \quad (79)$$

written in matrix form as:

$$[A] = \begin{bmatrix} X_u & X_\omega & 0 & 0 & 0 \\ 0 & 0 & Z_\Omega & Z_{\beta_0} & 0 \\ 0 & 0 & \Omega_\Omega & \Omega_{\beta_0} & 0 \\ 0 & 0 & \beta_{0\Omega} & 0 & 0 \\ \beta_{1c_u} & 0 & \beta_{1c\Omega} & \beta_{1c\beta_0} & 0 \end{bmatrix} \quad (80)$$

and $$[B]=[X_{\theta_0}, Z_{\theta_0}, 0, \beta_{0\theta_0}, 0]^T. \quad (81)$$

Experimental Results

Figure 33B:
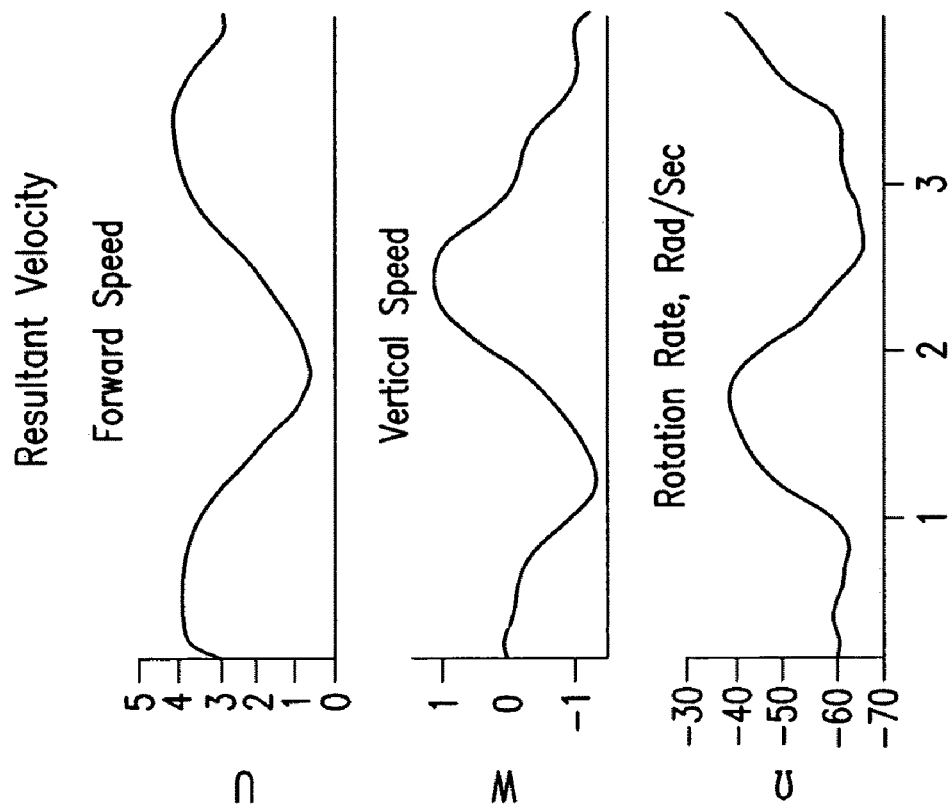
FIGS. 33A-33C are diagrams showing the pilot commands $(F_p, \theta_0)$ in FIG. 33A, resultant velocity components $(u, \omega)$ and rotation rate $(\Omega)$ in FIG. 33B, and resultant flight path and radius of curvature in FIG. 33C.

Lateral directional flight was recorded in the laboratory for a flight path consisting of an initial trim state and a perturbation about the trim, shown in FIG. 33. In general, the turn radius is inversely proportional to the collective pitch of the wing. The Samara aircraft travels in the opposite direction of the motion that would be induced by an impulsive collective input applied at that instant. A non-impulsive, sustained input changes the turn radius of the flight path such that an alternating series of large and small turn radii can steer the vehicle in a specific direction.

Figure 33A:
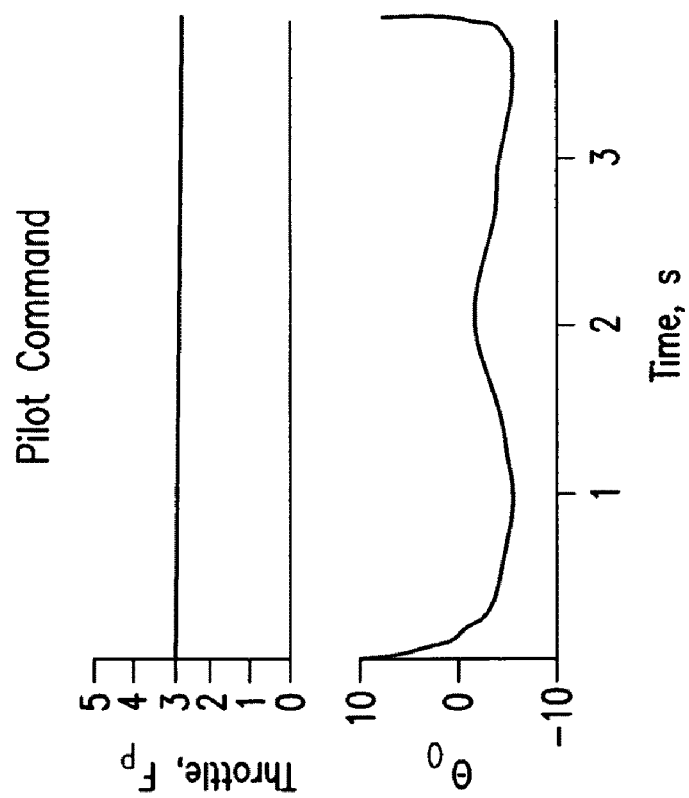
Figure 33C:
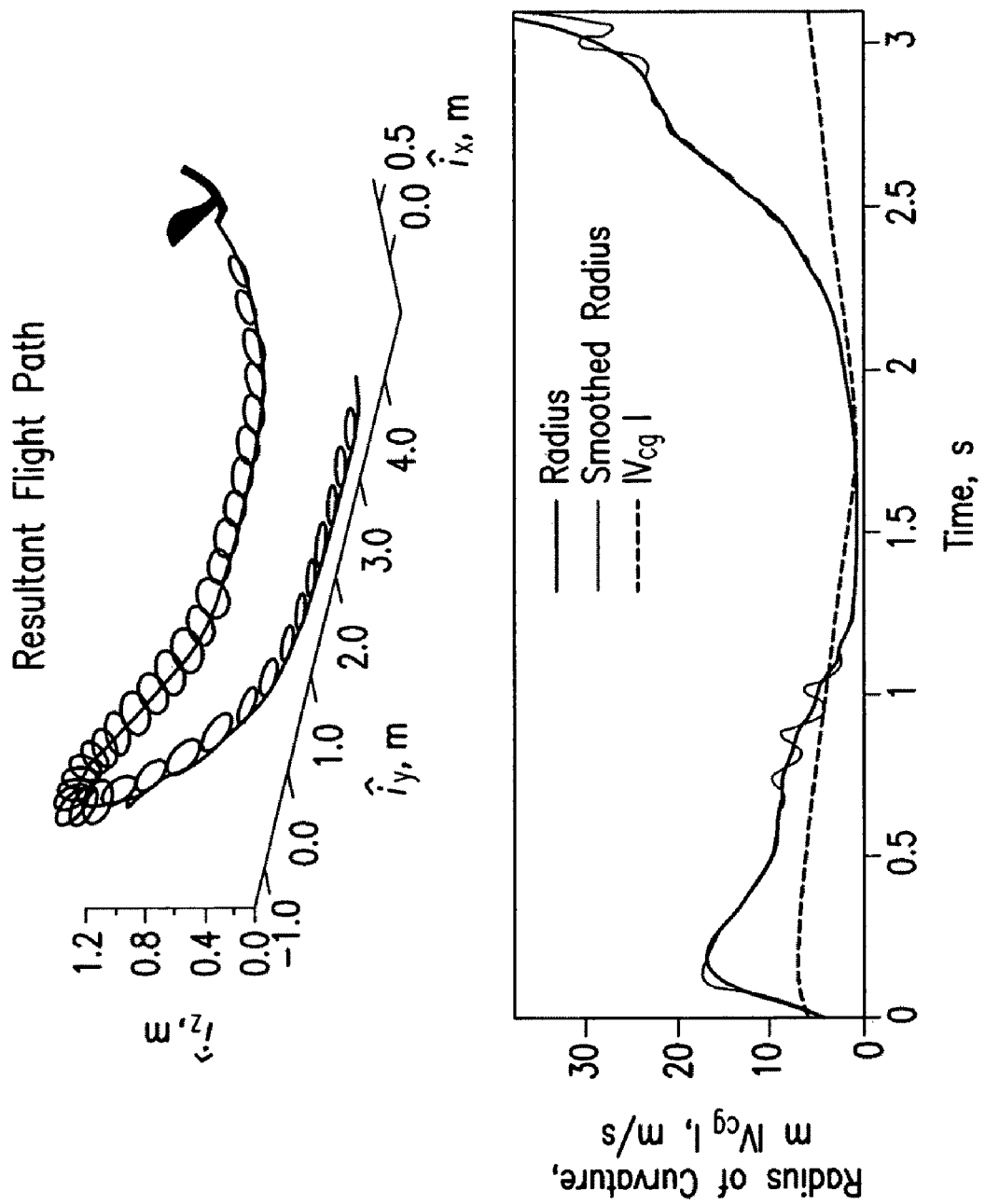

The resulting velocity components (forward u, vertical w), rotation rate Ω (shown in FIG. 33B), and resultant flight path and the radius of curvature (shown in FIG. 33C) are presented as they vary with the input pitch $\theta_0$ and throttle $F_p$ (shown in FIG. 33A). The first 0.5 s of flight correspond to a near constant u and near zero w. At the time of the u-turn, 1-1.5 s, there is an increase in the vertical velocity. The increase is correlated because a collective pitch increase used to change the heave velocity, is also used to change the flight path direction. The flight data shown in FIGS. 33A-33C were used to perform system identification using algorithms implemented in a MATLAB toolbox called System Identification Programs for AirCraft (SIDPAC), detailed in [V. Klein and E. Morelli, Aircraft System Identification, AIAA, 2006].

Guided by analytical modeling, modified step-wise regression was used to determine the model structure using the statistical significance of measured states. This model structure was chosen to maximize the model fit using regressors with a significant partial-f ratio, while minimizing the parameter estimate error bounds. A two-step procedure using the equation-error method, followed by the output-error method, was used to estimate the stability derivatives in the model.

The equation-error method performs a linear estimation at the acceleration level, which has a deterministic solution that is cheap to compute. The output-error method, widely regarded as more accurate, performs a nonlinear estimation at the level at which measurements were taken. This method requires an iterative numerical solver, but initial guesses using an equation-error estimate typically converge quickly.

Parameter estimates and standard errors, corrected for non-white colored residuals, are given in Table 15.

TABLE 15

| Parameter Estimates and Standard Errors | | |
|---|---|---|
| Parameter $\theta$ | Equation-Error $\theta \pm s(\theta)$ | Output-Error $\theta \pm s(\theta)$ |
| $X_u$ | +0.4165 ± 0.1753 | +0.8978 ± 0.3416 |
| $X_\omega$ | +3.7378 ± 0.5694 | +1.6108 ± 0.4431 |
| $X_{\theta_0}$ | −7.9875 ± 21.055 | +114.35 ± 25.827 |
| $Z_\Omega$ | +0.2538 ± 0.0164 | +0.2237 ± 0.0318 |
| $Z_{\beta_0}$ | −57.323 ± 12.301 | −17.695 ± 23.318 |
| $Z_{\theta_0}$ | −14.718 ± 13.399 | +38.942 ± 19.449 |
| $\Omega_\Omega$ | −1.3358 ± 0.2084 | −2.2649 ± 0.5876 |
| $\Omega_{\beta_0}$ | +1001.5 ± 63.791 | +1231.1 ± 219.49 |
| $\beta_{0\Omega}$ | −0.0081 ± 0.0008 | −0.0063 ± 0.0008 |
| $\beta_{0\theta_0}$ | −1.8922 ± 0.3399 | −2.3455 ± 0.3158 |
| $\beta_{1c_u}$ | −0.5881 ± 0.2122 | +0.5628 ± 0.2050 |
| $\beta_{1c\Omega}$ | −0.1145 ± 0.0325 | +0.0872 ± 0.0540 |
| $\beta_{1c\beta_0}$ | +24.323 ± 7.7405 | −22.543 ± 15.787 |

Figure 34:
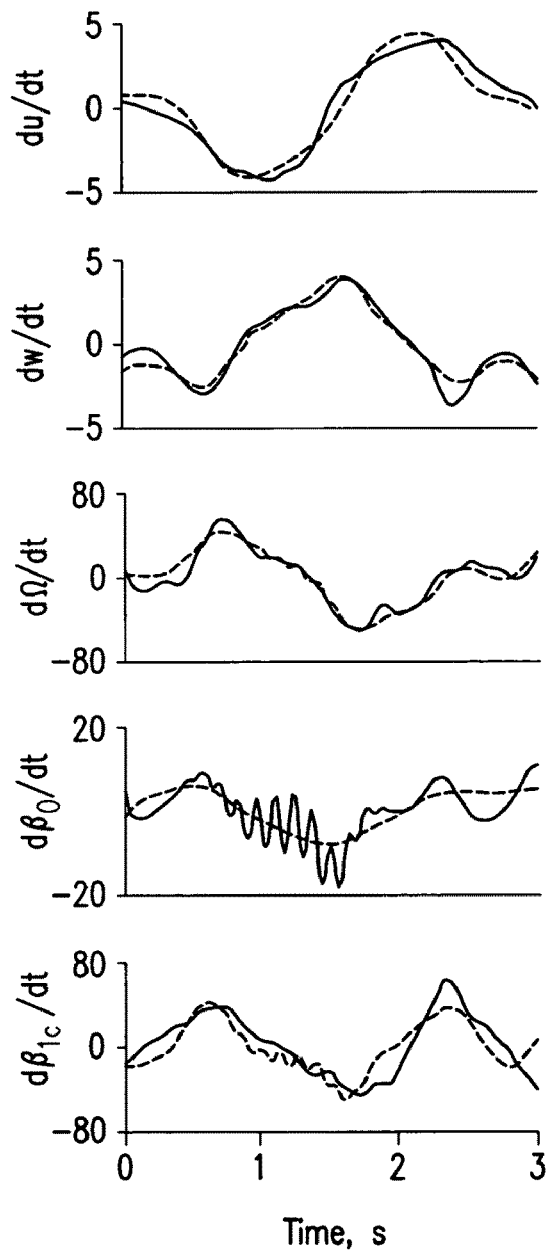
FIG. 34 shows diagrams representing equation-error model fit to perturbation data (high velocity components and rotation rate)
Figure 35:
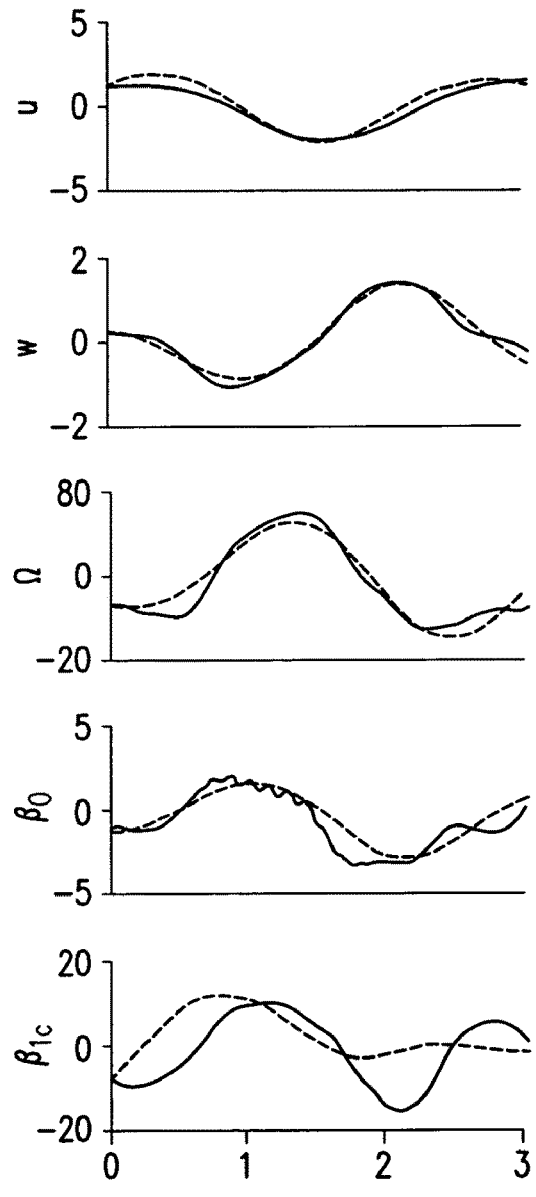
FIG. 35 represents diagrams for output-error fit to perturbation data (velocity components and rotation rate)

Model fits to the perturbation data sets are shown in FIGS. 34-35 for the equation-error and output-error methods, where the measurements are plotted with a solid line and the model outputs are plotted with a dashed line.

An acceptable fit was achieved between the analyzed data and many of the model structure and parameter estimates. The equation-error results had model fits of 0.94, 0.94, 0.91, 0.56, and 0.59 for matching ẋ measurements and fits of 0.85, 0.97, 0.92, 0.83 and 0.12 for matching x measurements. The equations describing the flap dynamics had low model fits for both methods. Several parameters were estimated consistently by the two methods, lying within two standard deviations of each other.

Significant insight may be obtained from the estimates that did not match well or had large error bounds. Much of the inconsistency may be attributed to limited excitation present in the flight data, but it also reveals an important characteristic about the analyzed flight data. For example, the finding that the stability derivative $X_u$ is positive indicates a rare case of forward speed instability. Forward speed instability is normally a localized result and not found in a general flight dynamics result. In this case, the portion of linearized flight used in the equation-error output method fit included a portion of descending flight, during which the robotic Samara (a global stability) exhibits a local instability with respect to forward speed, because arresting a forward velocity requires the rotor disc first be inclined to oppose the motion. The estimated error in this term reflects the fact that the stability derivative was required to fit a more general flight case, but is biased toward descending flight.

In general, the results of the experimentations helped in identifying the Samara aircraft flight dynamics. The nonlinear Euler equations were used to describe the rigid body dynamics of the vehicle in a steady turn. The rotating wing motion was treated as simple harmonic oscillator and coupled to the virtual body equations of motion which combine to form a set of seven nonlinear differential equations.

The equations of motion for the steady turn were extended to forward flight and linearized about a trim state, resulting in five linearized small perturbation equations in state space form. Flight tests provided high accuracy position information that was reduced to wing flap angles and virtual body velocities.

This information was used to specify a flight condition that fits within the limits of the derived model allowing for estimation of the parameters defined in the A and B matrices (Eqs. 80-81). Several linear relationships were shown to exist including [$r_{turn}$,ů], and [$r_{turn}$,ψ̇], The steady turn discussed here has been observed in scaled versions of the robotic Samara aircraft. Therefore the open-loop control demonstrated and analyzed is considered to be appropriate for similar vehicles of reduced size with limited sensing and actuation capabilities.

Based on the experimental results and analytical study, including study of effects of the planform geometry on mechanical Samara wing's autorotation efficiency and rotational dynamics, study of pitch and heave control of the subject miniature (micro/nano) mono-wing Samara aircraft, as well as its dynamics about a coordinated helical turn, the novel mono-wing miniature rotorcraft that mimics passive transit of the species of Samara (winged seed) has been built and its flight has been controlled in accordance with the model and equations described supra.

Figure 36A:
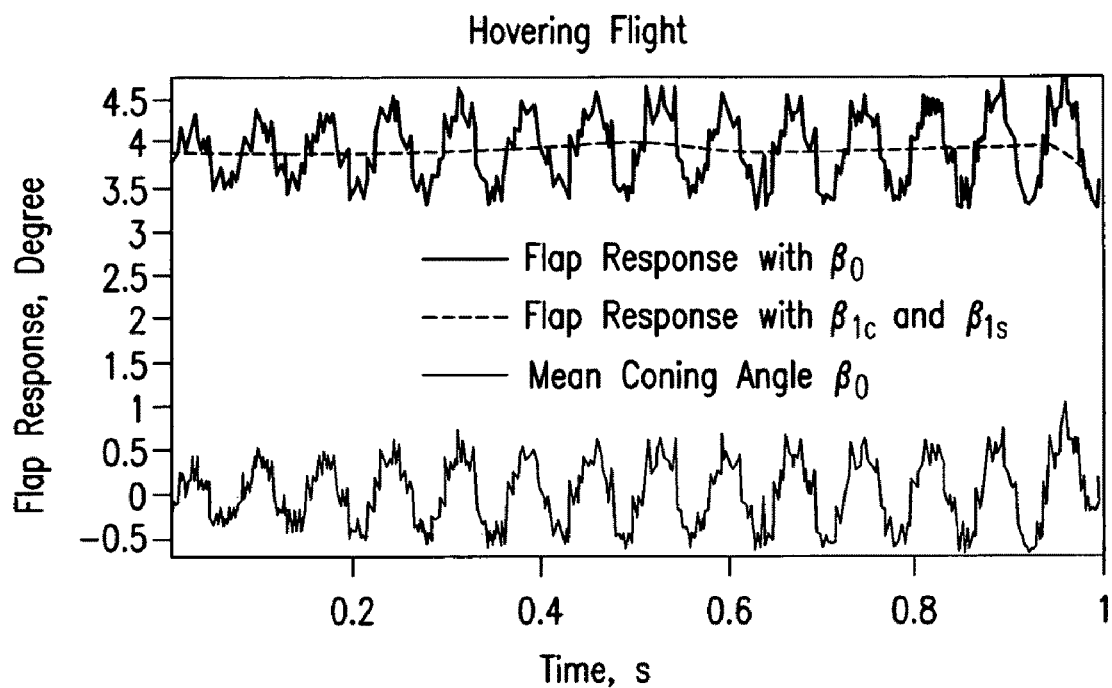
FIGS. 36A-36B represent diagrams of values recorded in flight for hovering flight (FIG. 36A), and forward flight (FIG. 36B)
Figure 36B:
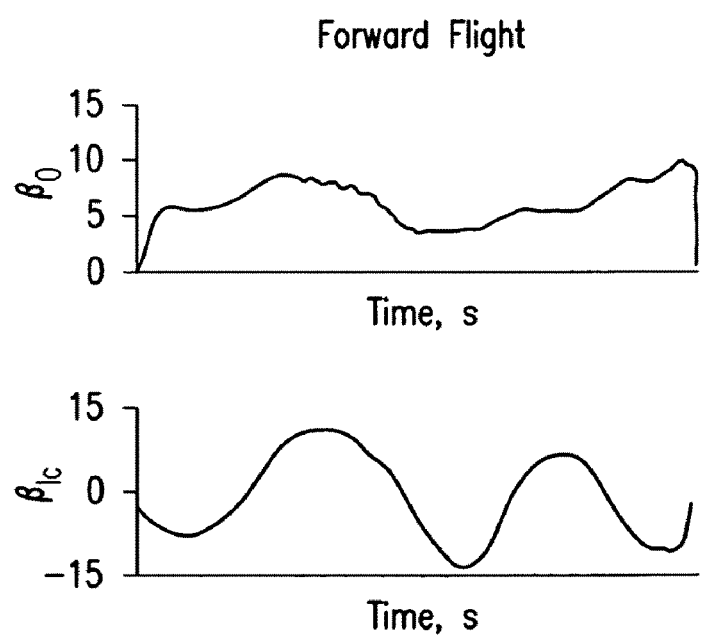

Summarizing the data presented supra herein, the direction of travel of the Samara aircraft corresponds to the tilt of the tip-plane. A tilt that results in the forward motion of the Samara aircraft, $\beta_{1c}$, the tilt resulting in the left/right motion, $\beta_{1s}$, and the mean flap angle, $\beta_0$, are defined in FIG. 31. The relationships between $\beta$, $\beta_0$, $\beta_{1s}$ and $\beta_{1c}$ are described by Eq. 64 presented supra herein. Values recorded in flight for flap response with $\beta_0$, flap response with $\beta_{1c}$ and $\beta_{1s}$, and flap response with mean coning angle $\beta_0$ are presented in FIG. 36A, and the values of $\beta_0$ and $\beta_{1c}$ for forward flight are presented in FIG. 36B.

The primary challenge in controlling lateral directional flight is to know where the vehicle is pointed and when to actuate the control to steer it. To implement precise directional control a 1-per revolution actuation of the collective pitch angle $\theta_0$ is required to tilt the tip path plane in the direction of a desired motion (in helicopter terminology this control is called cyclic pitch control). The orientation of the vehicle must be estimated on-board or off-board and send the vehicle to implement this type of control. The estimation may be done with an analog MEMS tri-axis magnetometer and two tri-axis MEMS (microelectromechanical systems) accelerometers.

To implement the directional control with cyclic pitch the system is treated as a simple harmonic oscillator. Ignoring damping effects which influence the phase lead/lag from input to output, the system responds to an input with a response 90° out of the phase.

For a cyclic input consisting of the following signal:

$$\theta = \theta_0 + \theta_{1c} \cos \psi + \theta_{1s} \sin \psi \quad (82)$$

The wing flap response will be:

$$\beta = \beta_0 + \beta_{1c} \cos(\psi - \pi/2) + \beta_{1s} \sin(\psi - \pi/2) \quad (83)$$

Figure 37A:
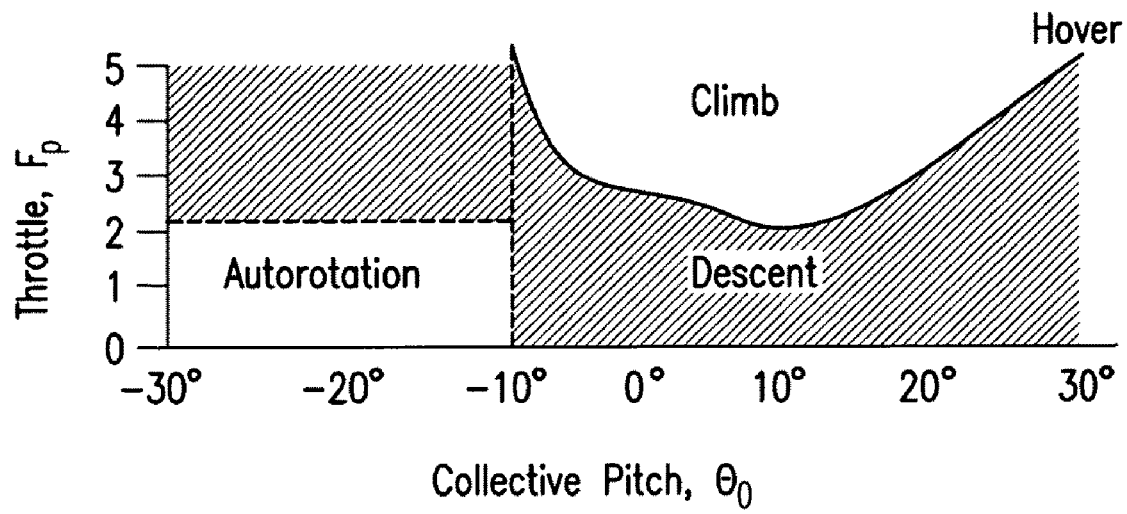
FIG. 37A is a diagram representing modes of the aircraft operation for throttle $(F_p)$ vs. collective pitch $(\theta_0)$.
Figure 37B:
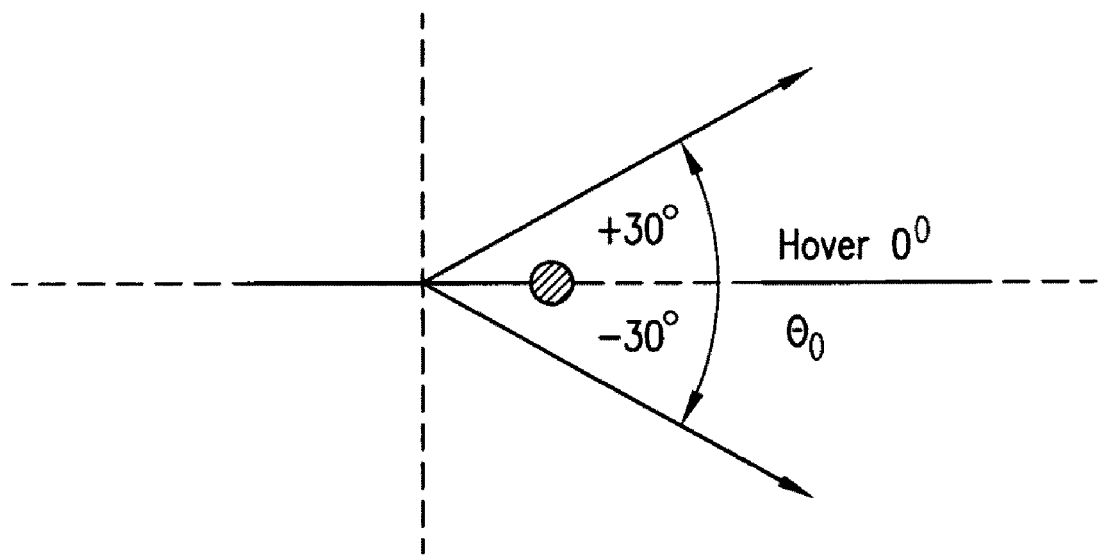
FIG. 37B is a schematic representation of the pitch angle of the wing corresponding to FIG. 37A.

Referring to FIGS. 37A and 37B, within the allowable range of the pitch (−30°/+30°) shown in FIG. 37B, and depending on the throttle, $F_p$, and the input control collective pitch $\theta_0$, the miniature mono-wing air vehicle operates either in the autorotation mode, performs climb or descent motion, or operates in steady hover mode (as shown in FIG. 37A).

By providing input control signals presented in Table 16, the aircraft in question is maneuvered and controlled.

TABLE 16

Commands for desired flight mode

| Command | $\theta_0$ | $\theta_{1c}$ | $\theta_{1s}$ | $F_p$ |
|---|---|---|---|---|
| Hover | 0 | 0 | 0 | + |
| Autorotate | − | 0 | 0 | 0 |
| climb | + | 0 | 0 | + |
| descend | − | 0 | 0 | +, 0 |
| forward | 0 | + | 0 | + |
| backward | 0 | − | 0 | + |
| Left + $S_y$ direction | 0 | 0 | + | + |
| Right | 0 | 0 | − | + |

Figure 38:
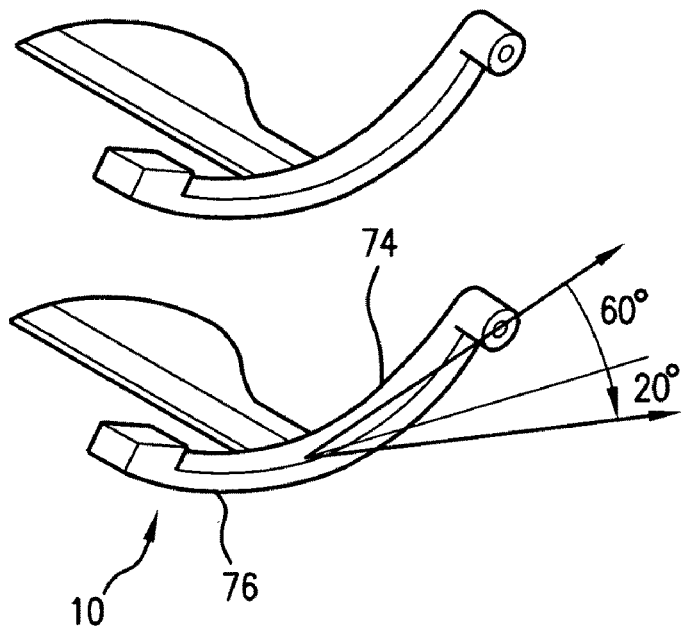
FIG. 38 is a schematic representation of the allowable range of angular deflection for the fuselage.

There are allowable ranges of angular deflections defined for various components of the miniature mono-wing air vehicle described herein. Referring to FIG. 38, representing the fuselage range of acceptable angles, the arm 74 of the fuselage connecting the motor 26 to the wing 12, and the arm 76 extending between the battery and the wing, have the same range of acceptable angles (±60°) for stable controlled flight.

Figure 39A:
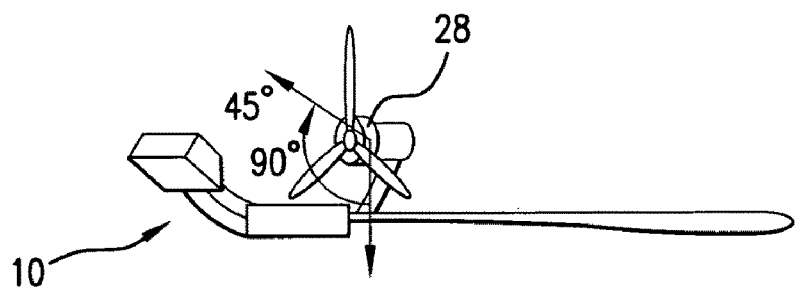
FIGS. 39A-39B are schematic representations of the allowable ranges of angular deflection for the motor/propeller for angling the thrust vertically (FIG. 39A) and regarding the center of gravity (FIG. 39B)
Figure 39B:
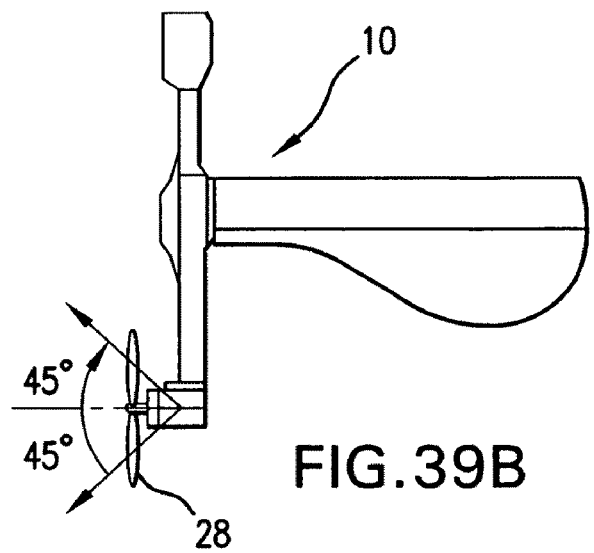

Referring to FIGS. 39A and 39B demonstrating the motor/propeller range of acceptable angles, the motor/propeller acceptable angles for stable controlled flight range from a positive 45° (angling the thrust vertically) to −90° (angling the thrust to oppose gravity), as shown in FIG. 39A. The motor/propeller acceptable angles for stable controlled flight range from −45° (angling the thrust towards the center of gravity) which tends to increase hover stability to +45° (angling the thrust to away from the center of gravity) which tends to decrease hover stability by causing an increasingly larger circular path to ensure, as shown in FIG. 39B.

Referring to FIG. 40, an alternative embodiment is presented with the propeller 28 positioned in opposite direction than the one shown in FIG. 1A. Also, as shown in FIG. 41, a double motor/propeller setup is envisioned which has more power and can lift more pay load. The double motor/propeller setup has the added bonus of single motor out operability. The propellers in this embodiment may spin in either the same or opposite directions as there is no need to cancel the torque from the propellers.

Figure 42:
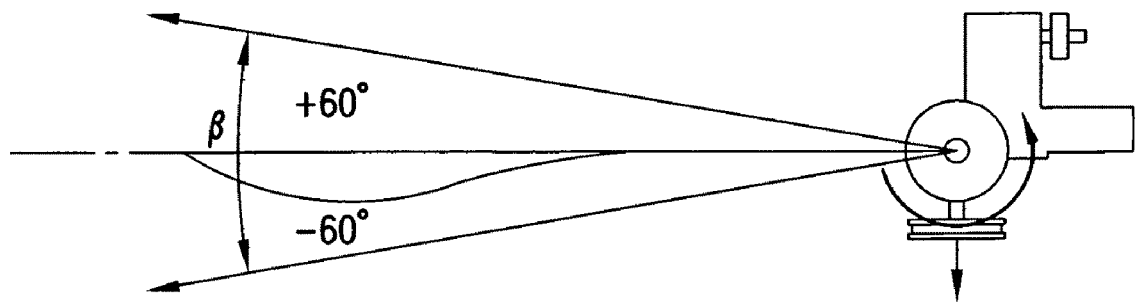
FIG. 42 is a schematic representation of the acceptable range for $\beta_0$.

FIG. 42 is a schematic representation of the acceptable range of $\beta_0$ ranging from $-60°$ to $+60°$. This range may be added before flight and is called a pre-cone angle.

Figure 43:
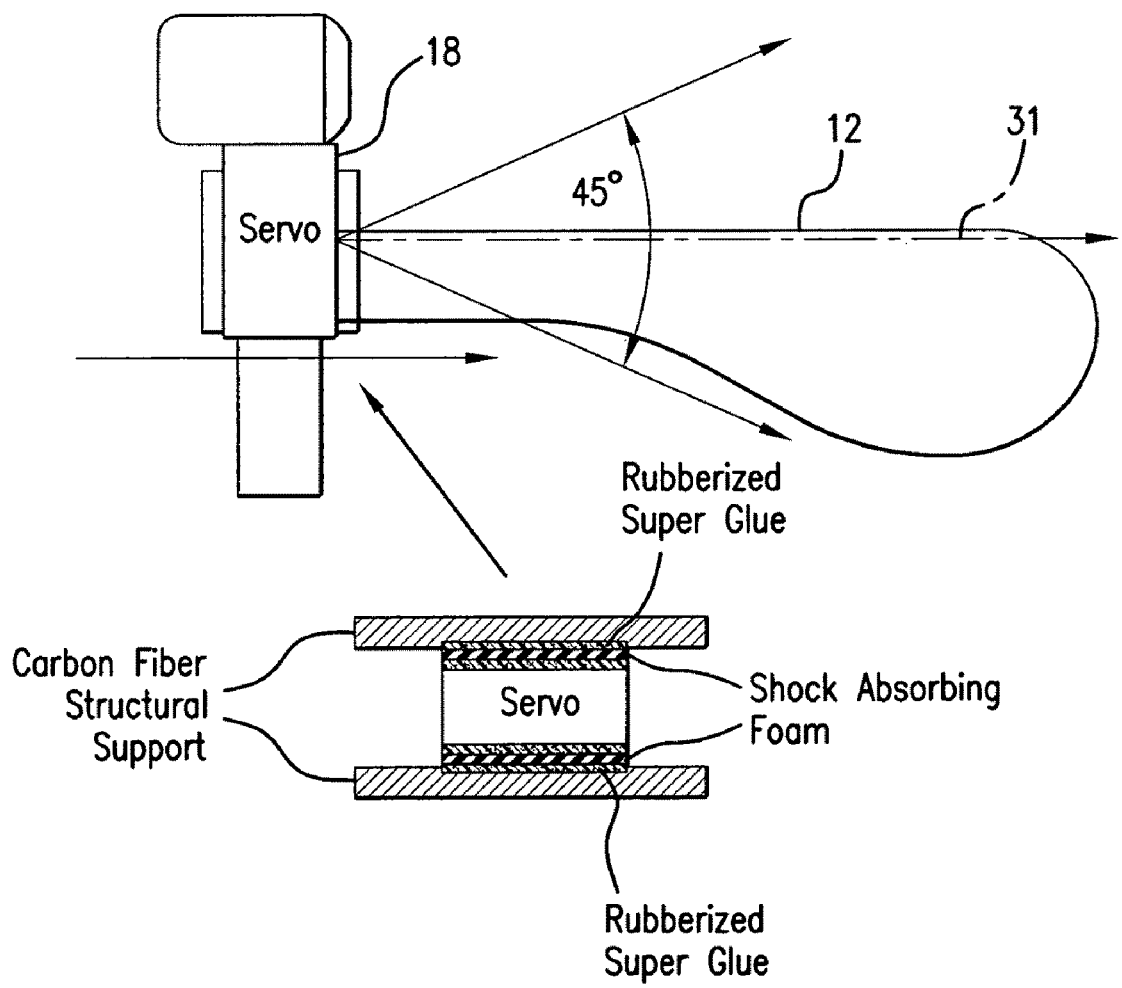
FIG. 43 shows schematically the details of connection of the servo to the wing and to the fuselage.

Referring to FIG. 43, showing the allowable range of angular deflection for the servo mechanism in flight, the damped motion of the wing prevents damage upon impact and functions as a lead-lag hinge. For this, the rubberized superglue and shock absorbing foam are used in coupling of the servo mechanism to the fuselage and to the wing.

The vertical thickness of the fuselage member 14 is the parameter influencing the aerodynamical property of the vehicle during its rotation around the end of the wing. If by adding components an increase in thickness is required, it is preferably added closest to the center of rotation, or the center of mass, as this will minimize the drag apparent on the vehicle. Any thickness of the fuselage and the drag it produces must be overcome by the propulsive device to keep the vehicle spinning and flying. The limit on thickness is one for which the propulsive force is too small compared to the drag to keep the vehicle aloft.

The subject nano-micro mono-wing Samara aircraft demonstrated excellent maneuverability, controllability, efficacy in power consumption, steady hovering, and low descent velocity in autorotation regime, thus making this vehicle ideally suitable for operation in confined environments with high level of autonomy, which is required in the reconnaissance mission. Being equipped with a camera, the subject miniature rotorcraft can collect detailed panoramic images due to the unique manner of motion in flight, e.g., fast spinning about the end of the wing with a frequency of about several rotations per second. The micro/nano scale dimensions and light weight in the range of several tens of grams, makes the vehicles in question easily deployed in an area of interest at low cost.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A miniature mono-wing aircraft, comprising:
a wing configured in the shape of a winged seed (Samara),
a fuselage member flexibly coupled to said wing at one end thereof, and
a controller unit operatively coupled to said wing to control said wing orientation relative said fuselage member, thereby controlling said mono-wing aircraft displacement said controller unit generating a first input control signal corresponding to a collective pitch command for said wing based on said aircraft vertical position and heave velocity.

2. The miniature mono-wing aircraft of claim 1, further comprising at least one propeller attached to said fuselage member in proximity to one end thereof and actuated by said controller unit.

3. The miniature mono-wing aircraft of claim 2, wherein an axis $c_x$ extends along said fuselage member, wherein an axis $c_y$ is a pitch axis of said wing, wherein said axis $c_x$ is substantially perpendicular to said axis $c_y$, wherein an axis $c_z$ of the aircraft rotation extends in perpendicular to a plane formed by said axes $c_x, c_y$, and wherein a said at least one propeller rotates in a plane positioned in a predetermined angular range relative said axes $c_x, c_y, c_z$.

4. The miniature mono-wing aircraft of claim 3, wherein said predetermined angular range is $-90°-+45°$ in a plane formed by said axis $c_x, c_z$, and wherein said predetermined angular range is $-45°-+45°$ in a plane formed by said axis $c_x, c_y$.

5. The miniature mono-wing aircraft of claim 3, further coupling a second propeller rotating around a rotational axis extending in opposite direction of a rotational axis of said at least one propeller.

6. The miniature mono-wing aircraft of claim 2, further comprising:
a servo mechanism coupled to said wing at said one end thereof, wherein said controller unit is operatively coupled to said servo mechanism to control the orientation of said wing.

7. The miniature mono-wing aircraft of claim 6, wherein said controller unit couples said first input control signal to said servo mechanism.

8. The miniature mono-wing aircraft of claim 7, wherein the heave velocity w(t) response of said miniature mono-wing aircraft to said first input control signal is described by $$\omega(t) = -\frac{Z_{\theta_0}}{Z_\omega}\theta_0(1-e^{Z_\omega t}),$$

where $\theta_0$ is an input collective pitch control signal, $Z_{\theta_0}$ is a collective pitch stability derivative, and $Z_\omega$ is a heave stability derivative.

9. The miniature mono-wing aircraft of claim 7, wherein for said first input control signal described by:

$\theta=\theta_0+\theta_{1c}\cos\psi+\theta_{1s}\sin\psi$, said wing resulting orientation is described by:

$\beta=\beta_0+\beta_{1c}\cos(\omega-\pi/2)+\beta_{1s}\sin(\psi-\pi/2)$, wherein $\theta$ is a wing input control pitch signal, $\theta_0$ is an input control collective pitch, $\theta_{1c}$ is an input control pitch of the wing causing forward motion of the aircraft, $\theta_{1s}$ is an input control pitch of the wing causing lateral motion of the aircraft, $\psi$ is an azimuth of the wing, $\beta$ is the wing response flap to said wing input control signal, and $\beta_0$ is the mean flap angle response of said wing.

10. The miniature mono-wing aircraft of claim 7, wherein a relationship between said first input control signal and a resulting reaction of said wing is described by a linear control model.

11. The miniature mono-wing aircraft of claim 6, wherein said controller unit generates a second input control signal corresponding to a rotation speed of said at least one propeller and couples said second input control signal to said at least one propeller to control a throttle of said aircraft.

12. The miniature mono-wing aircraft of claim 2, wherein said controller unit is selected from a group consisting of an on-board control unit secured at said fuselage, and an off-board control unit operatively coupled to said on-board control unit, wherein said on-board control unit includes a receiver receiving input control signals generated to control the operation of said aircraft in a desired manner.

13. The miniature mono-wing aircraft of claim 2, further including a motor attached to said fuselage member and rotating said at least one propeller.

14. The miniature mono-wing aircraft of claim 2, wherein said fuselage member is attached to said wing in proximity to the center of mass thereof.

15. The miniature mono-wing aircraft of claim 1, wherein said wing has the area centroid thereof located between the geometric center line and the tip of said wing.

16. The miniature mono-wing aircraft of claim 1, wherein said wing has a leading edge and a trailing edge, and wherein said leading edge has a larger vertical cross-section than said trailing edge.

17. The miniature mono-wing aircraft of claim 16, wherein for the optimal descent, a span of said wing along said trailing edge thereof is approximately 0.168 m, and the width of said wing between the leading and trailing edges is approximately 0.048 m.

18. The miniature mono-wing aircraft of claim 1, wherein said controller unit includes a control unit selected from a group consisting of: open-loop controller, closed-loop controller, and a feedback control unit, said feedback control unit including a Proportional-plus-Derivative Plus Integral (PID) controller.

* * * * *